United States Patent
Uchida et al.

(10) Patent No.: US 9,217,552 B2
(45) Date of Patent: Dec. 22, 2015

(54) ILLUMINATION DEVICE

(71) Applicants: Sharp Kabushiki Kaisha, Osaka-shi, Osaka (JP); TOHOKU UNIVERSITY, Sendai-shi, Miyagi (JP)

(72) Inventors: Tatsuo Uchida, Sendai (JP); Yoshito Suzuki, Sendai (JP); Tohru Kawakami, Sendai (JP); Takahiro Ishinabe, Sendai (JP); Katsunori Ehara, Sendai (JP); Yoshihiro Hashimoto, Osaka (JP); Toshiki Matsuoka, Osaka (JP); Kozo Nakamura, Osaka (JP); Yasuhisa Itoh, Osaka (JP); Yoshitaka Yamamoto, Osaka (JP); Yutaka Ishii, Osaka (JP)

(73) Assignees: Sharp Kabushiki Kaisha, Osaka (JP); Tohoku University, Miyagi (JP)

( * ) Notice: Subject to any disclaimer, the term of this patent is extended or adjusted under 35 U.S.C. 154(b) by 0 days.

(21) Appl. No.: 14/417,235

(22) PCT Filed: Jul. 2, 2013

(86) PCT No.: PCT/JP2013/068124
§ 371 (c)(1),
(2) Date: Jan. 26, 2015

(87) PCT Pub. No.: WO2014/017262
PCT Pub. Date: Jan. 30, 2014

(65) Prior Publication Data
US 2015/0167924 A1 Jun. 18, 2015

(30) Foreign Application Priority Data
Jul. 27, 2012 (JP) ................................. 2012-167663

(51) Int. Cl.
*F21V 5/04* (2006.01)
*F21V 5/00* (2015.01)
*G02B 19/00* (2006.01)
*F21K 99/00* (2010.01)
*F21Y 101/02* (2006.01)

(52) U.S. Cl.
CPC ... *F21V 5/04* (2013.01); *F21K 9/50* (2013.01); *F21V 5/008* (2013.01); *G02B 19/0014* (2013.01); *G02B 19/0061* (2013.01); *F21Y 2101/02* (2013.01)

(58) Field of Classification Search
CPC ............. F21V 5/04; F21V 5/008; F21K 9/50; F21Y 2101/02; G02B 19/0014; G02B 19/0061
See application file for complete search history.

(56) References Cited

U.S. PATENT DOCUMENTS

| | | | |
|---|---|---|---|
| 7,175,299 B2 | 2/2007 | Uke et al. | |
| 7,798,678 B2 | 9/2010 | Destain | |
| 2002/0034076 A1* | 3/2002 | Becker | B60Q 3/0203 362/331 |
| 2011/0255290 A1* | 10/2011 | Kazmierski | F21V 5/048 362/296.05 |

FOREIGN PATENT DOCUMENTS

| | | |
|---|---|---|
| JP | 2009-004276 A | 1/2009 |
| WO | 2008/016908 A2 | 2/2008 |

* cited by examiner

Primary Examiner — Mary Ellen Bowman
(74) Attorney, Agent, or Firm — Keating & Bennett, LLP

(57) ABSTRACT

A lighting device (100) includes: a surface light source (1); a first lens (L1) having a first focal point (F1), the first lens being provided on the light exit surface side of the surface light source; and a second lens (L2) having a second focal point (F2), the second lens being provided on a light exit surface side of the first lens, the surface light source, the first lens, and the second lens being configured such that a first virtual image (I1) is formed by the first lens and a second virtual image (I2) is formed by the second lens, wherein the first virtual image (I1) is formed between the second focal point (F2) and the first lens, the second focal point (F2) is on a side opposite to the light source side relative to a predetermined focal position f, and at least either of a light entry surface or a light exit surface of the first lens or the second lens includes a non-revolution surface (SO) as a lens surface, and a plurality of boundary lines (B1-B4) whose curvatures vary discontinuously are provided in the non-revolution surface.

15 Claims, 37 Drawing Sheets

(a)

(b)

(a)

(b)

(a)

(b)

(c)

(a) TWO-DIMENSIONAL ILLUMINANCE DISTRIBUTION AT 1 M AHEAD (b) TWO-DIMENSIONAL ILLUMINANCE DISTRIBUTION AT 5 M AHEAD (a)

(b)

(a)

(b)

(a)

(b)

(a)                    (b)

(a)

(b)

(c)

(a)

(b)

(c)

(a-1)

(a-2)

(b-1)

(b-2)

(a)

(b)

(a)

(b)

(a)

(b)

(c)

(a)

(b)

(a)

(b)

ILLUMINATION DEVICE

TECHNICAL FIELD

The present invention relates to a lighting device which includes a surface emitting element.

BACKGROUND ART

A known example of common lighting devices is a lighting device 900 shown in FIG. 54.

The lighting device 900 has a collimating optical system LC which includes a meniscus lens L1 and an aspherical lens L2 and is configured such that a LED light source 10 is placed at the focal position of this optical system as shown in FIG. 54.

Here, light emitted from a point on the optical axis AX of the LED light source 10 is collimated light which is parallel to the optical axis AX as shown in FIG. 54. On the other hand, since the LED light source 10 is a surface light source rather than a point light source, there is light emitted from a location away from the optical axis AX. The light emitted from a location away from the optical axis AX travels in a direction which is different from the optical axis AX and therefore reaches a place which is different from that the light emitted from a point on the optical axis AX reaches. Thus, there is a problem that illuminance uniformity is not achieved across the illuminated surface.

Moreover, since the meniscus lens L1 and the LED light source 10 are distant from each other, there is a probability that light emitted from the LED light source 10 at a large angle is not incident upon the meniscus lens L1.

Patent Documents 1 and 2 disclose light sources which can utilize almost all of light emitted from a LED emitter.

The light source disclosed in Patent Document 1 has a LED emitter, an inner lens enclosing the LED emitter, and a meniscus lens covering these components. The light source disclosed in Patent Document 2 has a LED emitter and a meniscus lens covering the light emitter with a gap provided therebetween. In these light sources, a virtual image $VI_1$ formed by an inner surface of the meniscus lens is produced at a position outer than the LED emitter (on the light exit surface side of the lens).

As described above, when the virtual image $VI_1$ formed by the inner surface of the meniscus lens is produced at a position outer than the LED emitter, almost all of light emitted from the LED emitter is incident upon the meniscus lens. This improves the light utilization efficiency of the light emitted from the LED emitter.

CITATION LIST

Patent Literature

Patent Document 1: Specification of U.S. Pat. No. 7,798,678
Patent Document 2: WO 2008/016908
Patent Document 3: Japanese Laid-Open Patent Publication No. 2009-4276

SUMMARY OF INVENTION

Technical Problem

However, in the light sources of Patent Documents 1 and 2, achieving the uniformity of the illuminated surface is not considered although it is possible to utilize almost all of light emitted from the LED emitter as described above. For example, such a problem can occur that light emitted from a location away from the optical axis of the lens illuminates a region which is different from that the light emitted from a location on the optical axis illuminates, so that the uniformity of the illuminated surface cannot be achieved.

Further, there has been the use of illuminating a region of a non-circular shape using a lighting device, and in many of conventional examples, light emitted from a light source is partially blocked in order to control the shape of the illumination region. Specifically, in order to realize a non-circular (e.g., quadrangular) illumination region, for example, a light blocking plate which has an aperture (opening), or a blade member provided near a light exit portion of the lighting device, is used. However, there is a problem that such solutions deteriorate the light utilization efficiency.

For example, Patent Document 3 discloses a spotlight which is capable of forming a non-circular illumination region using a surface light source of a quadrangular or trapezoidal shape. However, this spotlight has a blocking plate which has an opening adapted to the spot shape in the light source, and therefore, the light utilization efficiency decreases.

Thus, forming a non-circular illumination region without decreasing the light utilization efficiency has been demanded. Lighting devices of this type are suitably used in the fields of stage lighting for, for example, providing a spotlight of a different (non-circular) shape, such as quadrangular, triangular, etc.

The present invention was conceived for the purpose of solving the above problems. An object of the present invention is to provide a lighting device which is capable of forming an illumination region of a different shape while improving the light utilization efficiency.

Solution to Problem

A lighting device according to an embodiment of the present invention includes: a surface light source having a light exit surface; a first lens having a first focal point, the first lens being provided on the light exit surface side of the surface light source; and a second lens having a second focal point, the second lens being provided on a light exit surface side of the first lens, the surface light source, the first lens, and the second lens being configured such that a first virtual image is formed by the first lens and a second virtual image is formed by the second lens, wherein the first virtual image is formed between the second focal point and the first lens, the second focal point is on a side opposite to the surface light source relative to a position which is distant from a principal point of the second lens by a predetermined focal length f', the predetermined focal length f' satisfies $l'=(D/(\epsilon+D))\cdot f'$ where l' is the distance between the principal point of the second lens and a position of the first virtual image, D is an effective diameter of the second lens, and $\epsilon$ is a light source size factor which is either one of a size of the light exit surface of the surface light source or an arrangement pitch of a plurality of light-emitting elements included in the surface light source, and at least either of a light entry surface or a light exit surface of the first lens or the second lens includes a non-revolution surface as a lens surface, and a plurality of non-concentric boundary lines whose curvatures vary discontinuously are provided in the non-revolution surface.

In one embodiment, at least one of the plurality of boundary lines extends outward from a center of the non-revolution surface.

In one embodiment, the non-revolution surface has three or more unit faces separated by the plurality of boundary lines, the three or more unit faces being rotationally symmetrically arranged about an axis extending through the center of the non-revolution surface.

In one embodiment, x-direction and y-direction which are orthogonal to each other in a plane which is perpendicular to an optical axis direction are defined, and in at least one of the three or more unit faces, a curvature in the x-direction and a curvature in the y-direction are different from each other.

In one embodiment, at least one of the three or more unit faces is a free curved surface.

In one embodiment, when the non-revolution surface forms a light exit surface of the first lens or the second lens, the non-revolution surface includes two convex curved surfaces which are adjacent to each other with one of the plurality of boundary lines formed between the two convex curved surfaces, and the boundary line formed between the two convex curved surfaces is a trough line, and when the non-revolution surface forms a light entry surface of the first lens or the second lens, the non-revolution surface includes two concave curved surfaces which are adjacent to each other with one of the plurality of boundary lines formed between the two concave curved surfaces, and the boundary line formed between the two concave curved surfaces is a ridge line.

In one embodiment, the light source size factor $\epsilon$ is not less than a minimum pitch of in-plane intensity unevenness of the light exit surface.

In one embodiment, the first virtual image is formed between the first focal point and the first lens, and the second virtual image is formed between the second focal point and the second lens.

In one embodiment, the first virtual image and the second virtual image are formed between an effective focal point of the first lens and the second lens and the first lens.

In one embodiment, a second optical system is further provided on a light exit side of a first optical system that includes the first lens and the second lens.

In one embodiment, the second optical system includes a concave lens which is the closest to the first optical system and a convex lens which is next to the concave lens and is the second closest to the first optical system.

The non-revolution surface is provided at the light exit surface of the second lens, and the light exit surface of the first lens and a light entry surface of the second lens are joined together.

In one embodiment, the first lens and the second lens are formed of a resin by integral molding.

In one embodiment, a lens surface of the first lens facing on the surface light source is a concave curved surface, and a position range h at which the light exit surface can be placed is represented by the following formula: $h \leq 2\sqrt{(d(2R-d))}$ where d is a distance along an optical axis from the light exit surface of the surface light source to the concave curved surface of the first lens, and R is a radius of curvature of the concave curved surface of the first lens.

In one embodiment, $a < f/2$ is satisfied where a is a distance from a principal point of an optical lens section including the first lens and the second lens to the light exit surface, and f is a distance from the principal point to a focal position of the optical lens section.

In a lighting device according to an embodiment, an optical lens section formed by a plurality of optical lenses is provided on a light extraction side of a light emission section. In the optical lens section, the focal position of each optical lens is present on a side opposite to a surface facing on the light emission section relative to a virtual image formed by the optical lens. According to this configuration, the virtual image formed by each lens can occur at a position near the light emission section.

This configuration enables light emitted from the center of the light emission section which is on the optical axis of the optical lens section and light emitted from a location away from the center of the light emission section to outgo from the optical lens section with generally equal angular distributions. Therefore, both the light emitted from the center of the light emission section and the light emitted from a location away from the center of the light emission section can equally illuminate the entirety of a predetermined illumination region, so that the uniformity of the illumination region can be significantly improved.

Furthermore, since the light emitted from the center of the light emission section and the light emitted from a location away from the center of the light emission section can outgo from the optical lens section with generally equal angular distributions, substantially no part of the light fails to reach the optical lens section, and as a result, high light utilization efficiency can be achieved.

Thus, it is possible to utilize almost all of the light emitted from the light emission section, and high light utilization efficiency is achieved, while light emitted from different locations of the light emission section can be projected onto generally equal illumination regions, leading to a distinguishing effect that the uniformity of the illumination region can be significantly improved.

To achieve an effect which is generally equal to the above, for example, in a lighting device where a lens section formed by a plurality of optical lenses is provided on a light projection surface side of the light emission section, an effective focal position determined by totalizing the focal points of the respective optical lenses that are constituents of the optical lens section may be present on a side opposite to surfaces of all the virtual images facing on the light emission section relative to the respective virtual images formed by the optical lenses.

The above-described configuration also enables the virtual image formed by each lens to occur at a position near the light emission section. Therefore, it is possible to utilize almost all of the light emitted from the light emission section, and high light utilization efficiency is achieved, while light emitted from different locations of the light emission section can be projected onto generally equal illumination regions, leading to a distinguishing effect that the uniformity of the illumination region can be significantly improved.

Furthermore, according to the above-described configuration, since an effective focal position determined by totalizing the focal points of the respective optical lenses that are constituents of the optical lens section is present on a side opposite to surfaces of all the virtual images facing on the light emission section relative to the respective virtual images formed by the optical lenses, the virtual images formed by the respective lenses can occur at positions which are still closer to the light emission section. Therefore, the angle of the light outgoing from the optical lens section can be expanded, and thus, the uniformity of a larger illumination region can be significantly improved.

Where the above-described optical lens section is the first optical lens section, the second optical lens section may be provided on the light exit side of the first optical lens section.

According to the above-described configuration, the light exit angle of the light outgoing from the first optical lens section can be changed by the second optical lens section. That is, the light exit angle of the light outgoing from the first optical lens section can be narrowed or expanded by changing the optical characteristics of the second optical lens section.

Thus, the area of the light illumination region can be freely changed by controlling the design of the second optical lens section.

The above-described second optical lens section may be configured such that a lens which is the closest to the first optical lens section is a concave lens, and a lens which is the second closest to the first optical lens section a convex lens.

Such a combination of a concave lens and a convex lens enables correction of the aberrations occurring in the respective lenses, and therefore, the characteristics of light outgoing from the first optical lens section can be kept undamaged.

Thus, the light exit angle of the light outgoing from the first optical lens section is adjustable, and it is possible to utilize almost all of the light emitted from the light emission section, so that high light utilization efficiency is achieved. Meanwhile, light emitted from different locations of the light emission section can be projected onto generally equal illumination regions, leading to a distinguishing effect that the uniformity of the illumination region can be significantly improved.

In the above-described optical lens section, part of the interface of the above-described respective lenses may be integrally formed.

Since part of the respective lenses that are constituents of the optical lens section is thus integrally formed, alignment of the emission surface of the light emission section and the optical lens section can be easily achieved.

Further, fixing of the light emission section and the optical lens section can also be easily achieved.

Possible methods of forming an integral structure of two lenses include integral molding with the use of a resin and adhesion with the use of an adhesive agent. The two lenses may be formed of a resin by integral molding.

In this case, since the two lenses are formed of a resin by integral molding, the molding cycles in formation of the optical lens section can be reduced from two cycles (in the case of two lenses) to one cycle. Accordingly, the manufacturing cost can be reduced.

Of the lenses that are constituents of the above-described optical lens section, in the first optical lens where a lens surface which is the closest to the light emission section is a concave surface which is concaved against the light emission section, $h \leq 2\sqrt{(d(2R-d))}$ may hold where d is the distance from the emission surface of the light emission section to the interface of the first optical lens on the optical axis, R is the radius of curvature of the inner lens of the first optical lens, and h is the arrangement range on the optical axis of the light emission section. Thus, since the arrangement range h of the light emission section is set as described above, all of the light emitted from the light emission section is brought into the first optical lens, so that the light utilization efficiency can be improved.

Where the distance from the principal point of the above-described optical lens section to the emission surface of the light emission section is a and the distance from the principal point of the optical lens section to the focal position is f, $a < f/2$ may be satisfied.

By thus making the distance a from the principal point of the optical lens section to the emission surface of the light emission section shorter than a half of the distance f from the principal point of the optical lens section to the focal position, the virtual image position can always be relatively close to the optical lens section as compared with the focal position of the optical lens section.

The above-described light emission section may include a plurality of light emitters. In this case, the plurality of light emitters are arranged over the emission surface of the light emission section. Even when the light emitters emit varying amounts of light, light is projected such that these variations are canceled at the illuminated surface. That is, light emitted from respective ones of the light emitters are projected onto the same illumination region, and therefore, even when the light emitters emit varying amounts of light, this variation is canceled.

Advantageous Effects of Invention

According to a lighting device of an embodiment of the present invention, it is possible to illuminate a region of a non-circular shape while improving the illuminance uniformity.

DESCRIPTION OF EMBODIMENTS

Hereinafter, embodiments of the present invention are described with reference to the drawings, although the present invention is not limited to these embodiments.

Embodiment 1

Figure 1:
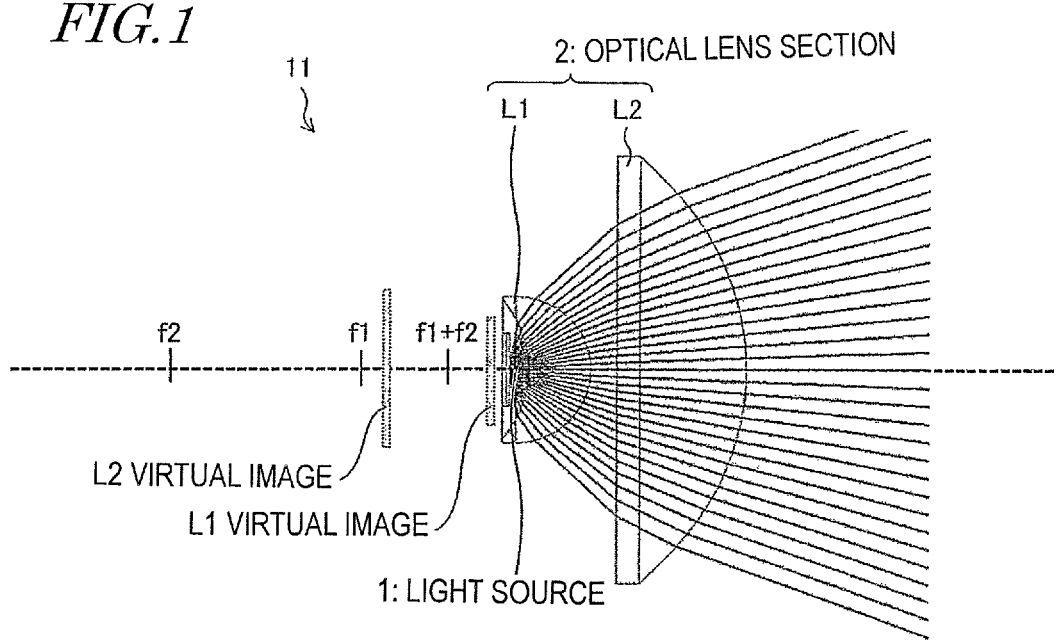
FIG. 1 A general configuration diagram of a lighting device according to an embodiment of the present invention.
Figure 2:
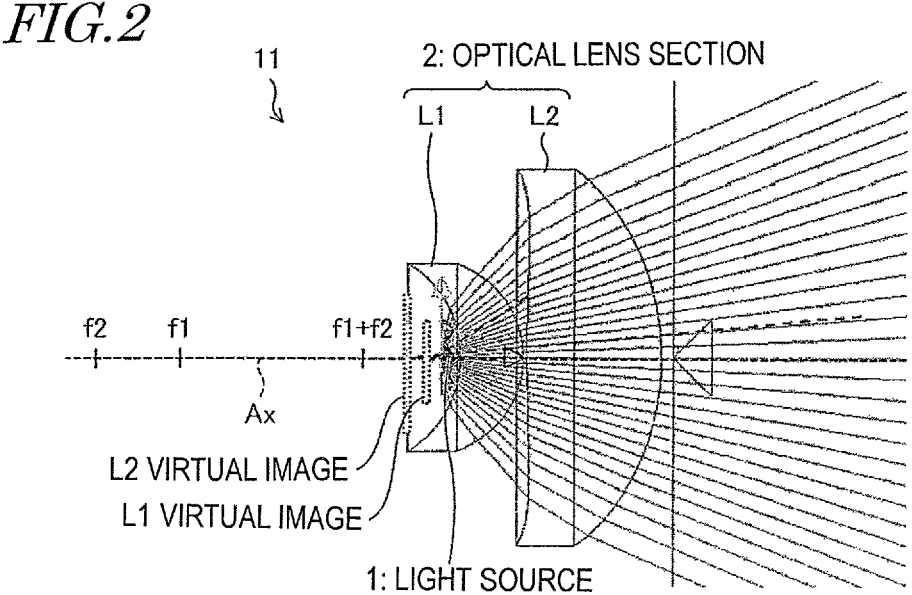
FIG. 2 A general configuration diagram of a lighting device according to an embodiment of the present invention.

FIG. 1 and FIG. 2 are diagrams showing the general configuration of a lighting device 11 according to the present embodiment.

Figure 3:
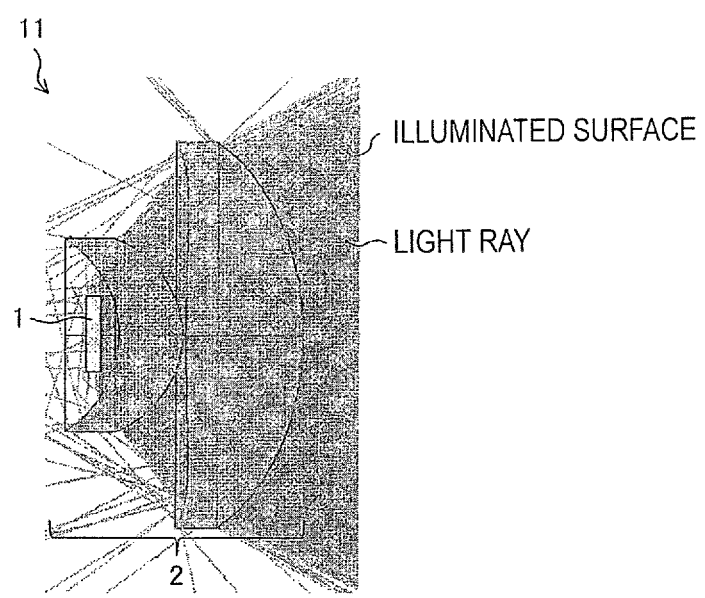
FIG. 3 A diagram showing a light ray behavior in the lighting device shown in FIG. 2.

FIG. 3 is a diagram showing the state of light projection in the lighting device 11 shown in FIG. 2.

(Configuration of Lighting Device) . . . FIGS. 1, 2, and 3

As shown in FIG. 1, the lighting device 11 includes a light source (light emission section) 1 and an optical lens section 2 provided on the optical axis AX on the light exit surface side, which is the light extraction side, of the light source 1. The lighting device 11 is configured such that light produced by the light source 1 is projected through the optical lens section 2.

The light source 1 includes a LED emitter. The LED emitter is a surface light emitter which is capable of surface emission. Note that it is not limited to the LED emitter so long as it is a surface light emitter which is capable of surface emission.

The optical lens section 2 includes two optical lenses L1, L2. From the side closer to the light source 1, the optical lens L1 (or "first lens L1") and the optical lens L2 (or "second lens L2") are arranged in this order. Note that the optical lenses L1, L2 are arranged such that the centers of the lenses are on the optical axis AX.

The optical lens L1 has a diameter which is at least greater than the maximum width of the emission surface of the light source 1. A surface of the optical lens L1 on the light source 1 side has a concave surface shape.

The optical lens L2 has a diameter which is at least greater than the maximum diameter of the optical lens L1 that is the first optical lens. The light exit surface side of the optical lens L2 has a convex shape.

Now, the focal positions of the optical lenses L1, L2 and virtual images formed after passage through the optical lenses L1, L2 are described.

The focal position of the optical lens L1 is f1 (also referred to as "focal point F1"). A virtual image which is formed by passage of light from the light source 1 through the optical lens L1 is a L1 virtual image (also referred to as "virtual image I1"). The focal position of the optical lens L2 is f2 (also referred to as "focal point F2"). A virtual image which is formed by passage of light from the L1 virtual image formed by the optical lens L1 through the optical lens L2 is a L2 virtual image (also referred to as "virtual image I2"). The effective focal position of the optical lenses L1, L2 is f1+f2 (also referred to as "effective focal point F(1+2)").

In the lighting device 11 shown in FIG. 1, the optical lens section 2 is designed such that the focal points f1, f2 of the optical lenses L1, L2 that are constituents of the optical lens section 2 are present on a side opposite to surfaces of corresponding virtual images (L1 virtual image, L2 virtual image) facing on the light source 1 relative to the respective virtual images formed by the optical lenses L1, L2 (L1 virtual image, L2 virtual image). In this configuration, the first virtual image I1 is formed between the focal point f1 and the lens L1, and the second virtual image I2 is formed between the focal point f2 and the lens L2.

A lighting device 11 which is based on an alternative design of the present embodiment includes a light source (light emission section) 1 and an optical lens section 2 which is placed on the optical axis AX on the light exit surface side of the light source 1 as shown in FIG. 2. The lighting device 11 is configured such that light produced by the light source 1 is projected through the optical lens section 2.

The light source 1 includes a LED emitter. The LED emitter is a surface light emitter which is capable of surface emission. Note that it is not limited to the LED emitter so long as it is a surface light emitter which is capable of surface emission.

The optical lens section 2 includes two optical lenses, the first optical lens L1 and the second optical lens L2. From the side closer to the light source 1, the optical lens L1 and the optical lens L2 are arranged in this order. Note that the optical lenses L1, L2 are arranged such that the centers of the lenses are on the optical axis AX.

The optical lens L1 has a diameter which is at least greater than the maximum width of the emission surface of the light source 1. A surface of the optical lens L1 on the light source 1 side has a concave surface shape.

The optical lens L2 has a diameter which is at least greater than the maximum diameter of the optical lens L1 that is the first optical lens. The light exit surface side of the optical lens L2 has a convex shape.

Now, the focal positions of the optical lenses L1, L2 and virtual images formed after passage through the optical lenses L1, L2 are described.

The focal position of the optical lens L1 is f1. A virtual image which is formed by passage of light from the light source 1 through the optical lens L1 is a L1 virtual image. The focal position of the optical lens L2 is f2. A virtual image which is formed by passage of light from the L1 virtual image formed by the optical lens L1 through the optical lens L2 is a L2 virtual image. The effective focal position of the optical lenses L1, L2 is f1+f2.

In the lighting device 11 shown in FIG. 2, the optical lens section 2 is designed such that the effective focal position f1+f2 of the focal points f1, f2 of the optical lenses L1, L2 that are constituents of the optical lens section 2 is present on a side opposite to surfaces of all the virtual images (L1 virtual image, L2 virtual image) facing on the light source 1 relative to the respective virtual images formed by the optical lenses L1, L2 (L1 virtual image, L2 virtual image). In this configuration, the L1 virtual image and the L2 virtual image are formed between the effective focal position f1+f2 of the lens L1 and the lens L2 and the lens L1.

In the lighting device 11 in which the focal positions of the optical lenses L1, L2 and virtual images formed after passage through the optical lenses L1, L2 are in the relationship shown in FIG. 2, all of light rays from the emission surface of the light source 1 are guided to the optical lens section 2 as shown in FIG. 3 so that light can be efficiently projected onto a surface to be illuminated. That is, according to the lighting device 11 that has the above-described configuration, both high light utilization efficiency and improved uniformity of the illuminated surface can be achieved.

Hereinafter, the above-described effects achieved by the lighting device 11 that has the above-described configuration are described in detail.

Points of Present Embodiment

Figure 4:
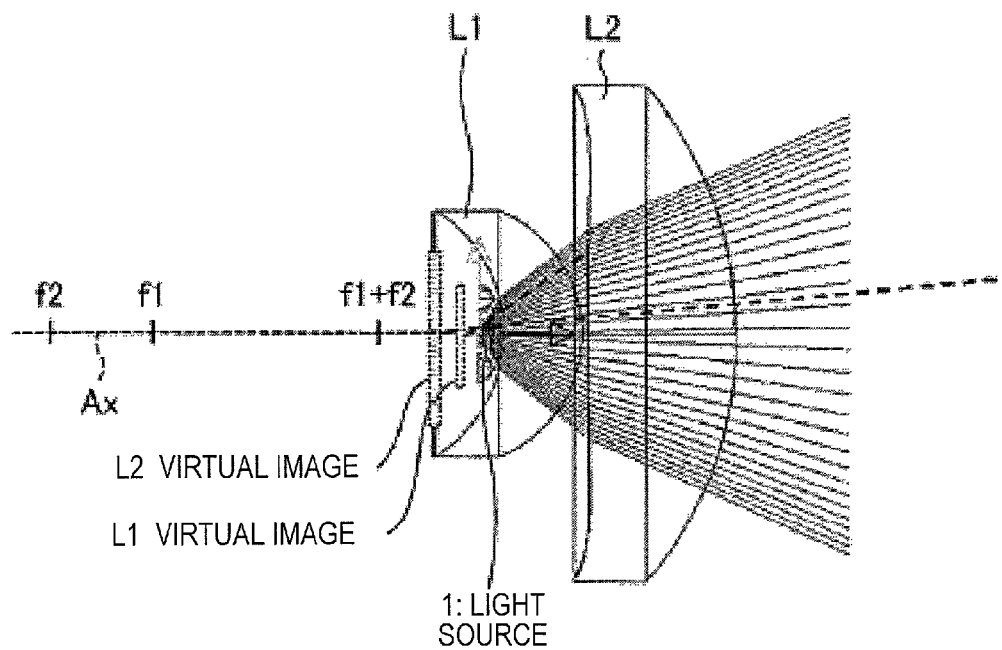
FIG. 4 (a) is a diagram showing a general configuration of the lighting device shown in FIG. 2. (b) is a diagram showing a general configuration of a lighting device of a comparative example.
Figure 4:
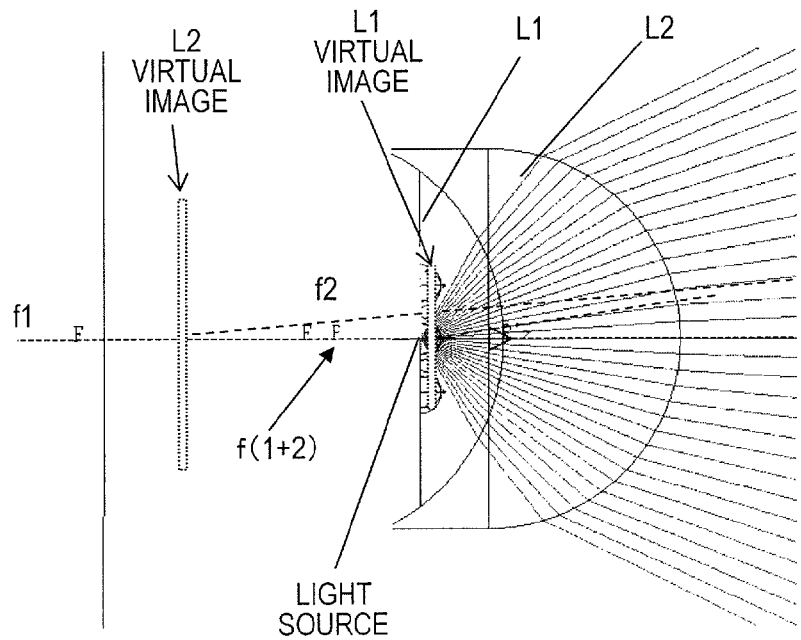
Figure 5:
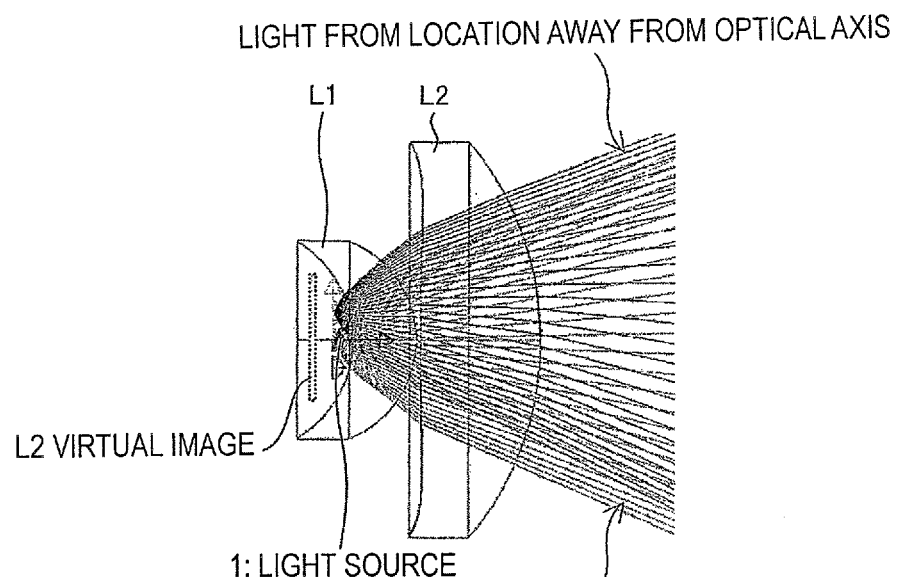
FIG. 5 (a) is a diagram showing a light ray behavior of the lighting device shown in FIG. 4(a). (b) is a diagram showing a light ray behavior of the lighting device shown in FIG. 3(b).
Figure 5:
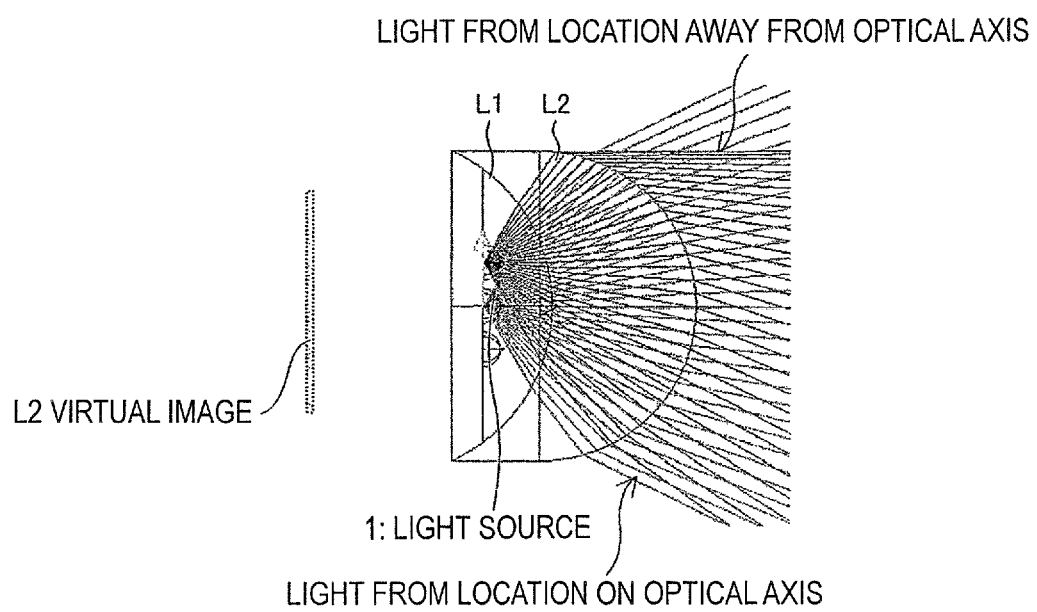

FIGS. 4 and 5

FIG. 4(a) is a model diagram for the focal positions of the optical lenses L1, L2, and the L1 virtual image and the L2 virtual image which are formed after passage through the optical lenses L1, L2, respectively, in the lens configuration of the lighting device 11 of FIG. 2 (two-lens configuration). FIG. 4(b) is a model diagram for the focal positions of the optical lenses L1, L2, and the L1 virtual image and the L2 virtual image which are formed after passage through the optical lenses L1, L2, respectively, in an alternative form.

In the lighting device 11 that has the above-described configuration, as shown in FIG. 4(a), the optical lens section 2 is designed such that, with respect to the position of the light source, the focal positions f1, f2 of the optical lenses L1, L2 and the effective focal position f1+f2 are present on a side opposite to the light source side relative to the positions of virtual images formed by the optical lenses L1, L2 (L1 virtual image, L2 virtual image).

In the above-described configuration, virtual images formed by the optical lenses L1, L2 (L1 virtual image, L2 virtual image) are formed relatively near the light source. Here, light which has passed through a plurality of lenses (optical lenses L1, L2) can be regarded as outgoing of light from a virtual image formed by the last lens (in FIG. 4(a), L2 virtual image). Therefore, formation of the L2 virtual image near the light source can lead to the effect such as shown in FIG. 5(a).

FIG. 5(a) shows the routes of light emitted from the center of the light source (thin lines in FIG. 5(a)) and light emitted from the upper edge of the light source (thick lines in FIG. 5(a)) in the lens configuration shown in FIG. 4(a). Here, the center of the light source refers to a portion which is on the optical axis AX that passes through the center of the optical lens section 2.

As seen from FIG. 5(a), in the case of the lens configuration shown in FIG. 4(a), the light emitted from the center of the light source and the light emitted from the upper edge of the light source outgo from the optical lens section 2 with generally equal angular distributions. Thus, according to the lens configuration shown in FIG. 4(a), both the light emitted from the center of the light source and the light emitted from the upper edge of the light source can equally illuminate the entirety of a predetermined illumination region, so that the uniformity of the illumination region can be improved.

On the other hand, in the lens configuration of the alternative form, as shown in FIG. 4(b), the L2 virtual image is formed by the second optical lens L2 at a relatively distant position, and the L2 virtual image does not occur between the optical lens L2 and its focal position f2 (this aspect is different from the configuration shown in FIG. 4(a)). The focal position f2 of the optical lens L2 is placed at a position which is relatively close to the L1 virtual image. In this configuration, the L2 virtual image occurs at a position which is more distant from the light source than the focal position f2 of the optical lens L2, sometimes leading to the result such as shown in FIG. 5(b).

Note that, however, as will be described later, even when the L2 virtual image is distant from the light source 1, the uniformity in illuminance across the illumination region can be improved so long as the optical system is configured such that the L1 virtual image is at least formed on the light source side relative to the focal position f2 of the optical lens L2 and, meanwhile, the virtual image I1 formed by the optical lens L1 and the focal position f2 of the optical lens L2 are away from the light source 1 by a predetermined distance or more as will be described later.

FIG. 5(b) shows an example of the routes of light emitted from the center of the light source (thin lines in FIG. 5(b)) and light emitted from the upper edge of the light source (thick lines in FIG. 5(b)) in the case where the L1 virtual image is formed near the light source in the lens configuration of FIG. 4(b). In the example shown in FIG. 5(b), the light emitted from the center of the light source and the light emitted from the upper edge of the light source outgo from the optical lens L2 with different angular distributions (this aspect is different from the case of FIG. 5(a)). With such a characteristic, light emitted from different locations of the light source illuminate different ranges, and therefore, there is a probability that the uniformity of the illumination region cannot be achieved.

As described above, in the above-described configuration shown in FIG. 4(a), the focal positions f1, f2 of the optical lenses L1, L2 which are provided on the light exit surface side of the light source are provided at distant positions behind the L1 virtual image and the L2 virtual image formed by the optical lenses L1, L2 (in a direction opposite to the lens emission side). This arrangement enables relatively moving the light source and the virtual image positions so as to be closer to the optical lenses L1, L2.

In such a configuration, light emitted from the center of the light source which is on the optical axis of the optical lens section and light emitted from a location away from the center of the light source are allowed to outgo particularly toward the optical lens L1 of the optical lens section 2 with generally equal angular distributions. This enables both the light emitted from the center of the light source and the light emitted from a location away from the center of the light source to equally illuminate the entirety of a predetermined illumination region, so that the illuminance uniformity across the illumination region can be improved.

Furthermore, since the light emitted from the center of the light source and the light emitted from a location away from the center of the light source are allowed to outgo toward the optical lens section with generally equal angular distributions, substantially no part of the light fails to reach the optical lens section 2, and as a result, high light utilization efficiency can be achieved.

Thus, it is possible to utilize almost all of the light emitted from the light source, and high light utilization efficiency is achieved, while light emitted from different locations of the light source can be projected onto generally equal illumination regions. This significantly improves the uniformity of the illumination region.

Furthermore, since the focal points f1, f2 of the optical lenses L1, L2 and the effective focal position f1+f2 are present on a side opposite to surfaces of all the virtual images (L1 virtual image, L2 virtual image) facing on the light source 1 relative to the respective virtual images formed by the optical lenses L1, L2 (L1 virtual image, L2 virtual image), the virtual images formed by the respective lenses can occur at positions which are still closer to the light emission section. Therefore, the angle of the light outgoing from the optical lens section can be expanded, and thus, the uniformity of a larger illumination region can be significantly improved.

Note that, however, the position of the virtual image I2 formed by the lens L2 is not necessarily near the light source 1. The virtual image I2 may be formed at a position which is relatively distant from the light source. In this case, the lighting device projects light at a relatively narrow angle. Note that, in a configuration where light is projected at a relatively narrow angle, placing the focal point F2 of the second lens L2 at a position which is away from the L1 virtual image I1 or the light source by a predetermined distance or more is preferred from the viewpoint of improving the illuminance uniformity across the illumination region.

FIGS. 27(a) to 27(e) show various positional relationships between the positions of the focal points F1, F2 of the lenses L1, L2 and the virtual images I1, I2. In each of the arrangements of FIGS. 27(a) to 27(e), the light source 1 is provided between the first lens L1 and its focal point F1, and the virtual image I1 of the light source is formed by the first lens L1. This virtual image I1 is present at an inner position (on the light source side) than the focal point F2 of the second lens L2. Accordingly, the virtual image I2 is formed by the second lens L2.

Note that, however, the present inventors found that, when the virtual image I1 is present near the focal point F2 of the second lens, there is a probability that the intensity unevenness and chromaticity unevenness at the emission surface of the surface light source 1 and the emission surface shape itself are also reflected in the illumination region on the screen.

Figure 27:
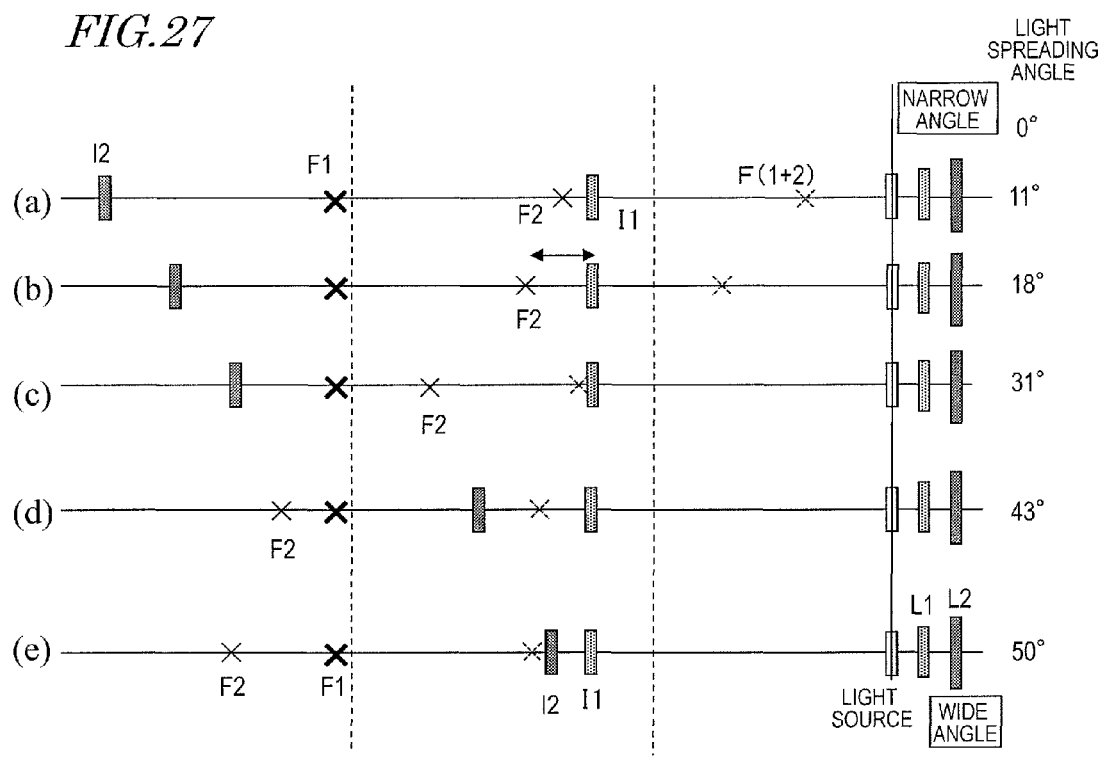
FIG. 27 A diagram showing the relationship between the focal points of the first lens and the second lens and the positions of virtual images formed by respective lenses. ($a$) to ($e$) show alternative arrangement relationships.
Figure 28:
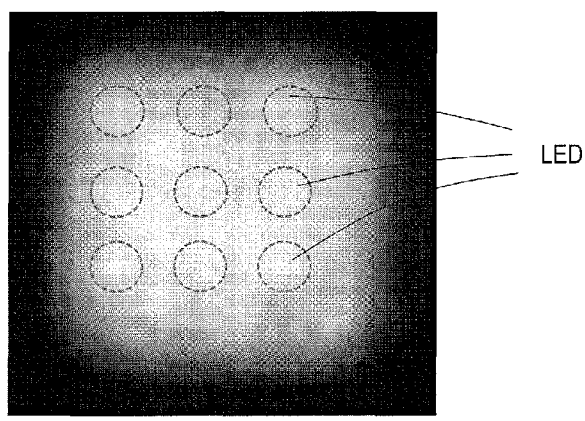
FIG. 28 A chart showing illuminance unevenness occurring across a light exit surface of a surface light source.

FIG. 28 shows the state of the illumination region on the screen in the case where the virtual image I1 of the light source 1 which is formed by the first lens L1 is present near the focal point F2 of the second lens L2 as shown in FIG. 27(a). When the focal point F2 and the virtual image I1 are excessively close to each other, there is a probability that the intensity unevenness and chromaticity unevenness produced by a plurality of element LEDs at the emission surface of the surface light source 1 are more likely to be perceived also in the illumination region on the screen as if the virtual image I1 were formed on the screen by the second lens L2.

To avoid occurrence of such a pseudo image formation and reduce the probability that the intensity unevenness and chromaticity unevenness at the emission surface are reflected in the illumination region, it is preferred that the focal point F2 is present on the distal side (the side opposite to the light source side) by a certain distance or more from the virtual image I1. Further, it is preferred that the focal length of the focal point F2 of the second lens L2 is not less than a predetermined length. As will be described later, the position of the focal point F2 of the second lens L2 may be determined according to, for example, the size of the surface light source 1. When the surface light source 1 includes a plurality of light-emitting elements, the position of the focal point F2 of the second lens L2 may be determined according to, for example, the arrangement pitch of the light-emitting elements.

Figure 29:
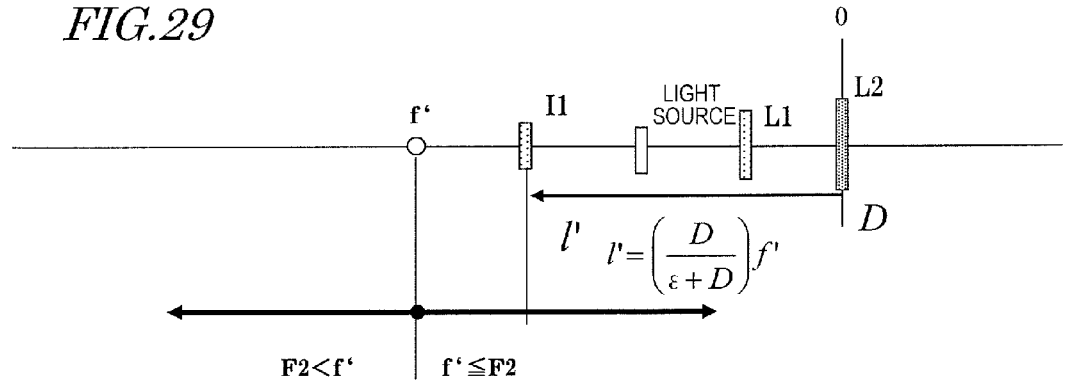
FIG. 29 A diagram showing the positional relationship between the reference focal point f' and the focal point F2 of the second lens.

FIG. 29 shows a case where the focal point F2 of the second lens L2 is present on the distal side relative to a predetermined reference position f' (or "reference focal point f'") on the optical axis (F2<f') and a case where the focal point F2 of the second lens L2 is present on the proximal side relative to the predetermined reference position f' (F2≥f': including a case where the focal point F2 is present at the reference position f'). In the lighting device according to an embodiment of the present invention, the optical system is designed such that the focal point F2 is present on the distal side relative to the reference position f'.

Now, the reference position (or "reference focal point") f' is described. The reference position f' refers to such a position that, when the focal point F2 of the second lens is present on the distal side relative to this position f', the shape of the surface light source and the intensity unevenness and chromaticity unevenness are unlikely to be visually perceived in the light projection region.

When, on the contrary, the focal point F2 is present at the same position as the reference position f' or at an anterior position relative to the reference position f', the second lens L2 projects the virtual image I1, which is approximately in focus, onto an image surface. As a result, such a phenomenon occurs that the shape of the emission surface and the intensity unevenness and chromaticity unevenness at the emission surface are reflected in the illumination region.

It is inferred that this phenomenon occurs according to a principal which is similar to that of the phenomenon that the posterior depth of field is as deep as infinity (which is referred to as "pan-focus" or "deep focus") when a wide-angle lens (a lens with a relatively short focal length) is used in a photographic device such as a camera and the F-number is set to a large value by controlling the diaphragm.

Figure 30:
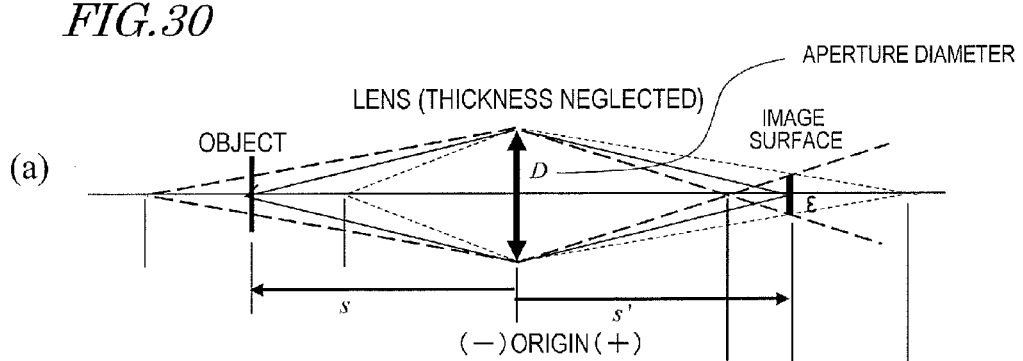
FIG. 30 ($a$) is a diagram for illustrating a deep focus state. ($b$) is a diagram for illustrating an application to a lighting device.
Figure 30:
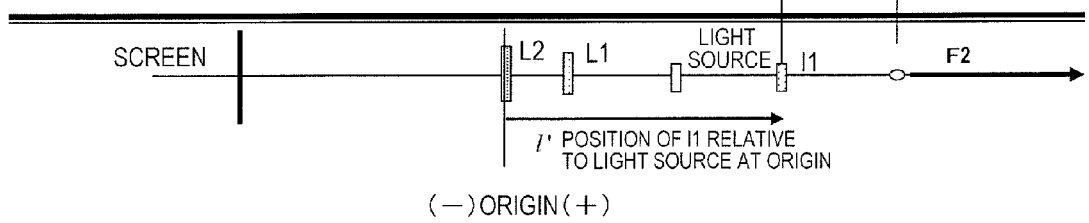

FIG. 30(a) is a diagram for explaining the aforementioned deep focus. Here, the thickness of the lens used is neglected, and the lens has aperture diameter D and focal point f' (F-number is given by Fno.=f'/D). The distance between an object and the lens is s, and the distance between the lens and the image surface is s'. In general, in the case where an image of an object is formed on the image surface using a lens, the position of the object at which the image of the object is in focus on the image surface is only one position. When the object is present anterior or posterior to that position, the image must be out of focus and blurry. However, in the case of FIG. 30(a), even when an object on a plane is moved back and forth within a certain range on the optical axis, it looks as if it were in focus on the image surface. This is because, although it is actually out of focus and blurry on the image surface, the blur cannot be detected if it is smaller than a certain degree, so that it looks as if it were in focus. Here, in the case where the size of the permissible limit of the blur is set as a permissible circle of confusion $\epsilon$ at the position of the image surface, a spot of a size which is not more than the permissible circle of confusion $\epsilon$ can be regarded as a spot with no blur.

Also, $s'=f'\cdot s/(f'+s)$ can be deduced from the Gaussian formula $1/s'-1/s=1/f'$. Here, the deep focus is realized under a condition that it is in focus at the distance from the lens to the object, $s=f'^2/\epsilon Fno.$ (hyperfocal distance).

This hyperfocal distance s can be rewritten in regard to the distance s' between the lens and the image surface into $s'=(D/\epsilon+D)\cdot f'$. When this formula holds, the deep focus is realized. The present inventors found that such deep focus in a photographic device can also be realized in the lighting device of the present embodiment.

FIG. 30(b) is a diagram for illustrating a condition under which, in the lighting device of the present embodiment, an image of the surface light source is formed in the illumination region with no blur, as if it were in focus, according to the principle that is similar to the above-described deep focus (i.e., the shape of the surface light source and the intensity unevenness and chromaticity unevenness are reflected in the illumination region).

In the lighting device, the above-described formula $s'=(D/\epsilon+D)\cdot f'$ can be converted to $l'=(D/\epsilon+D)\cdot f'$ where l' is the distance from the second lens L2 (when the thickness of the lens is considered, the principal point on the light source side) to the virtual image I1. By determining l', D, and $\epsilon$ in this formula, the reference focal point f' for the second lens L2 can be determined.

Here, the effective diameter D is the effective diameter of the second lens L2. The distance l' from the second lens L2 to the virtual image I1 can be calculated from the distance from the light source 1 to the second lens L2 and the distance from the light source 1 to the virtual image I1. The distance from the light source 1 to the virtual image I1 can be calculated from the positional relationship between the light source 1 and the first lens L1, the refractive index of the first lens L1 and the shape of the lens surface, etc.

When applied to the lighting device of the present embodiment, the permissible circle of confusion $\epsilon$ in the deep focus can be regarded as a factor which is to be set according to the emission surface size of the surface light source. When the surface light source includes a plurality of light-emitting elements which are arranged with intervals, the permissible circle of confusion $\epsilon$ can also be regarded as a factor which is to be set according to the arrangement pitch of the light-emitting elements (the pitch of the intensity unevenness and chromaticity unevenness). When thus applied to the lighting device of the present embodiment, the permissible circle of confusion $\epsilon$ in the deep focus is defined by the size of the emission surface or the arrangement pitch of the light-emitting elements, and therefore, these are sometimes referred to as "light source size factors $\epsilon$". As understood from the above-described formula, the position of the reference focal point f' varies depending on the setting of the light source size factor $\epsilon$.

Figure 31:
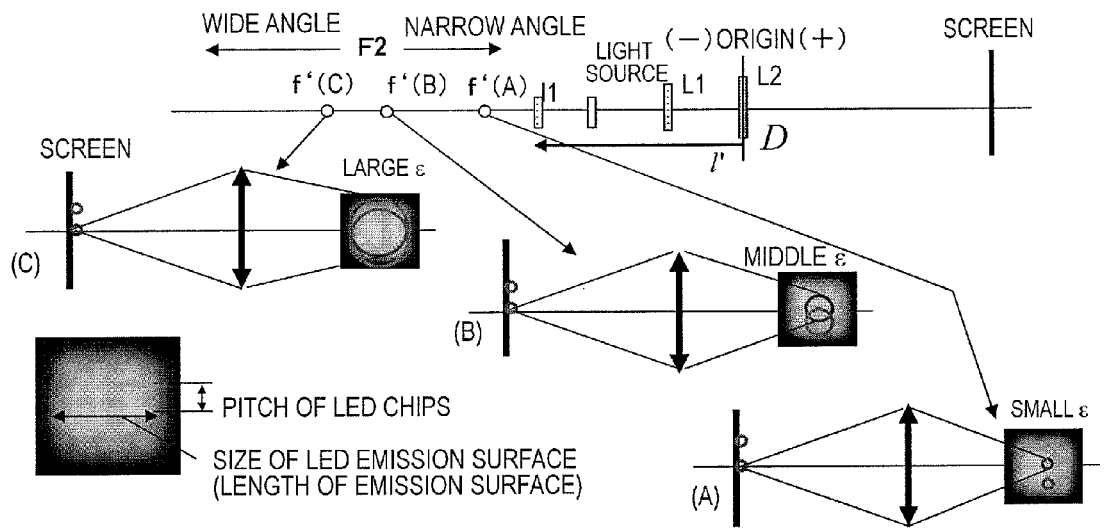
FIG. 31 A diagram for explaining that the position of the reference focal point f' varies according to the light source size factor (permissible circle of confusion) $\epsilon$.

FIG. 31 shows that the position of the reference focal point f' varies according to the light source size factor $\epsilon$. As illustrated in pattern (A), in the case where the pitch of the LED chips is considered as the light source size factor $\epsilon$, the reference focal point f' as the condition for visually perceiving the intensity unevenness and chromaticity unevenness on the order of the pitch on the screen is set to a side which is relatively close to the light source. As illustrated in pattern (B), in the case where a size which is greater than the pitch of the LED chips and which is smaller than the entire size of the light source is considered as the light source size factor $\epsilon$, the reference focal point f' is set to a distal position as compared with the case of pattern (A). Further, as illustrated in pattern (C), in the case where the entire size of the light source is considered as the light source size factor $\epsilon$, the reference focal point f' is set to a distal position as compared with the case of pattern (B).

That is, in the case where the light source size factor $\epsilon$ (hereinafter, referred to as "factor $\epsilon$") is set to a large value, the reference focal point f' moves away from the light source, and the focal point F2 of the second lens L2 is set to a position which is more distant from the light source than the reference focal point. Further, as represented by two circles in the diagram, regions on the emission surface corresponding to the factor $\epsilon$ gather in a predetermined region on the screen.

An image which is formed when the second focal point F2=f' holds in the above-described configuration is now discussed.

As illustrated in pattern (A), when the factor $\epsilon$ is smaller than the intensity unevenness and chromaticity unevenness at the LED emission surface (the minimum pitch of the arrangement of the LED elements), an image of the intensity unevenness and chromaticity unevenness is reflected on the screen. Since regions enclosed by two circles on the emission surface have different light emission characteristics, characteristics reaching the two circles on the screen are different, and it is seen as an image of the LED chip.

In a preferred example, as illustrated in pattern (B), a plurality of above-described intensity and chromaticity unevennesses are present within the range of the factor $\epsilon$ (not less than the minimum pitch of the arrangement of the LED elements). In this case, the light emission characteristics of the regions enclosed by two circles on the emission surface are averaged, so that an image of the intensity unevenness and chromaticity unevenness is not visually perceived on the screen. However, if the size of the LED emission surface is out of the range of the factor $\epsilon$, the difference in intensity and chromaticity between the LED emission surface and a region outside the LED emission surface (i.e., the shape of the LED emission surface) is reflected, and sometimes disadvantageously, an image which has the shape of the LED emission surface is seen on the screen.

In another preferred example, as illustrated in pattern (C), the factor $\epsilon$ is large enough to encompass the entire emission surface. In this case, the shape of the emission surface is unlikely to be reflected, so that desirable illumination is realized on the screen.

Note that, however, the light source size factor $\epsilon$ may be set based on another form. An example of setting of the light source size factor $\epsilon$ based on another form is described below.

Figure 32:
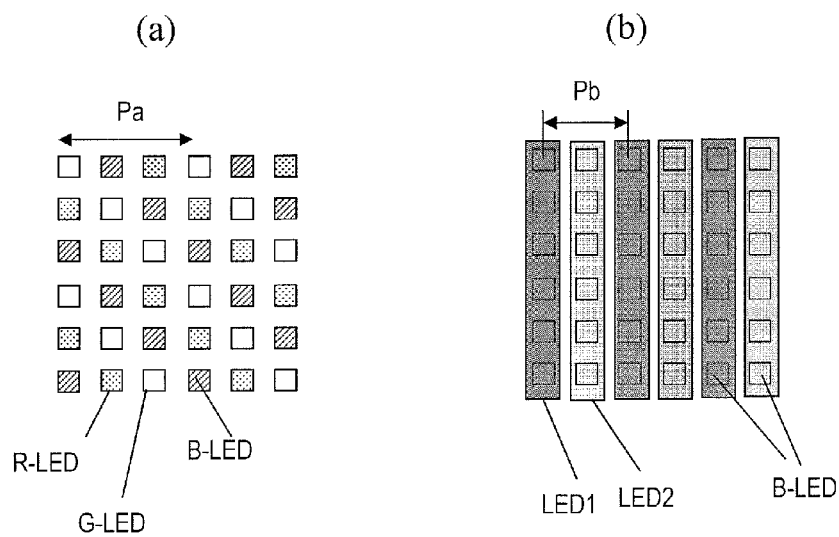
FIG. 32 Diagrams for illustrating the repetition pitch in a surface light source. ($a$) shows a case where LEDs of three colors are used. ($b$) shows a case where LED columns of two different characteristics are arranged.

FIG. 32($a$) shows an embodiment where red LEDs, blue LEDs, and green LEDs are arranged according to a predetermined pattern. In this case, as shown in the drawing, a plurality of sets of LEDs of three colors are arranged at the minimum repetition pitch Pa, each of the LED sets consisting of LEDs of three different colors. In this case, the repetition pitch minimum Pa is selected as the light source size factor $\epsilon$, whereby unevenness across the illumination region due to the arrangement of respective sets of LEDs of three colors is prevented from being perceived.

FIG. 32($b$) shows a case where the emission surface is formed at such a pattern that vertically-extending regions of two different types between which the type, density, and thickness of the phosphor are different are repeated on a column by column basis. Although the light-emitting elements may have the same characteristics, light emitted from the two different type regions of the emission surface exhibit different wavelength-spectrum characteristics due to the different phosphor types. In this case, the repetition pitch minimum Pb of the two-column by two-column arrangement may be set as the light source size factor $\epsilon$. This can prevent occurrence of stripe-pattern unevenness formed due to the two different type regions which exhibit different wavelength-spectrum characteristics across the illumination region. Note that the arrangements of FIGS. 32($a$) and 32($b$) are merely exemplary. Even in other arrangements where regions of different emission intensities and different wavelength-spectrum characteristics are present in the plane, the minimum repetition pitch can be used as the light source size factor $\epsilon$.

As shown in FIGS. 27($a$) to 27($e$), the angular range of light to be projected (the extent of the illumination region) varies depending on the positional relationship between the focal point F2 of the second lens and the virtual image I1 formed by the first lens L1. In general, the optical lens is configured such that the light exit angle is narrowest when the light source is present at the focal position, and the light exit angle becomes wider as the light source moves away from the focal position to the lens side. In other words, the light projection angle becomes narrower as the focal point F2 of the second lens and the virtual image I1 formed by the first lens L1 are closer to each other, and the light projection angle becomes wider as the virtual image I1 is at a more distant position.

This light projection angle can be represented by the light spreading angle. Here, the light spreading angle refers to an angle which is calculated from the width of a region whose illuminance is not less than 50% in the case where the illuminance achieved at the center of the illumination region formed on the screen is 100% and the distance between the light source and the screen. A small light spreading angle means that the lighting device projects light at a narrow angle. A large light spreading angle means that the lighting device projects light at a wide angle.

In the lighting device of the present embodiment, as described above, the focal point F2 of the second lens is provided at a distal position relative to the reference position f'. In this case, a lighting device which projects light with a light spreading angle of not less than 8°, for example, is realized.

In the arrangements shown in FIGS. 27(a) to 27(c), the focal point F2 of the second lens L2 is present between the virtual image I1 formed by the first lens L1 and the virtual image I2 formed by the second lens L2. Note that, however, the focal point F2 is present on the light source side relative to the focal point F1. In these arrangements also, an illuminance region which has a uniform illuminance distribution can be formed so long as the focal point F2 is provided at a distal position relative to the reference position f'.

On the other hand, as shown in FIGS. 27(d) and 27(e), even when the focal point F1 is present on the light source side relative to the focal point F2, an illuminance region which has a uniform illuminance distribution can be formed. FIG. 27(e) shows the positional relationship of the focal points f1, f2 (F1, F2) of the respective lenses, the positions of the respective virtual images (I1, I2), and the effective focal point f1+f2 (F(1+2)) in the embodiment shown in FIG. 1. As seen from FIG. 27(e), in the embodiment shown in FIG. 1, light of a large light spreading angle can be projected at a wide angle such that the intensity unevenness and chromaticity unevenness at the emission surface are not conspicuous.

As described hereinabove, by setting the focal point of the second lens at a distal position relative to the reference focal point f' that is determined from the size factor ε of the emission surface, the effective diameter D of the second lens, etc., illumination with reduced unevenness, i.e., high uniformity, can be realized.

Note that a mechanism for adjusting the effective aperture D of the second lens F2 may be provided. In this case, it is preferred that, for possible arbitrary effective apertures D, the focal length of the second lens is set such that the shape of the emission surface and the intensity unevenness and chromaticity unevenness are not reflected in the illumination region.

Although an optical design consisting of the first lens and the second lens has been described, the optical system may be constructed using a larger number of lenses. In this case, assuming that n lenses are arranged from the light source side, the above-described first lens may be considered as a lens whose characteristics are equal to those of the entire lens group consisting of the first to n−1$^{th}$ lenses, and the second lens may be considered as the n$^{th}$ lens.

(Regarding the Design of the Lens Shape)

The shape of optical lenses included in the optical lens section 2 of the above-described lighting device 11 may be determined according to the arrangement of focal positions and virtual image positions in the vicinity of the optical axis. Note that, however, it is more preferred that the shape of the lenses, including portions away from the optical axis, is determined according to the following design criteria.

Specifically, to maximize the utilization efficiency of light emitted from the light source 1 which has a finite size and secure the illuminance uniformity across the illumination region, the lens system is constructed such that the off-axis comatic aberration is corrected with respect to the size of the surface light source while the light source 1 is positioned as close as possible to an optical lens near the light source 1 in order to maintain the virtual image relationship of generally equal magnification in the context of the paraxial theory and, meanwhile, an on-axis image point and an off-axis image point have equal spot shapes and diameters.

The comatic aberration refers to a phenomenon that light coming out from one point which is away from the optical axis does not converge into one point on the image surface but results in an image which appears to have a tail like a comet. The state of convergence of light on the image surface is referred to as "spot shape (spot diagram)".

The aforementioned "axis" refers to the optical axis of a lens. The term "on-axis" refers to a location on the optical axis of a lens. The term "off-axis" refers to a location which is away from the optical axis.

Here, the "virtual image relationship of generally equal magnification in the context of the paraxial theory" refers to a condition under which the size of the L1 virtual image and the L2 virtual image in FIG. 4(a) is equal to or several times greater than the light source and meanwhile the L1 virtual image and the L2 virtual image occur near the light source.

Further, correcting "the off-axis comatic aberration" means changing the shape of a lens portion away from the optical axis such that light coming out from a location which is away from the optical axis converges into one point on the image surface.

Further, "an on-axis image point and an off-axis image point have equal spot shapes and diameters" means changing the shape of a lens portion away from the optical axis such that the spot on the image surface of light coming out from a location on the optical axis and the spot on the image surface of light coming out from a location away from the optical axis have generally equal shapes and areas.

Effects of Present Embodiment

FIG. 6 Through FIG. 11

Details of the effects in the lighting device 11 that has the above-described configuration are described below with reference to FIG. 6 through FIG. 11.

Figure 6:
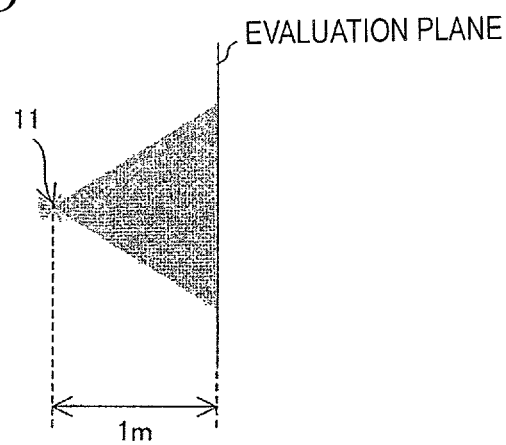
FIG. 6 A diagram showing an example where an evaluation plane is 1 m distant from the lighting device.
Figure 7:
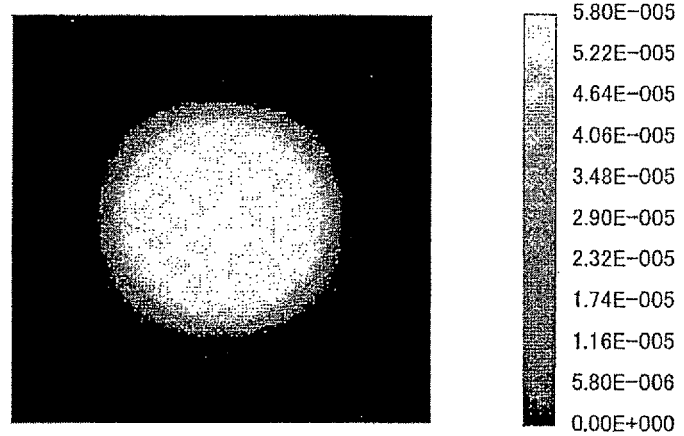
FIG. 7 A chart showing the illumination intensity distribution at the evaluation plane shown in FIG. 6.

As shown in FIG. 6, in the case where the evaluation plane is 1 m distant from the lighting device 11 such as shown in FIG. 2, the resultant illuminance distribution across the evaluation plane is as shown in FIG. 7. In FIG. 7, the in-plane distribution is monochromatically shown according to the illuminance intensity. A black portion represents the minimum illuminance, and a white portion represents the maximum illuminance.

Figure 8:
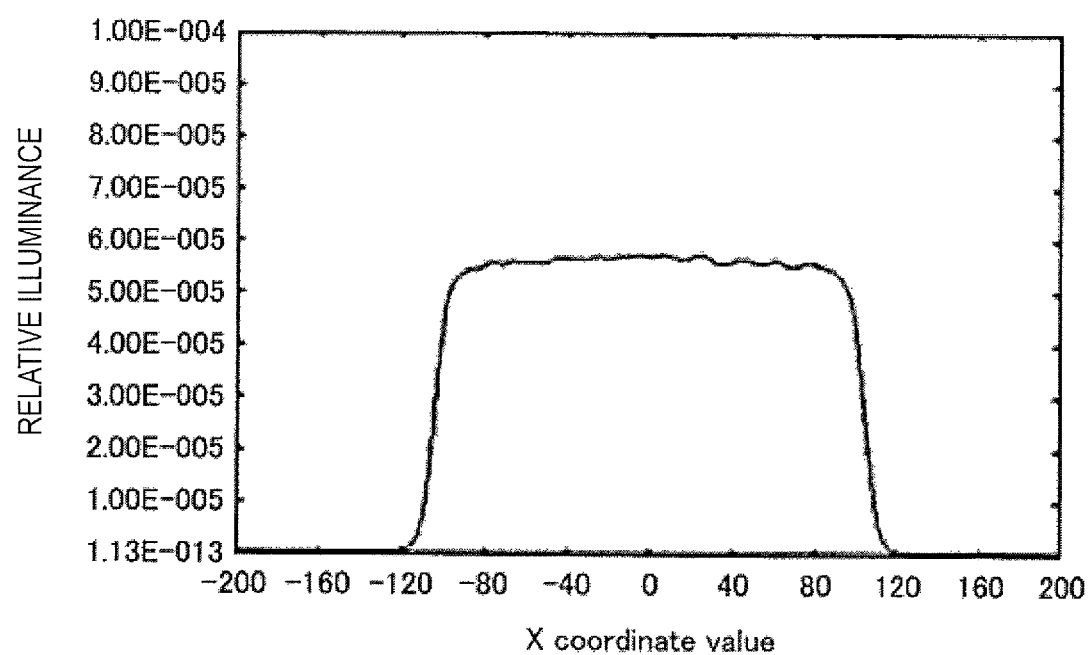
FIG. 8 A graph showing the relationship between the relative illuminance in the illumination intensity distribution shown in FIG. 7 and the illumination position.
Figure 9:
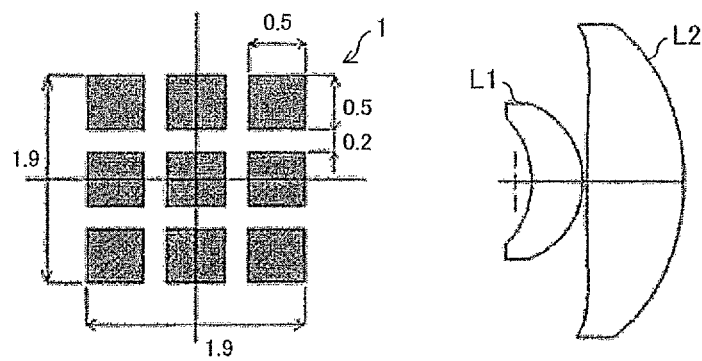
FIG. 9 (a) is a diagram showing an example where a plurality of minute light-emitting surfaces are arranged. (b) is a diagram showing an example where some of the minute light-emitting surfaces are dark. (c) is a chart showing the illumination intensity distribution in the case of FIG. 9(b).
Figure 9:
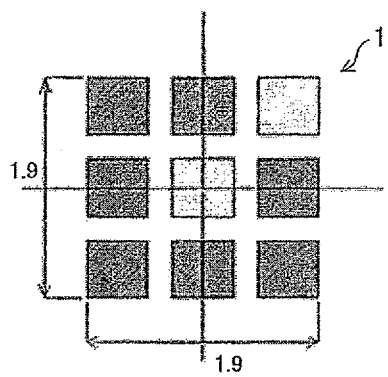
Figure 9:
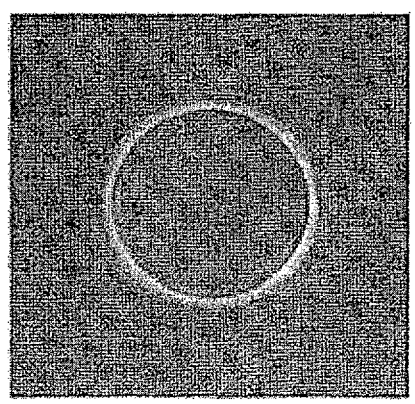
Figure 9:
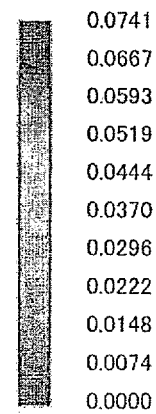

The cross-sectional profile of the illuminance distribution at the central portion was checked as shown in FIG. 7, and as a result, it was confirmed that generally uniform illuminance was achieved across the illumination region as shown in FIG. 8.

The lighting device of the present embodiment is capable of uniformly illuminating a predetermined illumination region not only when all regions of the emission surface of the light source 1 uniformly emit light but also when, for example, a plurality of minute emission surfaces are arranged over the emission surface of the light source 1 as shown in FIG. 9(a). For example, it is possible that a plurality of LED emitters are arranged over the emission surface of the light source 1.

As shown in FIG. 9(b), even when some of the plurality of minute emission surfaces arranged over the emission surface of the light source 1 emit smaller amounts of light, it is possible to uniformly illuminate a predetermined illumination region. This is because, as in the case that has been illustrated with reference to FIG. 5(a), even light coming from a location on the emission surface of the light source 1 which is away from the optical axis can illuminate the same illumination region as that illuminated by light coming from a location on the optical axis. That is, no matter which portion of the emission surface light comes from, the light can illuminate the same illumination region. Therefore, even when some portions of the emission surface emit smaller amounts of light, it would not affect the uniformity of illumination across the illumination region.

FIG. 9(c) shows the illuminance distribution produced by the emission surface of the light source 1 shown in FIG. 9(b). As also seen from this illuminance distribution, it would not affect the uniformity of illumination across the illumination region.

As shown in FIGS. 32(a) and 32(b), the plurality of minute emission surfaces of FIG. 9(a) may emit light of different dominant wavelengths. Alternatively, a plurality of light-emitting substances which emit light of different dominant wavelengths may be combined. In that case, light of different colors generally uniformly illuminate the same illumination region, and therefore, a lighting device which has wide color reproducibility can be realized.

By thus combining a plurality of light-emitting substances which emit light of different dominant wavelengths, colors from a wide range over the chromaticity coordinates can be reproduced.

Due to various variations in the manufacturing process of the light emitters, the LED light source have large variations in the emission characteristics, such as the amount of emission, the dominant wavelength of emission, the emission wavelength band, etc. In the existing procedures, in the case where the LED light source is used, light emitters which have similar emission characteristics are selected for use, and this selection process is a factor which increases the cost.

Assuming that one of the emission surfaces of the light source 1 shown in FIG. 9(a) is realized by one LED light source, even if the LED light sources that constitute the emission surface have varying emission characteristics as shown in FIG. 9(b), it would not affect the uniformity of illumination across the illumination region as shown in FIG. 9(c). Therefore, the variations of the LED light sources can be averaged within the illumination region. Thus, selection of the LED light sources is not necessary, and cost reduction can be realized.

As seen from these results, a plurality of light-emitting substances can be arranged, and therefore, even if one of the light-emitting substances is inoperative due to breakdown, the uniformity of the illumination region would not vary. Thus, it is not necessary to replace the entire lighting device, and extension of the life duration of the lighting device can be expected.

Figure 10:
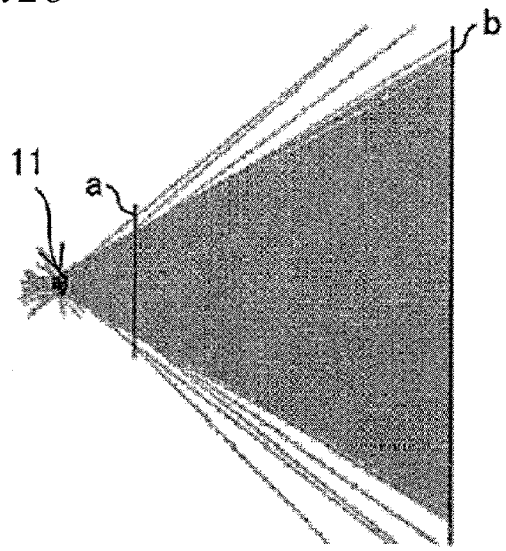
FIG. 10 A diagram showing the relationship between the lighting device and evaluation planes.
Figure 11:
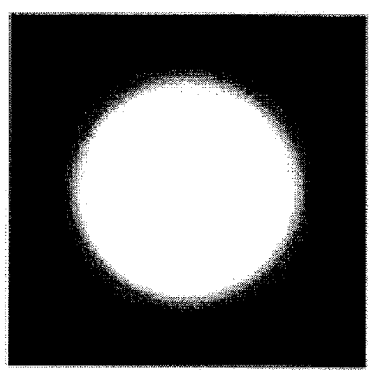
FIG. 11 (a) is a chart showing a two-dimensional illuminance distribution at the evaluation plane a shown in FIG. 10. (b) is a chart showing a two-dimensional illuminance distribution at the evaluation plane b shown in FIG. 10.
Figure 11:
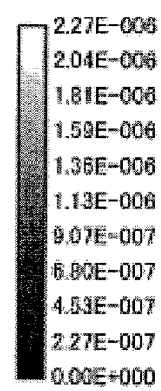
Figure 11:
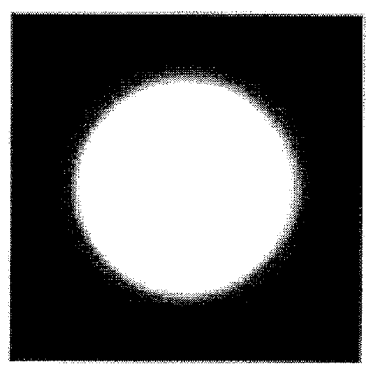
Figure 11:
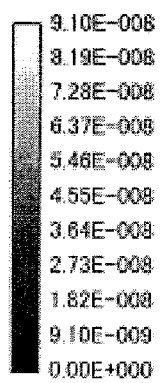

The cross-sectional illuminance distributions at places which are 1 m and 5 m distant from the lighting device 11 as shown in FIG. 10 are as shown in FIGS. 11(a) and 11(b).

FIG. 11(a) shows the cross-sectional illuminance distribution at a place which is 1 m distant from the lighting device 11. FIG. 11(b) shows the cross-sectional illuminance distribution at a place which is 5 m distant from the lighting device 11.

Although not shown in the drawings, even cross-sectional illuminance distributions at the places which are 2 m and 3 m distant, or distant by any other arbitrary distance, from the lighting device 11 are also uniform illuminance distributions as in FIGS. 11(a) and 11(b).

As seen from the foregoing, the cross-sectional illuminance distribution of light emitted from the lighting device 11 has uniform illuminance distribution at any position so long as it is distant by a certain distance or more. Here, the "certain distance or more" means an extent which is not less than twice the maximum diameter of the optical lenses L1, L2 that are constituents of the optical lens section 2 of the lighting device 11.

EXAMPLES

FIG. 12, FIG. 13

Figure 12:
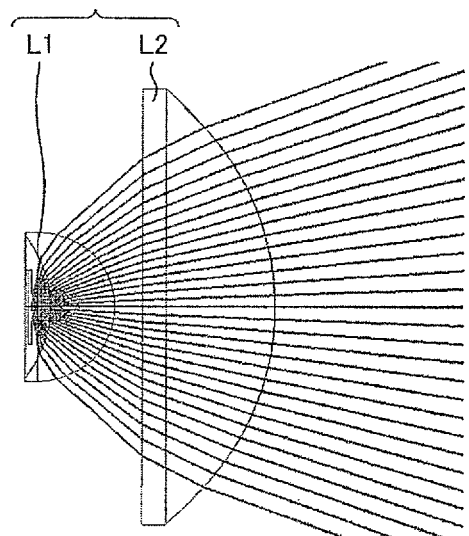
FIG. 12 (a) illustrates optical lens conditions under which the lighting device shown in FIG. 1 was actually manufactured. (b) is a chart showing the state of light projection in an illumination region formed when the lighting device shown in FIG. 1 was actually manufactured.
Figure 12:
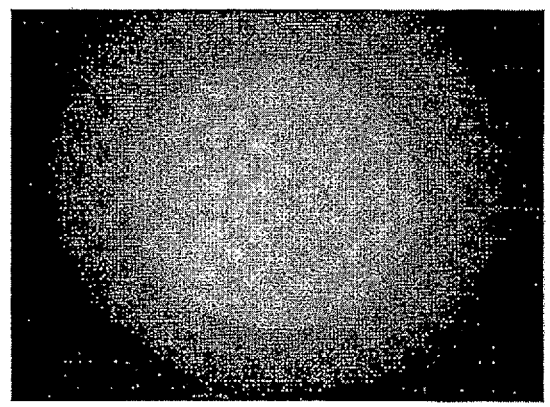

Now, a prototype example of the lighting device 11 of FIG. 1 is shown in FIG. 12(a).

The light source 1 used was a white LED package of about 6 mm×6 mm.

The first optical lens L1 of the optical lens section 2 was made of polycarbonate which had refractive index nd=about 1.585. The radius of curvature of the light entry surface provided on the light source side was 9.2 mm. The radius of curvature of the light exit surface was 6.0 mm. The lens outside diameter was 12 mm. The lens thickness was 5 mm.

The second optical lens L2 used was made of PMMA which had refractive index nd=about 1.49. The light entry surface was a flat surface. The radius of curvature of the light exit surface was 20.966 mm. The conic constant was 0.28119. The aspheric coefficients of high orders, $4^{th}$ order, $6^{th}$ order, $8^{th}$ order, $10^{th}$ order, and $12^{th}$ order, were $-5.2\times10^{-7}$, $-1.8914\times10^{-8}$, $3.4858\times10^{-10}$, $-9.7419=10^{-13}$, and $2.6235\times10^{-16}$, respectively. The lens outside diameter was 35 mm. The lens thickness was 10.5 mm.

The white LED package, the first optical lens L1, and the second optical lens L2 were arranged such that the centers of these elements were on the optical axis. Meanwhile, the distance along the optical axis between the emission surface of the white LED package and the light entry surface of the first optical lens L1 was 1.5 mm. The distance along the optical axis between the light exit surface of the first optical lens L1 and the light entry surface of the second optical lens L2 was 2.0 mm.

In that case, the focal lengths of the optical lenses L2, L1 were 18.52 mm and 42.47 mm, respectively, and the effective focal length of the optical lenses L2, L1 was 14.12 mm. In a scale where the emission surface of the light source section was at 0 (origin) and the direction of exit of light was the positive (+) direction, the focal positions f1, f2 of the optical lenses L1, L2 and the effective focal position f1+f2 were −11.30 mm, −26.94 mm, and −5.14 mm, respectively.

On the other hand, the positions of virtual images formed by the optical lenses L1, L2 (L1 virtual image, L2 virtual image) were deduced by calculation, and as a result, the position of the L1 virtual image was −1.61 mm, and the position of the L2 virtual image was −9.74 mm.

Thus, it was confirmed that, in the lighting device 11 that had the above-described configuration, the focal points f1, f2 of the optical lenses L1, L2 that were constituents of the optical lens section 2 were present on a side opposite to surfaces of corresponding virtual images (L1 virtual image, L2 virtual image) facing on the light source 1 relative to the respective virtual images formed by the optical lenses L1, L2 (L1 virtual image, L2 virtual image), i.e., the lighting device 11 was designed as shown in FIG. 1.

An illuminance experiment for the lighting device 11 that has the above-described configuration was carried out.

The result of this experiment is shown in FIG. 12(b). It was found from FIG. 12(b) that a predetermined illumination region was illuminated with uniform illuminance.

Figure 13:
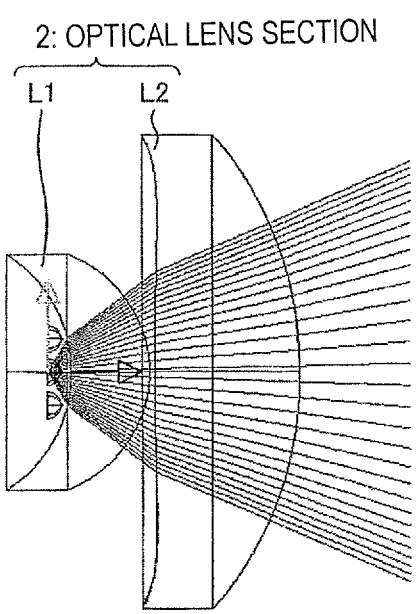
FIG. 13 (a) illustrates optical lens conditions under which the lighting device shown in FIG. 2 was actually manufactured. (b) is a chart showing the state of light projection in an illumination region formed when the lighting device shown in FIG. 2 was actually manufactured.
Figure 13:
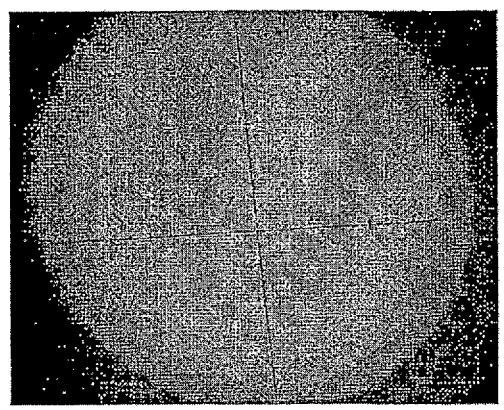

A prototype example of the lighting device 11 of FIG. 2 is shown in FIG. 13(a).

The light source 1 used was a white LED package with a diameter of 2 mm.

The first optical lens L1 of the optical lens section 2 was made of glass material SLAH53 which had refractive index nd=about 1.806. The radius of curvature of the light entry surface provided on the light source side was 2.96 mm. The radius of curvature of the light exit surface was 2.69 mm. The lens outside diameter was 5 mm. The lens thickness was 1.6 mm.

The second optical lens L2 used was made of PMMA which had refractive index nd=about 1.49. The radius of curvature of the light entry surface provided on the light source side was 65.4 mm. The conic constant of the light entry surface was −5.0. The aspheric coefficients of high orders, $4^{th}$ order, $6^{th}$ order, and $8^{th}$ order, were $-5.97 \times 10^{-5}$, $-7.927 \times 10^{-6}$, and $-7.278 \times 10^{-7}$, respectively. The radius of curvature of the light exit surface was 8.0 mm. The conic constant of the light exit surface was 0.73. The aspheric coefficients of high orders, $4^{th}$ order, $6^{th}$ order, $8^{th}$ order, $10^{th}$ order, and $12^{th}$ order, were $1.225 \times 10^{-4}$, $-3.777 \times 10^{-6}$, $1.054 \times 10^{-7}$, $-1.83 \times 10^{-9}$, and $4.2397 \times 10^{-11}$, respectively. The lens outside diameter was 10 mm. The lens thickness was 3.0 mm.

The white LED package, the first optical lens L1, and the second optical lens L2 were arranged such that the centers of these elements were on the optical axis. Meanwhile, the distance along the optical axis between the emission surface of the white LED package and the light entry surface of the first optical lens L1 was 0.5 mm. The distance along the optical axis between the light exit surface of the first optical lens L1 and the light entry surface of the second optical lens L2 was 0.1 mm.

In that case, the focal lengths of the optical lenses L2, L1 were 9.899 mm and 14.69 mm, respectively, and the effective focal length of the optical lenses L2, L1 was 5.81 mm. In a scale where the emission surface of the light source section was at 0 (origin) and the direction of exit of light was the positive (+) direction, the focal positions f1, f2 of the optical lenses L1, L2 and the effective focal position f1+f2 were −6.76 mm, −10.68 mm, and −2.85 mm, respectively.

On the other hand, the positions of virtual images formed by the optical lenses L1, L2 (L1 virtual image, L2 virtual image) were deduced by calculation, and as a result, the position of the L1 virtual image was −0.10 mm, and the position of the L2 virtual image was −0.75 mm.

Thus, it was confirmed that, in the lighting device that had the above-described configuration, the focal points f1, f2 of the optical lenses L1, L2 and the effective focal position f1+f2 were present on a side opposite to surfaces of all the virtual images (L1 virtual image, L2 virtual image) facing on the light source 1 relative to the respective virtual images formed by the optical lenses L1, L2 (L1 virtual image, L2 virtual image), i.e., the lighting device 11 was designed as shown in FIG. 2.

An illuminance experiment was carried out using the lighting device 11 that has the above-described configuration. The result of the illuminance experiment is shown in FIG. 13(b). As seen from FIG. 13(b), the lighting device 11 is capable of illuminating a predetermined illumination region with uniform illuminance.

Embodiment 2

Another embodiment of the present invention will be described below. Note that, for the sake of convenience of description, components which have identical functions as those of Embodiment 1 are designated by the same reference numerals, and detail description thereof is herein omitted.

Figure 14:
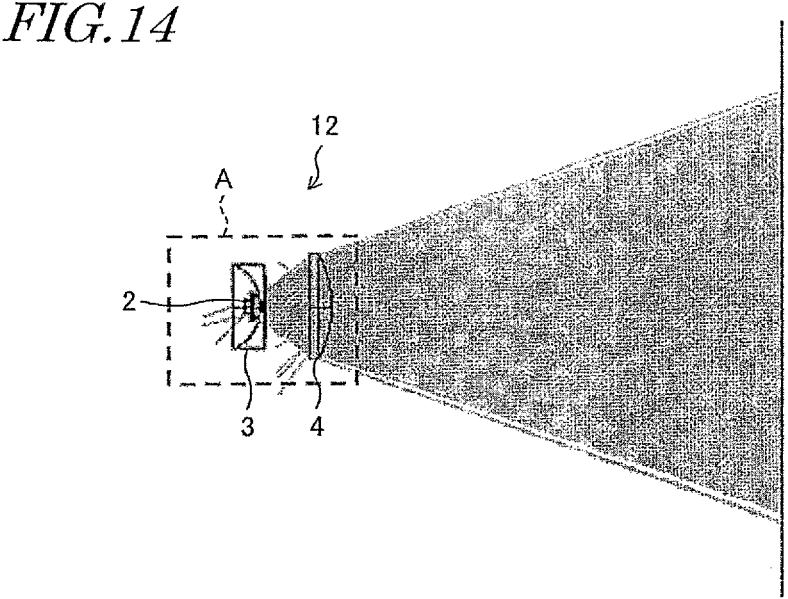
FIG. 14 A general configuration diagram of a lighting device according to another embodiment of the present invention.
Figure 15:
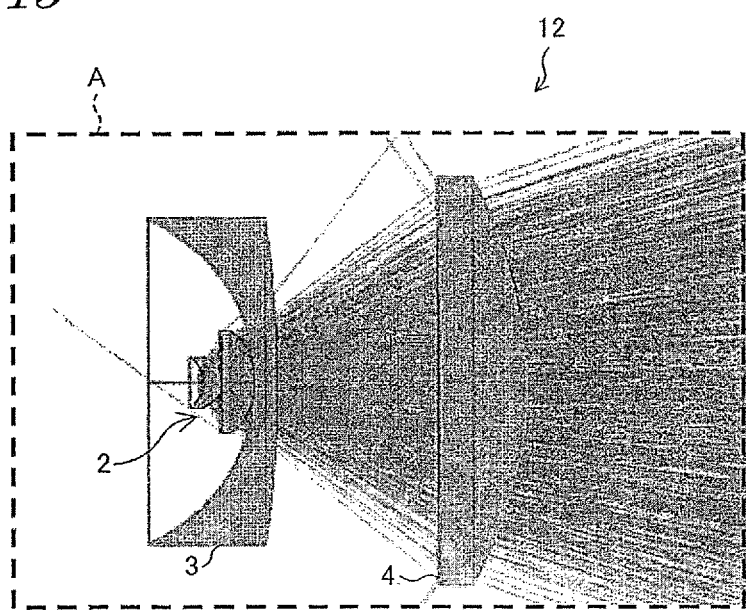
FIG. 15 An enlarged view of the major portion B of the lighting device shown in FIG. 14.

(Configuration of Lighting Device) . . . FIGS. 14 and 15

FIG. 14 is a diagram showing a general configuration of a lighting device 12 according to the present embodiment.

FIG. 15 is an enlarged view of the major portion A shown in FIG. 14.

The lighting device 12 has a configuration where optical lenses 3, 4 are further added on the light exit side of the optical lens section 2 of Embodiment 1 as shown in FIG. 14.

That is, where the above-described optical lens section 2 is referred to as the first optical lens section, the lighting device 12 has a configuration in which the second optical lens section formed by at least two optical lenses (optical lenses 3, 4) is provided on the light exit side of the first optical lens section.

The optical lens 3 is a concave lens. The optical lens 3 is closest to the optical lens section 2 and is arranged such that the concave surface side faces on the optical lens section 2.

The optical lens 4 is a convex lens. The optical lens 4 is more distant from the optical lens section 2 than the optical lens 3.

By thus further providing the optical lenses 3, 4 on the outer side of the optical lens section 2, the light exit angle of light emitted from the lighting device 12 can be narrowed as shown in FIG. 15.

Effects of Present Embodiment

FIG. 16 Through FIG. 19

Figure 16:
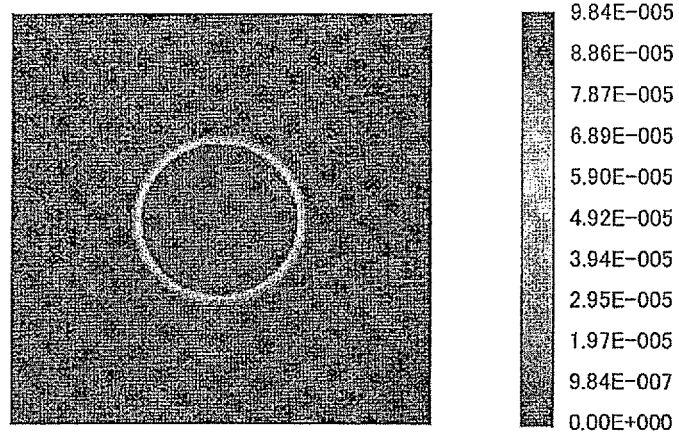
FIG. 16 A chart showing the illumination intensity distribution in the lighting device shown in FIG. 14.

In the lighting device 12 that has the above-described configuration, the lens shape of the added optical lenses 3, is optimized, whereby the illumination region can be uniformly illuminated as shown in FIG. 16.

In this case, to achieve both narrowing of the light exit angle and uniformity of the illumination region, it is more preferred to use a concave lens and a convex lens in combination as described above. This is because using the concave lens and the convex lens in combination enables mutual correction of aberrations occurring in the respective lenses and achievement of uniformity of the illumination region.

The arrangement of the added lenses is not limited to the arrangement positions of FIG. 14. The added lenses may be arranged at other positions.

Figure 17:
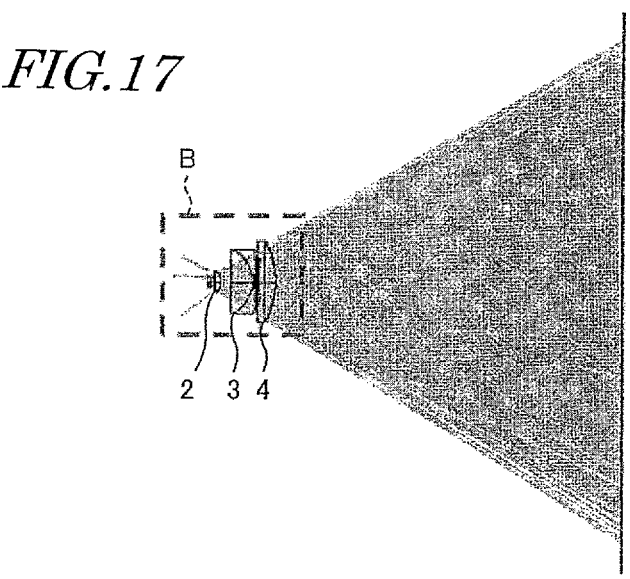
FIG. 17 A general configuration diagram of a lighting device according to still another embodiment of the present invention.

FIG. 17 is a diagram showing a general configuration of the lighting device 12 in which the optical lenses 3, 4 are placed at different positions from those of the optical lenses 3, 4 shown in FIG. 14.

Figure 18:
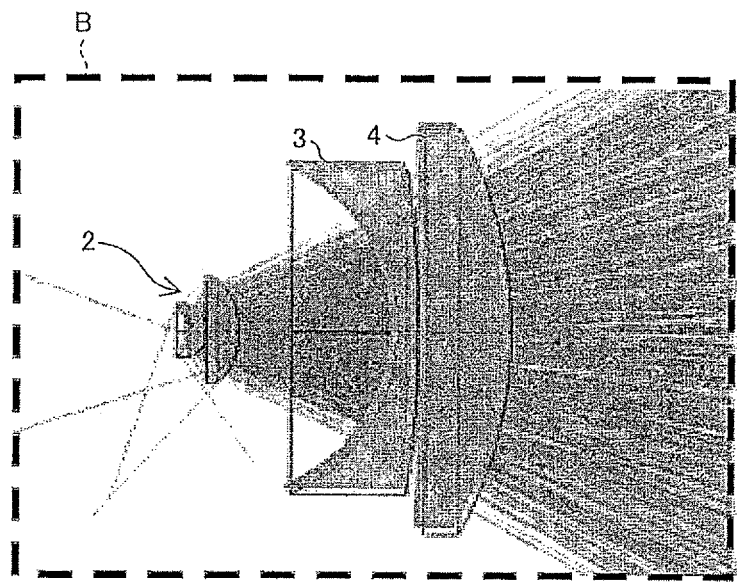
FIG. 18 An enlarged view of major portion B of the lighting device shown in FIG. 17.

FIG. 18 is an enlarged view of the major portion B shown in FIG. 17.

As shown in FIG. 17, part of the optical lenses 3, 4 added in FIG. 14 is placed at a different position, whereby the angular distribution of light emitted from the lighting device 12 can be changed.

Figure 19:
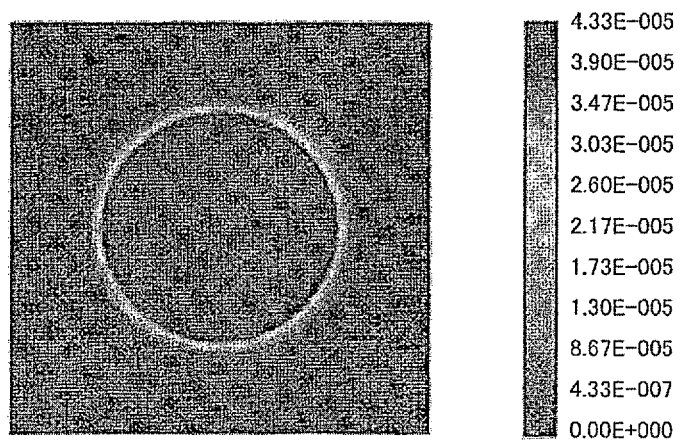
FIG. 19 A chart showing the illumination intensity distribution in the lighting device shown in FIG. 17.

Note that even when the angular distribution is changed, the illumination region can be generally uniformly illuminated as shown in FIG. 19.

As described above, by further adding the optical lenses 3, 4 on the light exit side in the lighting device 11 that has been described in Embodiment 1, the light exit angle can be narrowed. Further, by changing the arrangement of the added optical lenses, the light exit angle can also be adjusted (controlled).

Even when the optical lenses 3, 4 are added to control the light exit angle as described hereinabove, the illuminance uniformity across the illumination region can be maintained in each case as shown in FIG. 16 and FIG. 19.

Note that the second optical lens section is not limited to the optical lenses 3, 4 shown in FIG. 14. For example, a plurality of optical lenses which are combined so as to have the same optical characteristics as those of the optical lens 3 may be used in place of the optical lens 3. The number of optical lenses included in the second optical lens section is not particularly limited.

As the number of optical lenses increases, improvement of the in-plane uniformity and control of the light projection angle are achieved more easily. On the other hand, however, it is necessary to consider various disadvantages, such as decrease of the light transmittance due to an increased number of lens interfaces, and increase of cost due to an increased number of lenses.

Embodiment 3

Still another embodiment of the present invention will be described below. Note that, for the sake of convenience of description, components which have identical functions as those of Embodiments 1 and 2 are designated by the same reference numerals, and detail description thereof is herein omitted. In an example described in this section, two optical lenses of the optical lens section 2 are integrated together.

Figure 20:
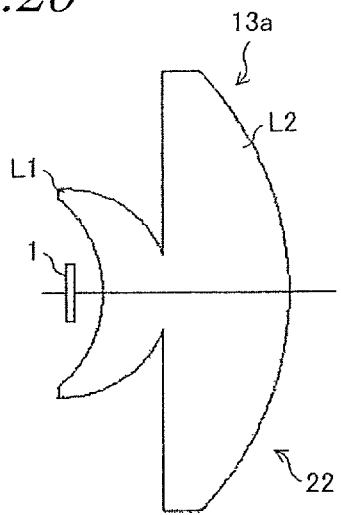
FIG. 20 A general configuration diagram of a lighting device according to still another embodiment of the present invention.
Figure 21:
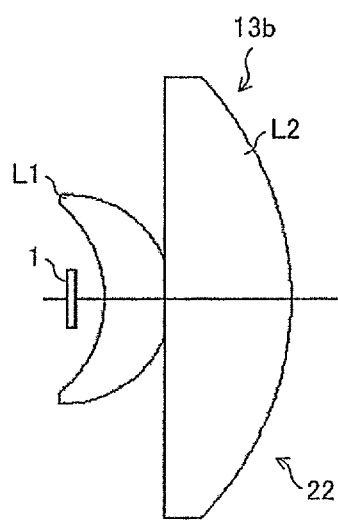
FIG. 21 A general configuration diagram of a lighting device according to still another embodiment of the present invention.

(Configuration of Lighting Device) . . . FIGS. 20 and 21

FIG. 20 is a diagram showing a general configuration of a lighting device 13a according to the present embodiment.

FIG. 21 is a diagram showing a general configuration of a lighting device 13b according to the present embodiment.

The lighting device 13a shown in FIG. 20 is an example where the optical lenses L1, L2 are integrally molded to form an optical lens section 22.

Specifically, the optical lenses L1, L2 are integrally molded with a die using a resin such as an acrylic material to form the optical lens section 22.

On the other hand, the lighting device 13b shown in FIG. 21 is an example where the optical lenses L1, L2 are adhered together to form an optical lens section 23.

Specifically, a lens which is close to the emission surface of the light source 1 (optical lens L1) and a lens which is distant from the emission surface of the light source 1 (optical lens L2) are separately molded, and then, the lenses are adhered together at about the centers of the lenses to form the optical lens section 23.

The optical lens shapes are now compared between the optical lens section 2 illustrated in Embodiment 1 (FIG. 1) and the optical lens section 22 shown in FIG. 20. In either case, light emitted at a wide angle from the light source 1 greatly changes its traveling direction due to refraction at the same four air interfaces.

On the other hand, light emitted in a direction perpendicular to the light source in FIG. 1 is generally perpendicularly incident upon the respective air interfaces of the optical lens section 2. Therefore, even when portions at about the center of the optical lens section 22 are in contact with each other or joined together as shown in FIG. 20, uniformity of the illumination region is realized while the light exit angle distribution is not largely affected.

Effects of Present Embodiment

Figure 22:
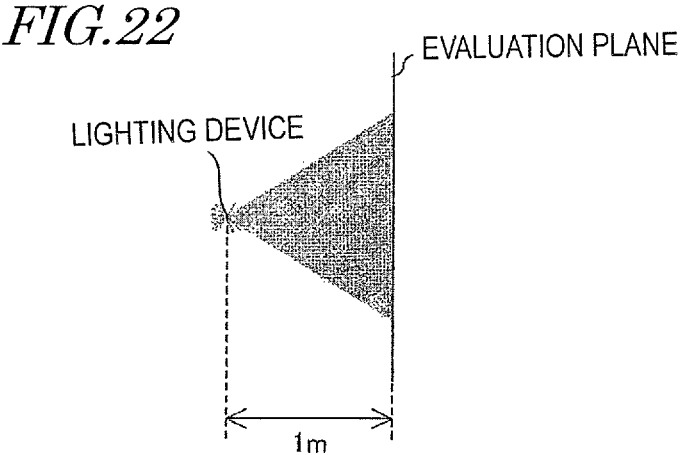
FIG. 22 A diagram showing the relationship between the lighting device and the evaluation plane.
Figure 23:
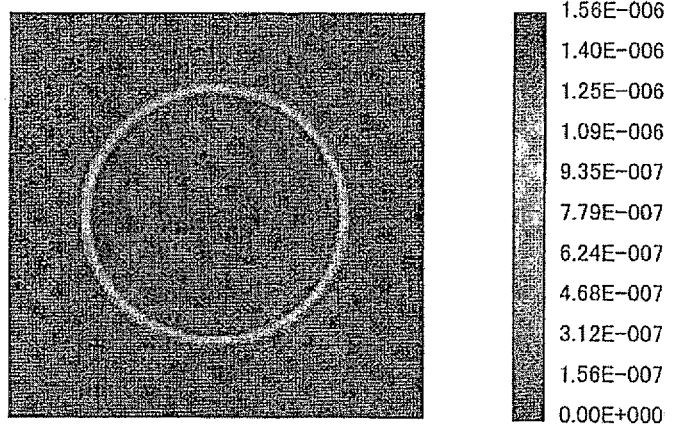
FIG. 23 A chart showing the illumination intensity distribution at the evaluation plane shown in FIG. 22.

FIGS. 22 and 23

In the lighting device 13a that includes the optical lens section 22 in which the optical lens is integrally molded as shown in FIG. 20, when the evaluation plane is placed at a position which is 1 m distant from the lighting device 13a so as to be parallel to the emission surface as shown in FIG. 22, the illuminance distribution across the illumination region is generally uniform as shown in FIG. 23.

Thus, the merit of adhering together two lenses that are constituents of an optical lens lies in cost reduction due to simplified alignment of the emission surface and the optical lens. Also, the procedure of fixing the emission surface and the optical lens during use can be simplified.

Further, the merit of integrally molding an optical lens includes not only cost reduction due to the aforementioned simplified alignment and fixing procedure but also cost reduction due to decrease of the molding cycles from two cycles to one cycle. Also, the process of adhering two lenses together can be omitted, and this contributes to cost reduction.

Figure 24:
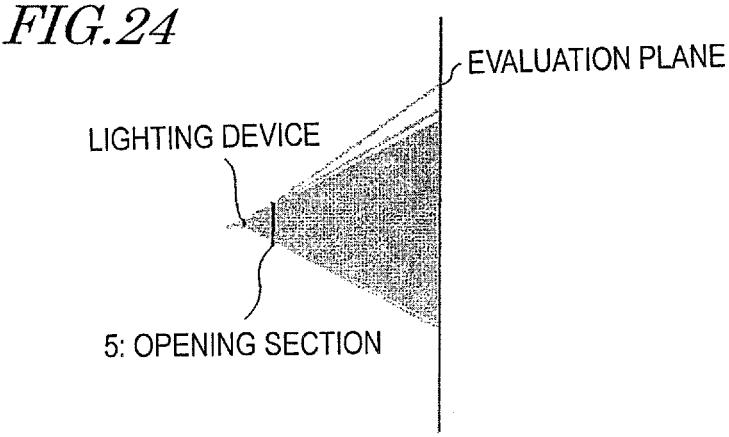
FIG. 24 A diagram showing the relationship between the lighting device and the evaluation plane.
Figure 25:
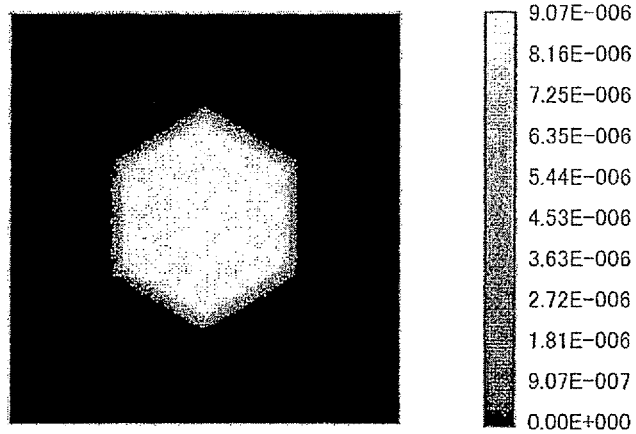
FIG. 25 A chart showing the illumination intensity distribution at the evaluation plane shown in FIG. 24.

<Variation> . . . FIGS. 24 and 25

FIG. 24 shows a case where a hexagonal opening (aperture) section 5 is provided on the light exit side of the above-described lighting device 11 of Embodiment 1. Only part of light emitted from the above-described lighting device 11 traveling toward the hexagonal opening section 5 passes through the hexagonal opening section 5 while the remaining part of the light is reflected or absorbed.

FIG. 25 shows a two-dimensional illuminance distribution achieved in a case where the evaluation plane is 1 m distant from the lighting device 11. In this case, it is possible to illuminate the evaluation plane such that the illumination region has a shape approximately equal to that of the opening section 5 and the illuminance across the illumination region is uniform. Further, even when the evaluation plane is distant from the surface light source or the lighting device, illumination is also achieved while the shape and uniformity of the illumination region are maintained.

Figure 26:
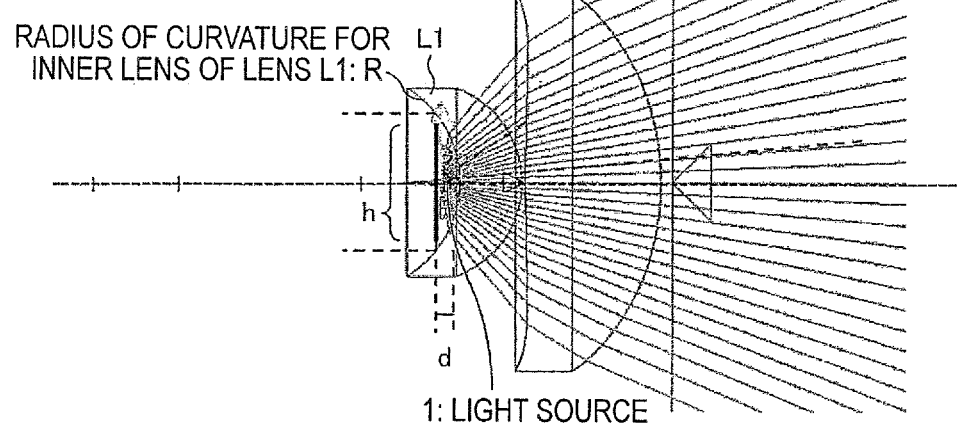
FIG. 26 A diagram for illustrating the placement range of a light emission section in the lighting device of the present invention.

<Supplementary Explanation> . . . FIG. 26

(1) The limit of the arrangement range of the light source 1 is explained with reference to FIG. 26.

The arrangement range of the above-described light source 1 is preferably limited within a range which satisfies the following formula:

$$h \leq 2\sqrt{(d(2R-d))}$$

Here, h is the width of the arrangement range of the light emission section, d is the distance from the light source to the optical lens L1 interface on the optical axis, and R is the radius of curvature of the inner lens of the optical lens L1.

By arranging the light source 1 within the above-described range, all of the light emitted from the light source 1 can be brought into the optical lens L1 that is the first lens, so that the light utilization efficiency can be improved.

(2) The relationship between the focal position and virtual image position of the optical lens section 2 and the position of the light source is explained.

As in the above-described configuration, the focal position of the optical lens section 2 that is provided on the light exit surface side of the light source 1 is placed at a distant position behind the positions of the L1 virtual image and the L2 virtual image formed by the optical lenses L1, L2 (in a direction opposite to the light exit side of the lens), whereby the positions of the light source 1 and the virtual images (L1 virtual image, L2 virtual image) are moved relatively close to the optical lens section 2.

In this case, the following formula holds:

$$1/a - 1/b = 1/f \qquad (1)$$

where f is the distance from the lens principal point to the focal position of the optical lens section 2, a is the distance from the lens principal point to the light source, and b is the distance from the lens principal point to the virtual image. Here, the lens principal point refers to a position of a thin lens in the case where the lens is replaced by the thin lens whose lens thickness is negligible, in which only behaviors of a light ray coming into the lens and a light ray outgoing from the lens are represented.

In the lighting device 11 that has the above-described configuration, the virtual image positions are relatively close to the optical lens section 2 as compared with the focal positions f1, f2 of the optical lenses L1, L2. Therefore, the following formula holds:

$$f > b \quad (2)$$

Here, the following formula is deduced from formula (1) shown above:

$$1/a = 1/b + 1/f = (b+f)/bf \quad (3)$$

Formula (3) can be further developed into the following formula:

$$a = bf/(b+f) = f/(1+f/b) \quad (4)$$

Here, the following formula is deduced from formula (2):

$$f/b > 1 \quad (5)$$

Therefore, assigning formula (5) to formula (4) leads to the following formula:

$$a < f/2$$

That is, by making the distance a from the lens principal point to the light source shorter than a half of the distance f from the lens principal point to the focal position, the virtual image position can always be relatively close to the optical lens as compared with the focal position of the optical lens.

(3) Since part of the light is reflected at the lens interfaces of the optical lens section 2, it is more preferred that the lens surface of each optical lens is provided with a surface treatment for antireflection purposes. A common example of the surface treatment for antireflection purposes is an antireflection film consisting of a plurality of thin films which have different refractive indices for reducing the surface reflection. Another example is to form a minute uneven shape of not more than one micrometer (moth-eye structure) over the lens surface of each optical lens for reducing the interface reflection.

The method of reducing the interface reflection at the lens surface of each optical lens is not limited to the above-described example.

(4) The emission wavelength of the light source section is not limited to visible light. A light-emitting element which is capable of emitting at ultraviolet or infrared wavelengths may be used.

(5) In the embodiment described hereinabove, the shape of each lens is a shape of rotational symmetry, although the present invention is not limited to this example. It may be a lenticular shape evenly extending in the depth direction of the drawing. In this case, the effects are achieved only in a direction parallel to the lens cross-sectional direction of the lenticular-shaped lens. For example, this is suitable to a case where a cold cathode tube or LED lamps which are arranged in series are used as the light source. Combining a stick-shaped light source section and a lenticular-shaped optical lens enables the uniform illumination region to have a rounded rectangular shape.

[Lighting Device to Form Non-Circular Illumination Region (Embodiments 4-1 Through 4-7)]

Hereinafter, lighting devices configured to form a non-circular illumination region using an optical lens which includes a plurality of unit faces over a lens surface will be described.

Embodiment 4-1

Figure 33:
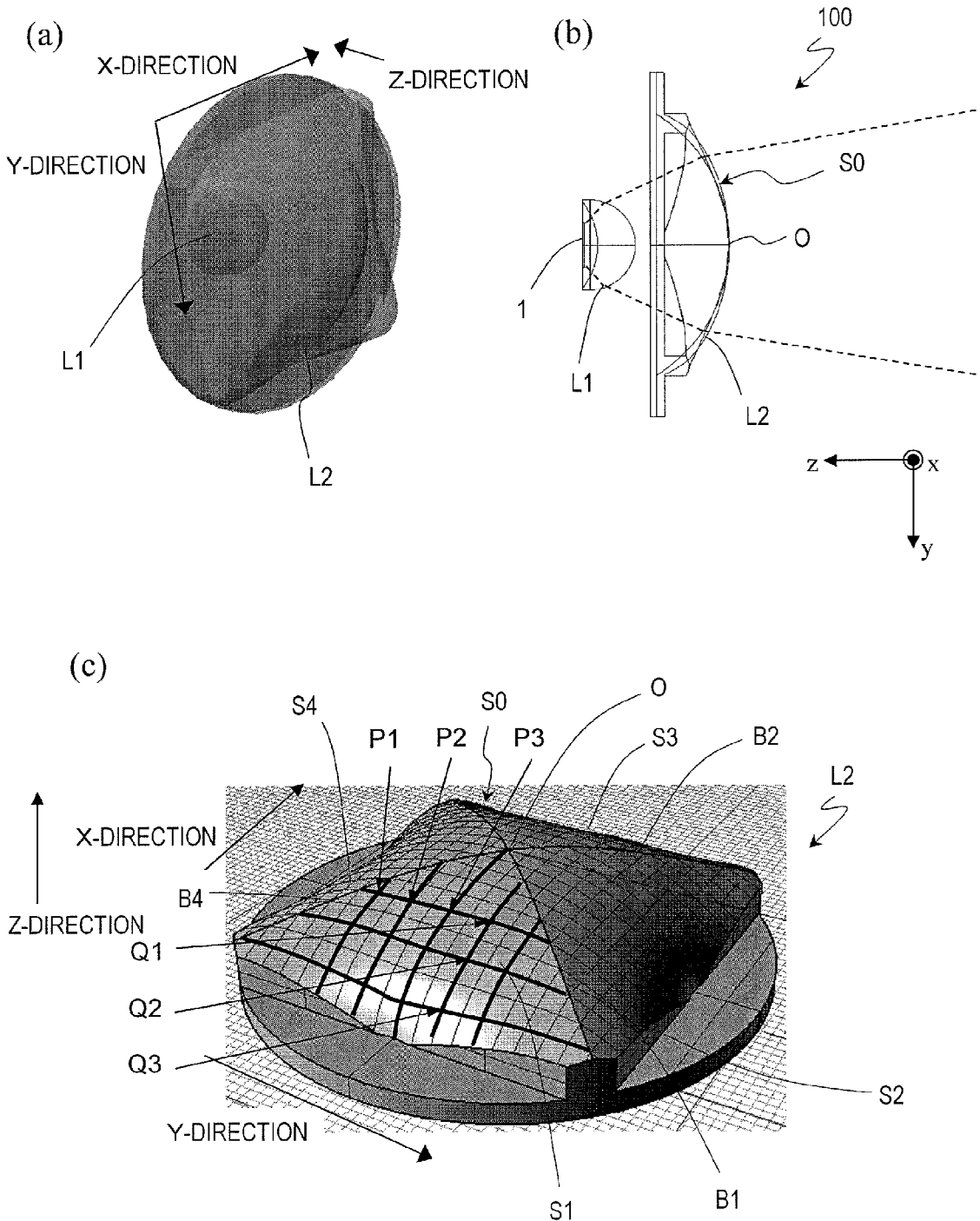
FIG. 33 Diagrams showing a lighting device according still another embodiment of the present invention. ($a$) is a perspective view showing a portion near a light source section of the lighting device. ($b$) is a cross-sectional view (side view). ($c$) is a perspective view of the second lens.

FIGS. 33(a) and 33(b) are a perspective view and cross-sectional view showing a lighting device 100 of Embodiment 4-1. FIG. 33(c) is a perspective view showing the shape of the light exit side surface of a second lens L2.

As shown in FIG. 33(b), the lighting device 100 includes a surface light source 1, a first lens L1 provided on the light exit side of the surface light source 1, and a second lens L2 provided on the light exit side of the first lens L1. The center of the surface light source 1 and the lens surface centers of the lenses L1, L2 are aligned on one straight line (optical axis). The distance between the light exit surface of the surface light source 1 and the principal point of the first lens L1 is, for example, not less than the depth of the cavity of a concaved light entry surface of the first lens L1 and not more than the thickness of the first lens L1. The distance between the principal point of the first lens L1 and the principal point of the second lens L2 is, for example, not less than the distance between the principal points in the case where the first lens L1 and the second lens L2 are in contact with each other and not more than the distance of D/(2·tan(α)) where α is the angle of a light ray outgoing from the first lens L1 and D is the aperture diameter of the second lens L2.

Note that the optical system provided in the lighting device 100 may be configured to further include other optical elements than the first lens L1 and the second lens L2. Hereinafter, however, the configuration of the surface light source 1, the first lens L1, and the second lens L2 is described.

The surface light source 1 may be configured to include a plurality of light-emitting elements (e.g., a plurality of LEDs) arranged over the emission surface as in the above-described embodiments. In this case, the planar shape of the emission surface of the surface light source 1 may be defined by the perimeter shape of a region in which the plurality of light-emitting elements are arranged. For example, it is a quadrangular shape, although the present invention is not limited to this example. It may be a circular shape. The size of the emission surface of the surface light source 1 is, for example, set with the effective diameter of the concaved light entry surface of the first lens L1 being the maximum.

In the present embodiment, the first lens L1 is a convex meniscus lens which is provided so as to cover the entirety of the surface light source 1. The light entry surface of the first lens L1 is formed by a concave curved surface, and the light exit surface is formed by a convex curved surface. These light entry surface and light exit surface may be any of a spherical surface, an aspherical surface, and a free curved surface.

The second lens L2 generally has the shape of a plano-convex lens. The light entry surface of the second lens L2 is a flat surface. The light exit surface S0 of the second lens L2 generally has a convex surface shape. Note that, however, in the present embodiment, the light exit surface S0 of the second lens L2 is configured to include a non-revolution surface as the lens surface.

The term "non-revolution surface" used in this specification is now described. In this specification, the "non-revolution surface" means any curved surface which is not a "revolution surface". The "revolution surface" means a surface of a solid of revolution that is formed by rotating a line segment (straight line or curve) which serves as a generatrix around a rotation axis. In general, a surface of a lens included in an optical system is configured to form a revolution surface around the optical axis as the rotation axis. Such a revolution surface (lens surface) is sometimes called "axisymmetric revolution surface".

The "revolution surface" always forms a line segment (generatrix) of the same shape in an arbitrary cross section including the rotation axis. On the other hand, the "non-revolution surface" forms, in some cases, line segments of different shapes in different cross sections including the rotation axis.

In this specification, the terms "body of rotational symmetry" and "property of rotational symmetry" are also used. The "body of rotational symmetry" means a body which is rotationally symmetrical about a predetermined axis. For example, a cube is a body of rotational symmetry which is 4-fold symmetrical about an axis extending through a face center. A surface of a "body of rotational symmetry" has a "property of rotational symmetry" about the aforementioned predetermined axis.

In various embodiments which will be described later, for example, a lens used for formation of a square illumination region has a "non-revolution surface" at its lens surface and, meanwhile, has a "property of rotational symmetry" of 4-fold symmetry about the optical axis. Also, for example, a lens used for formation of an equilateral triangular illumination region has a "non-revolution surface" at its lens surface and, meanwhile, has a "property of rotational symmetry" of 3-fold symmetry about the optical axis.

Again, the second lens L2 of the present embodiment is described. The second lens L2 is a body of 4-fold rotational symmetry about an axis extending through the center O of the lens surface and perpendicular to the lens surface (typically, identical with the optical axis). In this configuration, the light exit surface S0 of the second lens L2 has four unit faces S1 to S4. The four unit faces S1 to S4 are separated by four boundary lines B1 to B4 extending outward from the center O of the lens surface which is placed on the optical axis. In the lighting device 100 of the present embodiment, an illumination region which has a generally square shape is realized by using a lens in which a non-revolution surface including such four unit faces S1 to S4 is formed.

Note that light which has passed through the first lens L1 is incident upon a region within a predetermined range extending from the lens surface center O of the second lens L2 and, typically, not incident upon a portion near the perimeter of the lens surface S0. Therefore, in the present embodiment, the perimeter shape of the lens surface S0 is not particularly limited and is not necessarily limited to a quadrangular shape.

Each of the four unit faces S1 to S4 is a free curved surface. Each free curved surface has different curvatures in the x-direction and the y-direction (which are orthogonal to each other) shown in FIGS. 33(a) and 33(c). The four unit faces S1 to S4 are symmetrically arranged about an axis extending through the center O of the lens surface and parallel to the z-direction (a direction orthogonal to the x-direction and the y-direction). The four unit faces S1 to S4 have substantially equal curvature distributions.

The boundary lines B1 to B4 provided between the above-described four unit faces S1 to S4 correspond to portions at which the curvature varies discontinuously. A known example of the lens that have boundary lines at which the curvature varies discontinuously is a Fresnel lens which has concentric boundary lines. However, the boundary lines B1 to B4 formed in the lenses of the lighting devices of the embodiments of the present invention are of a different type from the boundary lines formed on the surface of the Fresnel lens, i.e., are not concentrically arranged boundary lines.

Next, the unit faces S1 to S4 are described more specifically. Hereinafter, the unit face S1, which is one of the four unit faces shown in FIG. 33(c), is only described although the same description applies to the other unit faces S2 to S4.

On the unit face S1, there are three points P1, P2, P3 which are aligned in the y-direction shown in FIG. 33(c). The unit face S1 is formed so as to satisfy the following formula:

$$Rx1 \neq Rx2 \neq Rx3$$

where Rx1, Rx2, Rx3 are the radii of curvature in the x-direction at the points P1, P2, P3, respectively.

Note that, in the embodiment shown in the drawing, the curved surface is determined so as to satisfy the relationship of Rx1>Rx2>Rx3, although this relationship is merely exemplary. The present invention is not limited to this example. In some cases, the curved surface may satisfy the relationship of Rx1<Rx2<Rx3.

Also, the three points P1, P2, P3 are present on a curve which has an equal curvature in the y-direction. At the respective points, the curvatures in the y-direction are equal to one another.

On the other hand, as shown in FIG. 33(c), on the unit face S1, there are three points Q1, Q2, Q3 which are aligned in the x-direction. The unit face S1 is formed so as to satisfy the following formula:

$$Ry1 \neq Ry2 \neq Ry3$$

where Ry1, Ry2, Ry3 are the radii of curvature in the y-direction at the three points Q1, Q2, Q3, respectively.

In the embodiment shown in the drawing, the curved surface is determined so as to satisfy the relationship of Ry1>Ry2>Ry3, although this relationship is merely exemplary. The present invention is not limited to this example. In some cases, the curved surface may satisfy the relationship of Ry1<Ry2<Ry3.

Also, the three points Q1, Q2, Q3 are present on a curve which has an equal curvature in the x-direction. At the respective points, the curvatures in the x-direction are equal to one another.

That is, each of thick lines extending in the y-direction shown in the drawing (e.g., curves extending through P1, P2, P3) is the set of points which have different curvatures in the x-direction and have equal curvatures in the y-direction. Each of thick lines extending in the x-direction shown in the drawing (e.g., curves extending through Q1, Q2, Q3) is the set of points which have different curvatures in the y-direction and have equal curvatures in the x-direction.

Next, a specific design of the above-described lens surface is described.

Table 1 presented below shows the height in the z-direction at the respective x, y coordinates (the lens thickness at the respective points) over the unit face S1 in the x-y plane including the x-direction and the y-direction in FIG. 33(c) (a plane orthogonal to the optical axis). The lens height at the respective x, y coordinates, z=f(x, y), is defined by, for example, the following formula:

$$f(x,y) = -c_y x^2 / (1 + (1 - (1+k) c_y^2 x^2)^{1/2}) - c_x y^2 / (1 + (1 - c_x^2 y^2)^{1/2})$$

Here, $c_y$ is 1/Ry, $c_x$ is 1/Rx, and k is the conic constant (shown as "Conic Cy" in Table 1). The lens height z is a value that is obtained relative to the height at the lens center O which is zero (0).

TABLE 1

| Radius of Curvature Ry | Conic Cy | y | Radius of Curvature Rx | | | | | | | | | | |
|---|---|---|---|---|---|---|---|---|---|---|---|---|---|
| | | | 54 | 53.4 | 52.8 | 52.2 | 51.6 | 51 | 50.4 | 49.8 | 49.2 | 48.6 | 48 |
| | | x | −17.5 | −15.8 | −1.4 | −12.3 | −10.5 | −8.75 | −7 | −5.25 | −3.5 | −17.5 | 0 |
| 53.992 | 1.5 | −17.5 | −5.97 | | | | | | | | | | |
| 48.52 | 1.5 | −15.75 | −5.81 | −5.13 | | | | | | | | | |
| 43.732 | 1.5 | −1.4 | −5.79 | −4.98 | −4.3 | | | | | | | | |
| 39.628 | 1.5 | −12.25 | −5.91 | −4.94 | −4.14 | −3.48 | | | | | | | |
| 36.208 | 1.5 | −10.5 | −6.17 | −5.01 | −4.08 | −3.31 | −2.69 | | | | | | |
| 33.472 | 1.5 | −8.75 | −6.57 | −5.16 | −4.08 | −3.21 | −2.51 | −1.95 | | | | | |
| 31.42 | 1.5 | −7 | −7.07 | −5.37 | −4.11 | −3.14 | −2.37 | −1.77 | −1.29 | | | | |
| 30.052 | 1.5 | −5.25 | −7.59 | −5.55 | −4.15 | −3.09 | −2.27 | −1.62 | −1.12 | −0.75 | | | |
| 29.020 | 1.5 | −3.5 | −8.22 | −5.70 | −4.22 | −3.08 | −2.21 | −1.52 | −1 | −0.61 | −0.34 | | |
| 28.342 | 1.5 | −1.75 | −8.91 | −5.95 | −4.29 | −3.09 | −2.18 | −1.47 | −0.93 | −0.53 | −0.25 | −0.09 | |
| 28 | 1.5 | 0 | −9.49 | −6.08 | −4.34 | −3.11 | −2.18 | −1.46 | −0.91 | −0.5 | −0.22 | −0.05 | 0 |
| 28.342 | 1.5 | 1.75 | −8.91 | −5.95 | −4.29 | −3.09 | −2.18 | −1.47 | −0.93 | −0.53 | −0.25 | −0.09 | |
| 29.026 | 1.5 | 8.5 | −8.22 | −5.76 | −4.22 | −3.08 | −2.21 | −1.52 | −1 | −0.61 | −0.34 | | |
| 30.052 | 1.5 | 5.25 | −7.59 | −5.55 | −4.15 | −3.09 | −2.27 | −1.62 | −1.12 | −0.75 | | | |
| 31.42 | 1.5 | 7 | −7.07 | −5.37 | −4.11 | −3.14 | −2.37 | −1.77 | −1.29 | | | | |
| 33.472 | 1.5 | 8.75 | −6.57 | −5.16 | −4.08 | −3.21 | −2.51 | −1.95 | | | | | |
| 36.208 | 1.5 | 10.5 | −6.17 | −5.01 | −4.08 | −3.31 | −2.69 | | | | | | |
| 39.628 | 1.5 | 12.25 | −5.91 | −4.94 | −4.14 | −3.48 | | | | | | | |
| 43.732 | 1.5 | 1.4 | −5.79 | −4.98 | −4.3 | | | | | | | | |
| 48.52 | 1.5 | 15.75 | −5.81 | −5.13 | | | | | | | | | |
| 53.992 | 1.5 | 17.5 | −5.97 | | | | | | | | | | |

Note that the lens design which has been described above is merely exemplary. As a matter of course, the free curved surface may be defined using a different formula. For example, each of the unit faces S1 to S4 may be a free curved surface whose curvatures in the x-direction and the y-direction are determined using an aspheric formula including an aspheric function which includes terms of higher orders and aspheric coefficients of high orders corresponding to those terms.

The shape of the free curved surface may be appropriately determined according to the shape of a desired illumination region. For example, by setting the above-described radii of curvature Rx and Ry to relatively small values (i.e., by setting the curvatures to large values), the vertical and horizontal dimensions of the illumination region can be made relatively small.

In the lighting device 100 that has the above-described configuration, light emitted from the surface light source 1 is converged by the first lens L1 that is a convex meniscus lens and then refracted by the second lens L2 that includes the four unit faces S1 to S4 over the lens surface, whereby the light is incident upon a generally square region on the screen.

As shown in FIGS. 27(b) to 27(f), by designing the optical system such that the focal point F2 of the second lens L2 is placed at a position which is more distant than the virtual image I1 formed by the first lens L1 and which is more distant than the reference focal point f', a homogeneous illumination region can be realized in which the illuminance unevenness is not conspicuous.

Figure 34:
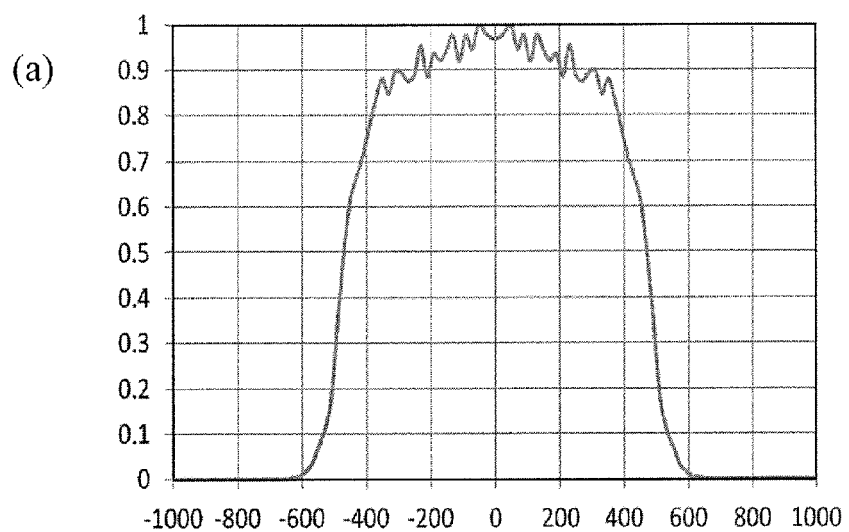
FIG. 34 ($a$) shows an illuminance distribution achieved by the lighting device shown in FIGS. 33. ($b$) and ($c$) show the shape of the illumination region.
Figure 34:
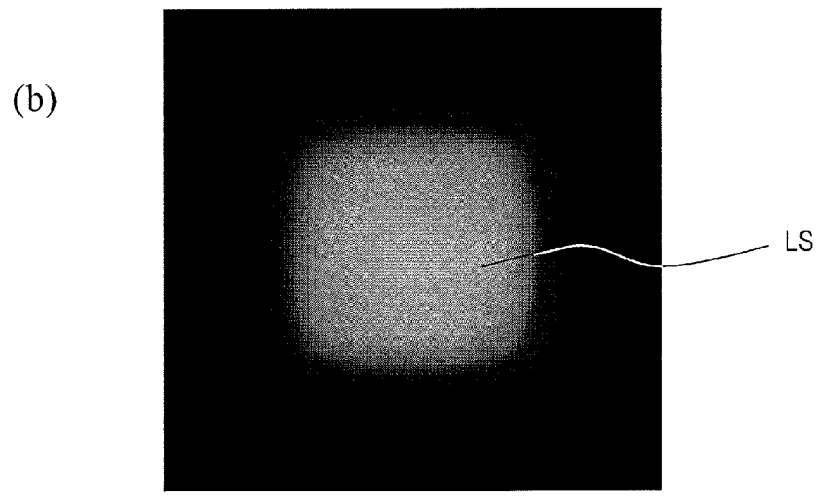
Figure 34:
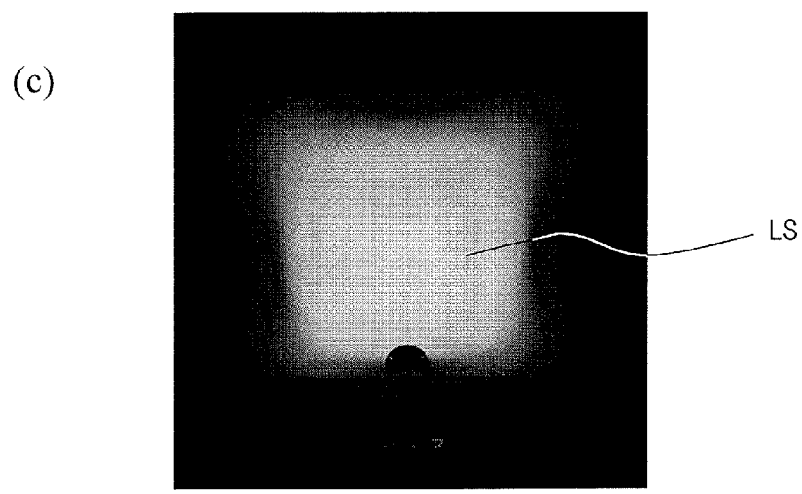

FIG. 34(a) shows the illuminance distribution across a region illuminated by the lighting device 100. FIGS. 34(b) and 34(c) show a planar shape of the illumination region (spot shape LS). Note that FIG. 34(b) shows a spot shape obtained from the design values of the optical system. FIG. 34(c) shows a spot shape obtained using an actually manufactured optical system.

As shown in the drawings, by providing a lens surface of a non-revolution surface consisting of the above-described four free curved surfaces at the light exit surface S0 of the second lens L2, a generally square spot shape LS can be realized. In the present embodiment, light from the light source is refracted by the lens surface such that the light is converged into a quadrangular shape without blocking part of the light from the light source by a light blocking member or the like, the light utilization efficiency can be improved.

As a result of a calculation by simulation, it was confirmed that according to the lighting device 100 of the present embodiment the light utilization efficiency of the light reaching an illumination region which is 1 m ahead is about 80%. Here, the light utilization efficiency means the ratio of the amount of light reaching a surface to be illuminated which is 1 m ahead after passage through the lens to the amount of light emitted from the light source section to the air. The lighting device 100 of the present embodiment includes the light source section and two lenses, i.e., the minimum necessary basic elements, and none of the basic elements absorbs or blocks light. It is therefore inferred that such a high light utilization efficiency was achieved.

As seen from FIG. 34(a), using the lighting device 100 of the present embodiment enables improvement of the illuminance uniformity. Therefore, it is suitably used as a spotlight of a different shape which is capable of illuminating with uniform illuminance.

The first lens L1 or the second lens L2 is made of, for example, a resin material although the present invention is not limited to this example. It is desired that the first lens L1 or the second lens L2 is a transparent refractive index medium which transmits visible light. For some uses, a refractive index medium which transmits ultraviolet or infrared ranges can also be used. Typical examples of the lens material include resins such as PMMA (polymethyl methacrylate resin), PC (polycarbonate), PS (polystyrene), COP (cycloolefin polymer) and silicone, and inorganic materials such as glass. The refractive index of the first lens L1 or the second lens L2 is set to, for example, 1.3 to 2.0.

In the embodiment described hereinabove, the non-revolution surface is provided on the light exit surface side S0 of the second lens L2, although the embodiment of the present invention is not limited to this example. Even when a non-revolution surface as the lens surface is provided on the light exit surface side of the first lens L1, a generally equal illumination distribution can be realized. The above-described non-revolution surface may be provided on the light source side lens surface (light entry surface) of the first lens L1 or the light source side lens surface (light entry surface) of the second lens L2. Note that when a non-revolution surface as the lens surface is provided on the light entry surface of the first lens L1 and/or the second lens L2, typically, the non-revolution surface forms a concave surface. In this case, the above-described boundary lines B1 to B4 are formed as trough lines in the lens surface.

As described above, in the lighting device 100 according to the embodiment of the present invention, it is only necessary that a non-revolution surface is formed at at least either of the lens surfaces, the light entry surface or the light exit surface, of the first lens L1 or the second lens L2. Note that all of the lens surfaces may be a non-revolution surface, but in this case, there is concern about increase in cost. Therefore, preferably, a non-revolution surface is provided only on the light exit surface side of the first lens L1 or the second lens L2. Further, providing a non-revolution surface at least on the light exit surface of the second lens L2 is advantageous for realizing a generally quadrangular illumination distribution.

Embodiment 4-2

Figure 35:
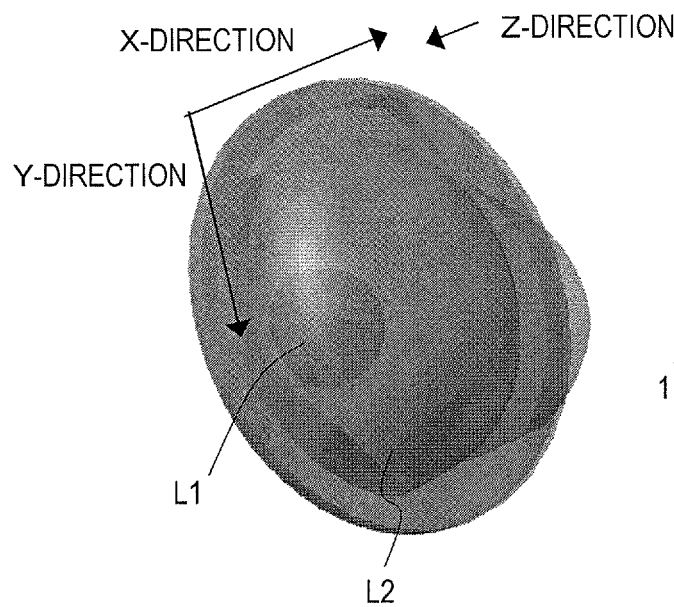
FIG. 35 Diagrams showing a lighting device according still another embodiment of the present invention. ($a$) is a perspective view showing a portion near a light source section of the lighting device. ($b$) is a cross-sectional view (side view). ($c$) is a perspective view of the second lens.
Figure 35:
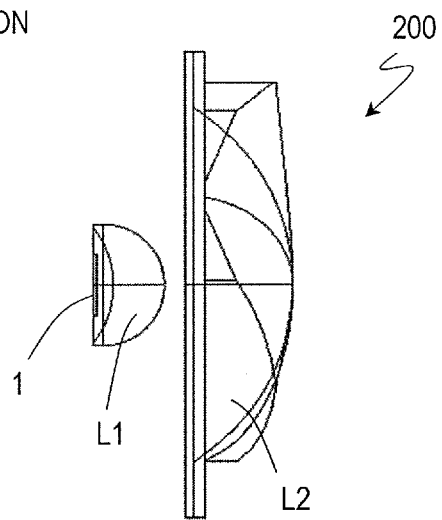
Figure 35:
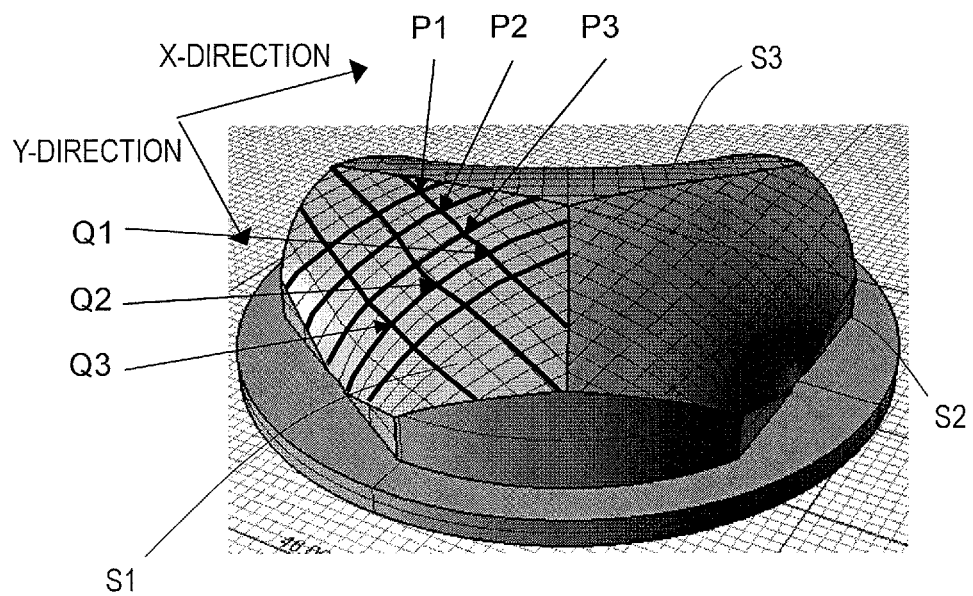

FIGS. 35(a) and 35(b) are a perspective view and cross-sectional view showing a lighting device 200 of Embodiment 4-2. FIG. 35(c) is a perspective view showing the shape of the light exit side surface of a second lens L2.

The lighting device 200 includes a surface light source 1, a first lens L1 provided on the light exit side of the surface light source 1, and a second lens L2 provided on the light exit side of the first lens L1, as does the lighting device 100. The center of the surface light source and the lens surface centers of the lenses L1, L2 are aligned along the optical axis.

In the lighting device 200, the shape of a non-revolution surface formed at the light exit surface of the second lens L2 is different from that of the lighting device 100 of Embodiment 4-1. The surface light source 1 and the form of the first lens L1 are the same as those of the lighting device 100, and therefore, the description thereof is herein omitted. In the following section, the lens surface of the second lens L2 is described.

In this embodiment also, the second lens L2 generally has the shape of a plano-convex lens. The light entry surface of the second lens L2 is a flat surface. The light exit surface of the second lens L2 generally has a convex surface shape. Note that, however, in the present embodiment, the light exit surface of the second lens L2 is configured to include a non-revolution surface which is different from that of Embodiment 4-1 as the lens surface.

The second lens L2 is a body of 3-fold rotational symmetry about an axis extending through the center O of the lens surface and perpendicular to the lens surface (typically, identical with the optical axis). In this configuration, the light exit surface S0 of the second lens L2 has three unit faces S1 to S3. The three unit faces S1 to S3 are separated by three boundary lines B1 to B3 extending outward from the center O of the lens surface which is placed on the optical axis. In the present embodiment, a non-revolution surface including such three unit faces is used to realize a spotlight which is capable of forming a generally equilateral triangular illumination region.

Each of the three unit faces S1 to S3 is a free curved surface. Each free curved surface has different curvatures in the x-axis direction and the y-axis direction shown in FIG. 35(c). The three unit faces S1 to S3 have substantially equal curvature distributions and are symmetrically arranged about an axis extending through the center O of the lens surface and parallel to the z-axis direction shown in FIG. 35(a).

Next, the unit faces S1 to S3 are described more specifically. Hereinafter, the unit face S1, which is one of the unit faces shown in FIG. 35(c), is only described although the same description applies to the other unit faces S2 and S3.

On the unit face S1, there are three points P1, P2, P3 which are aligned in the y-direction shown in FIG. 35(c). The unit face S1 is formed so as to satisfy the following formula:

$$Rx1 \neq Rx2 \neq Rx3$$

where Rx1, Rx2, Rx3 are the radii of curvature in the x-direction at the points P1, P2, P3, respectively.

Note that, in the embodiment shown in the drawing, the curved surface is determined so as to satisfy the relationship of Rx1>Rx2>Rx3, although this relationship is merely exemplary. The present invention is not limited to this example. In some cases, the curved surface may satisfy the relationship of Rx1<Rx2<Rx3.

Also, the three points P1, P2, P3 are present on a curve which has an equal curvature in the y-direction. At the respective points, the curvatures in the y-direction are equal to one another.

On the other hand, as shown in FIG. 35(c), on the unit face S1, there are three points Q1, Q2, Q3 which are aligned in the x-direction. The unit face S1 is formed so as to satisfy the following formula:

$$Ry1 \neq Ry2 \neq Ry3$$

where Ry1, Ry2, Ry3 are the radii of curvature in the y-direction at the three points Q1, Q2, Q3, respectively.

In the embodiment shown in the drawing, the curved surface is determined so as to satisfy the relationship of Ry1>Ry2>Ry3, although this relationship is merely exemplary. The present invention is not limited to this example. In some cases, the curved surface may satisfy the relationship of Ry1<Ry2<Ry3.

Also, the three points Q1, Q2, Q3 are present on a curve which has an equal curvature in the x-direction. At the respective points, the curvatures in the x-direction are equal to one another.

That is, each of thick lines extending in the y-direction shown in the drawing (e.g., curves extending through P1, P2, P3) is the set of points which have different curvatures in the x-direction and have equal curvatures in the y-direction. Each of thick lines extending in the x-direction shown in the drawing (e.g., curves extending through Q1, Q2, Q3) is the set of points which have different curvatures in the y-direction and have equal curvatures in the x-direction.

Next, a specific design of the above-described lens surface is described.

Table 2 presented below shows the height in the z-direction at the respective x, y coordinates (the lens thickness at the respective points) over the unit face S1 in the x-y plane including the x-direction and the y-direction in FIG. 35(c) (a plane orthogonal to the optical axis). The lens height at the respective x, y coordinates, z=f(x, y), is defined by, for example, the following formula:

$$f(x,y) = -c_y x^2/(1+(1-(1+k)c_y^2 x^2)^{1/2}) - c_x y^2/(1+(1-c_x^2 y^2)^{1/2})$$

Here, $c_y$ is 1/Ry, $c_x$ is 1/Rx, and k is the conic constant (shown as "Conic" in Table 2). The lens height z is a value that is obtained relative to the height at the lens center O which is zero (0).

TABLE 2

| | | | Radius of Curvature | | | | | | | | | | |
|---|---|---|---|---|---|---|---|---|---|---|---|---|---|
| Radius of Curvature | | | 348 | 918 | 286 | 258 | 228 | 198 | 168 | 199 | 108 | 78 | 48 |
| | | | | | | | | x | | | | | |
| | Conic | y | −17.5 | −15.75 | −1.4 | −12.25 | −10.5 | −8.75 | −7 | −5.25 | −3.5 | −17.5 | 0 |
| 53.992 | 1.5 | −17.5 | −3.49196 | −2.91631 | −2.43071 | −2.03171 | | | | | | | |
| 48.52 | 1.5 | −15.75 | −3.82187 | −3.14158 | −2.56848 | −2.09463 | −1.73613 | | | | | | |
| 49.732 | 1.5 | −1.4 | −4.22898 | −3.42152 | −2.74693 | −2.1894 | −1.73977 | −1.394 | | | | | |
| 39.628 | 1.5 | −12.25 | −4.7186 | −3.75697 | −2.9642 | −2.31339 | −1.78745 | −1.3767 | −1.07801 | | | | |
| 36.208 | 1.5 | −10.5 | −5.30017 | −4.14289 | −3.2133 | −2.4602 | −1.85409 | −1.37756 | −1.02168 | | | | |
| 33.472 | 1.5 | −8.75 | −5.9649 | −4.56298 | −3.47885 | −2.61774 | −1.93093 | −1.39064 | −0.98116 | −0.69594 | | | |
| 31.42 | 1.5 | −7 | −6.68403 | −4.98153 | −3.73374 | −2.76704 | −2.00521 | −1.40773 | −0.95147 | −0.6242 | | | |
| 80.052 | 1.5 | −5.25 | −7.37003 | −5.3355 | −3.93849 | −2.88321 | −2.06128 | −1.41921 | −0.927 | −0.56758 | −0.33325 | | |
| 20.026 | 1.5 | −3.5 | −8.12067 | −5.66537 | −4.12158 | −2.08681 | −2.11354 | −1.43465 | −0.01367 | −0.52031 | −0.2607 | −0.13144 | |
| 28.342 | 1.5 | −1.75 | −8.88701 | −5.02835 | −4.26235 | −3.06633 | −2.15532 | −1.45010 | −0.00920 | −0.50825 | −0.23230 | −0.07370 | |
| 28 | 1.5 | 0 | −8.48566 | −0.07894 | −4.34143 | −3.11202 | −2.18113 | −1.4027 | −0.91214 | −0.50351 | −0.22093 | −0.05482 | 0 |
| 28.342 | 1.5 | 1.75 | −8.88701 | −5.92895 | −4.26135 | −3.06633 | −2.15532 | −1.45019 | −0.90929 | −0.50825 | −0.23239 | −0.07379 | |
| 29.026 | 1.5 | 3.5 | −5.12067 | −5.66507 | −4.22158 | −2.98661 | −2.12354 | −1.43465 | −0.91367 | −0.52931 | −0.2697 | −0.13144 | |
| 30.052 | 1.5 | 5.25 | −7.37006 | −5.3355 | −3.93849 | −2.88321 | −2.06128 | −1.41921 | −0.927 | −0.58758 | −0.93325 | | |
| 31.42 | 1.5 | 7 | −6.68403 | −4.98153 | −3.73374 | −2.76704 | −2.00521 | −1.40773 | −0.95147 | −0.6242 | | | |
| 33.472 | 1.5 | 8.75 | −5.9649 | −4.56298 | −3.47885 | −2.61774 | −1.93093 | −1.39064 | −0.98116 | −0.69594 | | | |
| 36.208 | 1.5 | 10.5 | −5.30017 | −4.14289 | −3.2133 | −2.4602 | −1.85409 | −1.37756 | −1.02168 | | | | |
| 39.628 | 1.5 | 12.25 | −4.7196 | −3.75697 | −2.9642 | −2.31333 | −1.78745 | −1.3767 | −1.07801 | | | | |
| 43.732 | 1.5 | 1.4 | −4.22898 | −3.42152 | −2.74693 | −2.1894 | −1.73977 | −1.394 | | | | | |
| 48.52 | 1.5 | 15.75 | −3.82187 | −3.14158 | −2.56848 | −2.09463 | −1.71613 | | | | | | |
| 53.992 | 1.5 | 17.5 | −5.49186 | −2.91631 | −2.43071 | −2.03171 | | | | | | | |

Figure 36:
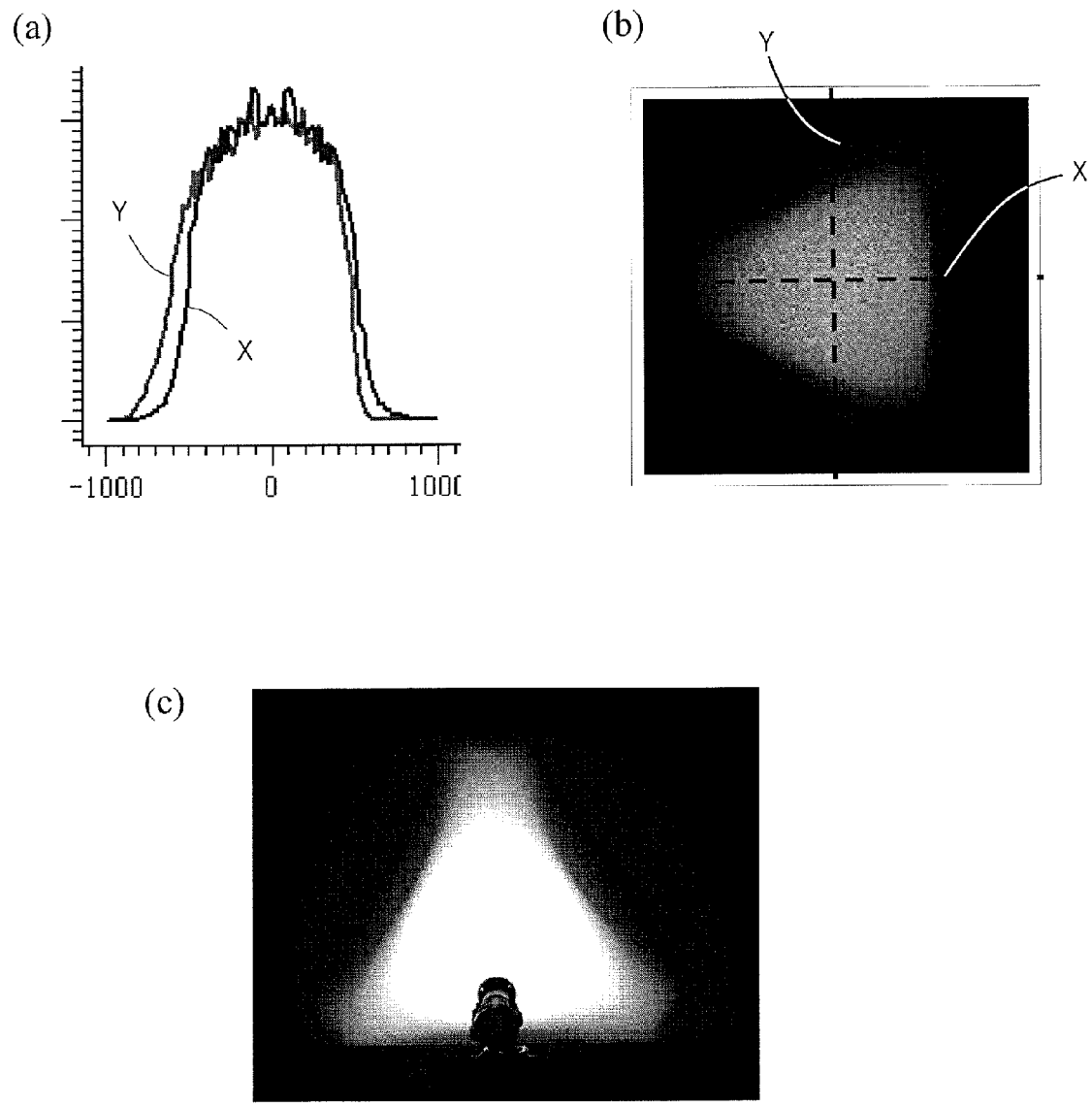
FIG. 36 ($a$) shows an illuminance distribution achieved by the lighting device shown in FIGS. 35. ($b$) and ($c$) show the shape of the illumination region.

FIG. 36(a) shows the illuminance distribution across an illumination region realized by the lighting device 200. FIGS. 36(b) and 36(c) show a planar shape of the projected light (spot shape projected on the screen). Note that FIG. 36(b) shows a spot shape obtained from the design values of the optical system. FIG. 36(c) shows a spot shape obtained using an actually manufactured optical system.

As shown in the drawings, by providing a lens surface of a non-revolution surface consisting of the above-described three free curved surfaces at the light exit surface of the second lens L2, a generally equilateral triangular spot shape can be realized. In the present embodiment, light from the light source is refracted by the lens surface such that the light is converged into an equilateral triangular shape without blocking part of the light from the light source by a light blocking member, the light utilization efficiency can be improved.

As a result of a calculation by simulation, it was confirmed that according to the lighting device of the present embodiment the light utilization efficiency of the light reaching an illumination region which is 1 m ahead is about 80%.

In this embodiment also, the above-described first lens L1 or second lens L2 may be made of the same material as that of Embodiment 1. In the embodiment which has been described above, a non-revolution surface is provided on the light exit surface side S0 of the second lens L2, although the present invention is not limited to this example. It is only necessary that a non-revolution surface is formed at at least either of the lens surfaces, the light entry surface or the light exit surface, of the first lens L1 or the second lens L2.

Embodiment 4-3

Figure 37:
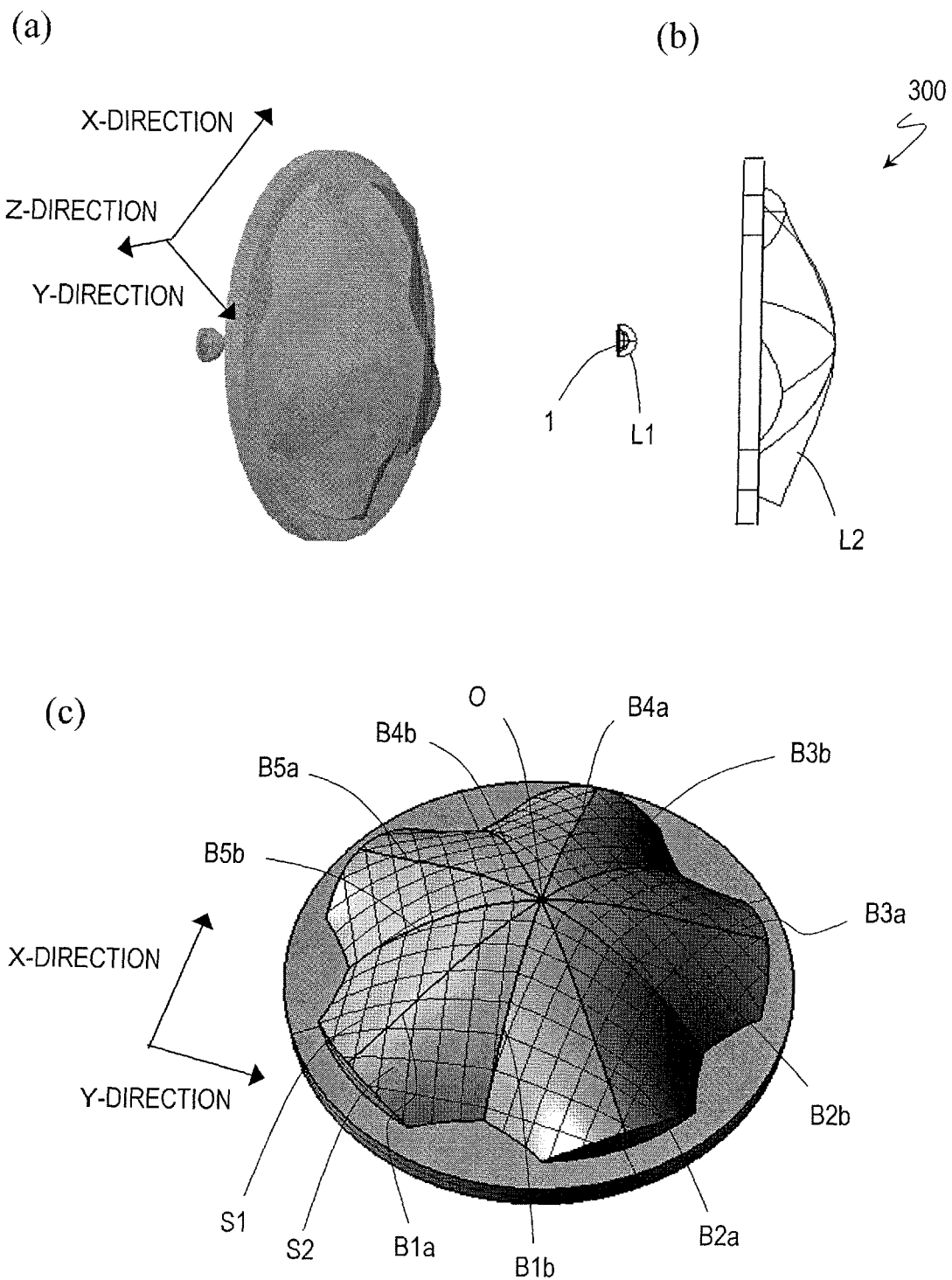
FIG. 37 Diagrams showing a lighting device according to still another embodiment of the present invention. ($a$) is a perspective view showing a portion near a light source section of the lighting device. ($b$) is a cross-sectional view (side view). ($c$) is a perspective view of the second lens.

FIGS. 37(a) and 37(b) are a perspective view and cross-sectional view showing a lighting device 300 of Embodiment 4-3. FIG. 37(c) is a perspective view showing the shape of the light exit side surface of a second lens L2.

The lighting device 300 includes a surface light source 1, a first lens L1 provided on the light exit side of the surface light source 1, and a second lens L2 provided on the light exit side of the first lens L1, as does the lighting device 100. The center of the surface light source and the lens surface centers of the lenses L1, L2 are aligned along the optical axis.

In the lighting device 300, the shape of a non-revolution surface formed at the light exit surface of the second lens L2 is different from that of the lighting device 100 of Embodiment 4-1. The surface light source 1 and the form of the first lens L1 are the same as those of the lighting device 100, and therefore, in the following section, only the lens surface of the second lens L2 is described.

In this embodiment also, the second lens L2 generally has the shape of a plano-convex lens. The light entry surface of the second lens L2 is a flat surface. The light exit surface of the second lens L2 generally has a convex surface shape.

The second lens L2 is a body of 5-fold rotational symmetry about an axis extending through the center O of the lens surface and perpendicular to the lens surface (typically, conformable to the optical axis). In this configuration, the light exit surface S0 of the second lens L2 has ten unit faces which are separated by five boundary lines (ridge lines) B1a to B5a extending outward from the center O of a lens surface and five boundary lines (trough lines) B1b to B5b extending outward from the center O of another lens surface. The five boundary lines (ridge lines) and the five boundary lines (trough lines) are alternately arranged. Each unit face is provided between one boundary line (ridge line) and one boundary line (trough line). In the present embodiment, a non-revolution surface including such ten unit faces is used to realize a spotlight which is capable of forming a generally star-like shaped illumination region.

Each of the ten unit faces is a free curved surface. In this free curved surface, the curvatures in the directions of two mutually-orthogonal axes which are defined in a plane parallel to the lens surface are different. Of the ten unit faces, two unit faces lying at both sides of one boundary line (e.g., two unit faces S1 and S2 lying at both sides of the boundary line B1a in FIG. 37(c)) have a symmetrical shape about a plane extending through the boundary line and parallel to the z-direction. In the present embodiment, when considering these two unit faces as a pair of unit faces, five pairs of unit faces are symmetrically arranged about an axis extending through the center O of the lens surface and parallel to the z-direction.

Figure 38:
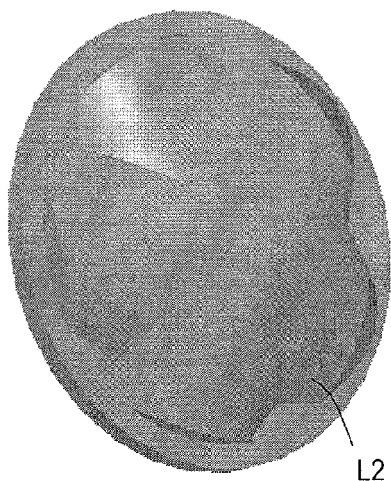
FIGS. 38 ($a$-1) and ($b$-1) are perspective views showing specific lens shapes of the lighting device shown in FIGS. 37. ($a$-2) and ($b$-2) show the shape of illumination regions in the case where the lenses shown in ($a$-1) and ($b$-1), respectively, are used.
Figure 38:
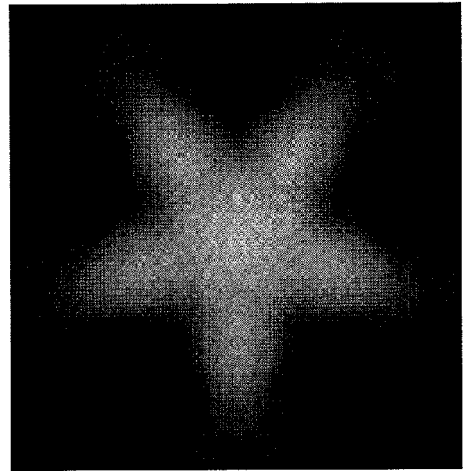
Figure 38:
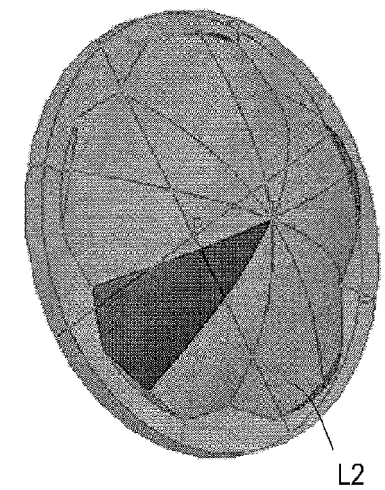
Figure 38:
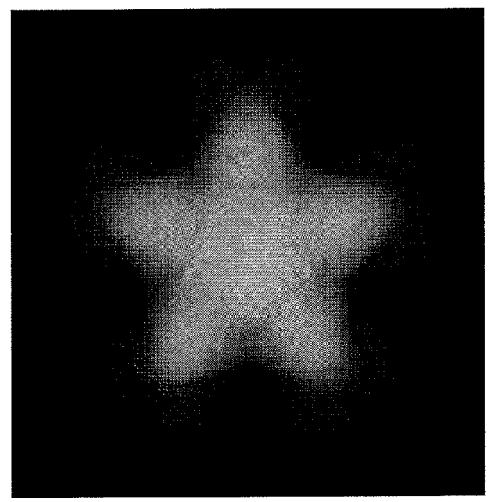

FIGS. 38(a-1) and 38(b-1) show two types of the second lens L2 which have ten unit faces (free curved surfaces) but have different curved surface shapes in the unit faces. FIGS. 38(a-2) and 38(b-2) show the shapes of the illumination region in the case where the second lens L2 is used. As shown in FIGS. 38(a-2) and 38(b-2), no matter which lens is used, a star-like spot shape can be realized. Note that, as a result of a calculation by simulation, it was confirmed that according to the lighting device of the present embodiment the light utilization efficiency of the light reaching an illumination region which is 1 m ahead is about 77%.

As seen from FIGS. 38(a-2) and 38(b-2), the shape of the illumination region (the distribution of projected light) can be changed by changing the shape of the free curved surfaces that form the unit faces. Therefore, the shape of the free curved surfaces may be appropriately adjusted such that a desired shape of the illumination region can be obtained.

Further, as illustrated in Embodiments 4-1, 4-2 which have been described above and Embodiment 4-3 described in this section, no matter which of the generally square shape, the generally equilateral triangular shape, and the generally star-like shape the illumination region has, the shape of the illumination region can also be made highly symmetrical by arranging curved surfaces symmetrically about the lens center O in the non-revolution surface.

Note that, in the present embodiment also, the above-described first lens L1 or second lens L2 may be made of the same material as that of Embodiment 1. In the embodiment which has been described above, a non-revolution surface as the lens surface is provided on the light exit surface side SO of the second lens L2, although the present invention is not limited to this example. It is only necessary that a non-revolution surface is formed at at least either of the lens surfaces, the light entry surface or the light exit surface, of the first lens L1 or the second lens L2.

Embodiment 4-4

Figure 39:
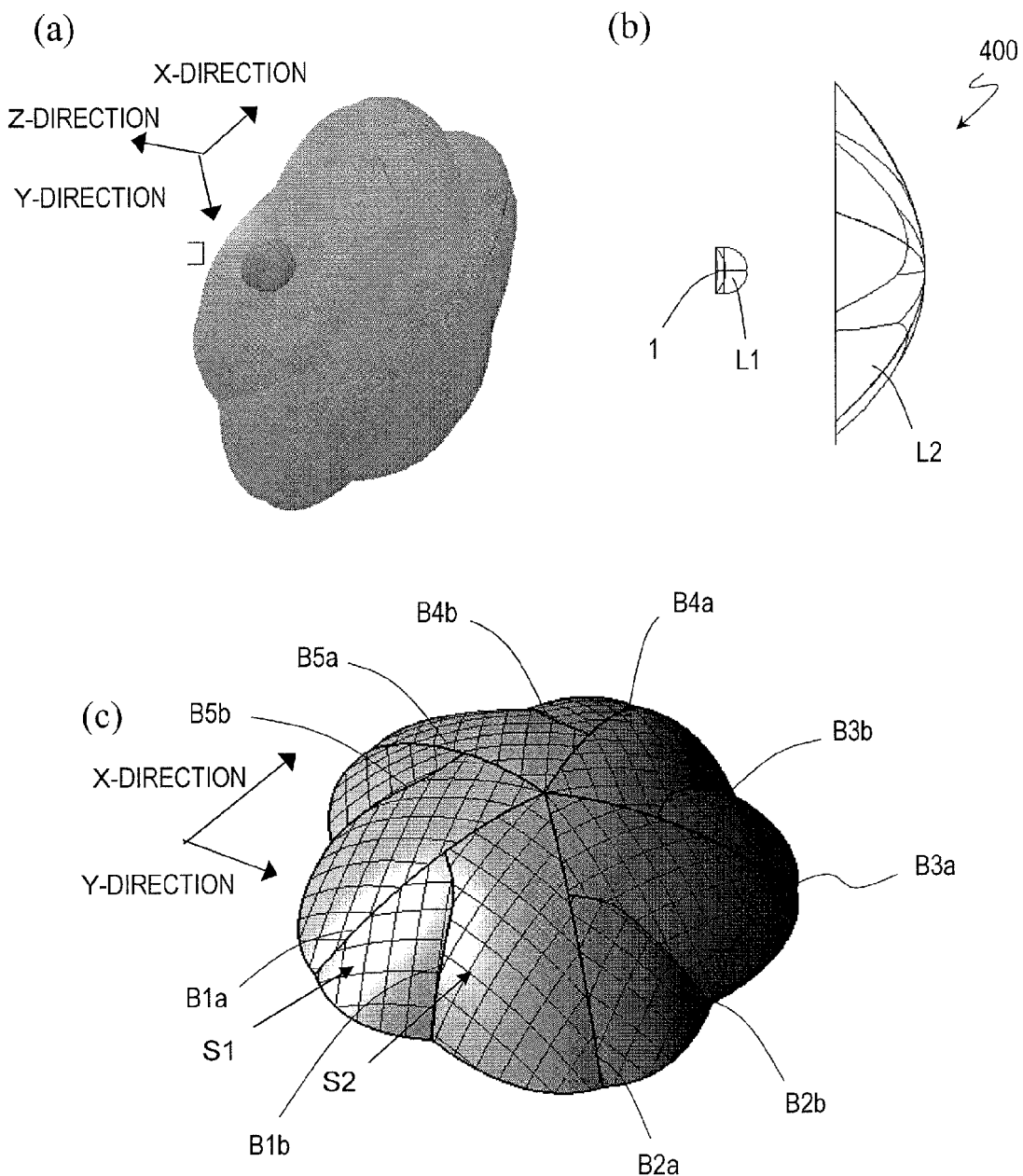
FIG. 39 Diagrams showing a lighting device according to still another embodiment of the present invention. ($a$) is a perspective view showing a portion near a light source section of the lighting device. ($b$) is a cross-sectional view (side view). ($c$) is a perspective view of the second lens.

FIGS. 39(a) and 39(b) are a perspective view and cross-sectional view showing a lighting device 400 of Embodiment 4-4. FIG. 39(c) is a perspective view showing the shape of the light exit side surface of a second lens L2.

The lighting device 400 includes a surface light source 1, a first lens L1 provided on the light exit side of the surface light source 1, and a second lens L2 provided on the light exit side of the first lens L1, as does the lighting device 100. The center of the surface light source and the lens surface centers of the lenses L1, L2 are aligned along the optical axis.

In the lighting device 400, the shape of a non-revolution surface formed at the light exit surface of the second lens L2 is different from that of the lighting device 100 of Embodiment 4-1. The surface light source 1 and the form of the first lens L1 are the same as those of the lighting device 100, and therefore, in the following section, only the lens surface of the second lens L2 is described.

In this embodiment also, the second lens L2 generally has the shape of a plano-convex lens. The light entry surface of the second lens L2 is a flat surface. The light exit surface of the second lens L2 generally has a convex surface shape.

The second lens L2 is a body of 5-fold rotational symmetry about an axis extending through the center O of the lens surface and perpendicular to the lens surface (typically, conformable to the optical axis). In this configuration, the light exit surface SO of the second lens L2 has ten unit faces which are separated by five major boundary lines (trough lines) B1a to B5a extending outward from the center O of the lens surface which is placed on the optical axis and five minor boundary lines (trough lines) B1b to B5b extending outward from intermediate positions on the major boundary lines B1a to B5a.

In a region lying between two adjacent major boundary lines (e.g., the major boundary line B1a and the major boundary line B2a shown in the drawing), there are two types of unit faces S1, S2 which are separated by one minor boundary line (e.g., the minor boundary line B1b shown in the drawing). These two types of unit faces S1, S2 have different areas and different shapes.

Considering these two types of unit faces as a pair, five pairs of unit faces are rotationally symmetrically arranged about the optical axis.

In Embodiments 4-1 to 4-3 that have been described above, adjacent free curved surfaces (unit faces) have an identical shape or are in symmetry about a cross section including a boundary line, while in Embodiment 4-4 the above-described two types of unit face have totally different shapes. Even when a lens of such a shape is used, light can be projected onto a desired region while maintaining high light utilization efficiency.

Figure 40:
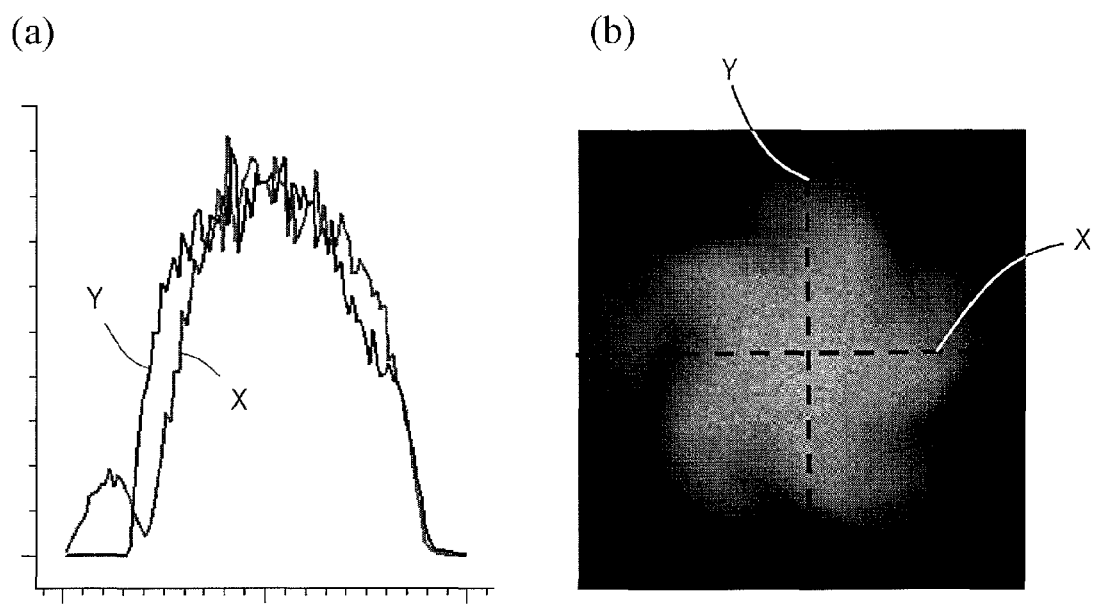
FIG. 40 ($a$) shows an illuminance distribution achieved by the lighting device shown in FIG. 39. ($b$) shows the shape of an illumination region.

FIG. 40(a) shows an illuminance distribution across an illumination region produced by the lighting device 400. FIG. 40(b) shows a planar shape of projected light. Note that FIG. 40(a) separately shows the graphs of the illuminance distributions along the horizontal direction X and the vertical direction Y shown in FIG. 40(b). As seen from the drawing, the lighting device of the present embodiment is capable of forming a spot shape in the form of a whirlpool. Note that, as a result of a calculation by simulation, it was confirmed that according to the lighting device of the present embodiment the light utilization efficiency of the light reaching an illumination region which is 1 m ahead is about 79%.

Note that, in the present embodiment also, the above-described first lens L1 or second lens L2 may be made of the same material as that of Embodiment 1. In the embodiment which has been described above, a non-revolution surface as the lens surface is provided on the light exit surface side SO of the second lens L2, although the present invention is not limited to this example. It is only necessary that a non-revolution surface is formed at at least either of the lens surfaces, the light entry surface or the light exit surface, of the first lens L1 or the second lens L2.

Embodiment 4-5

Figure 41:
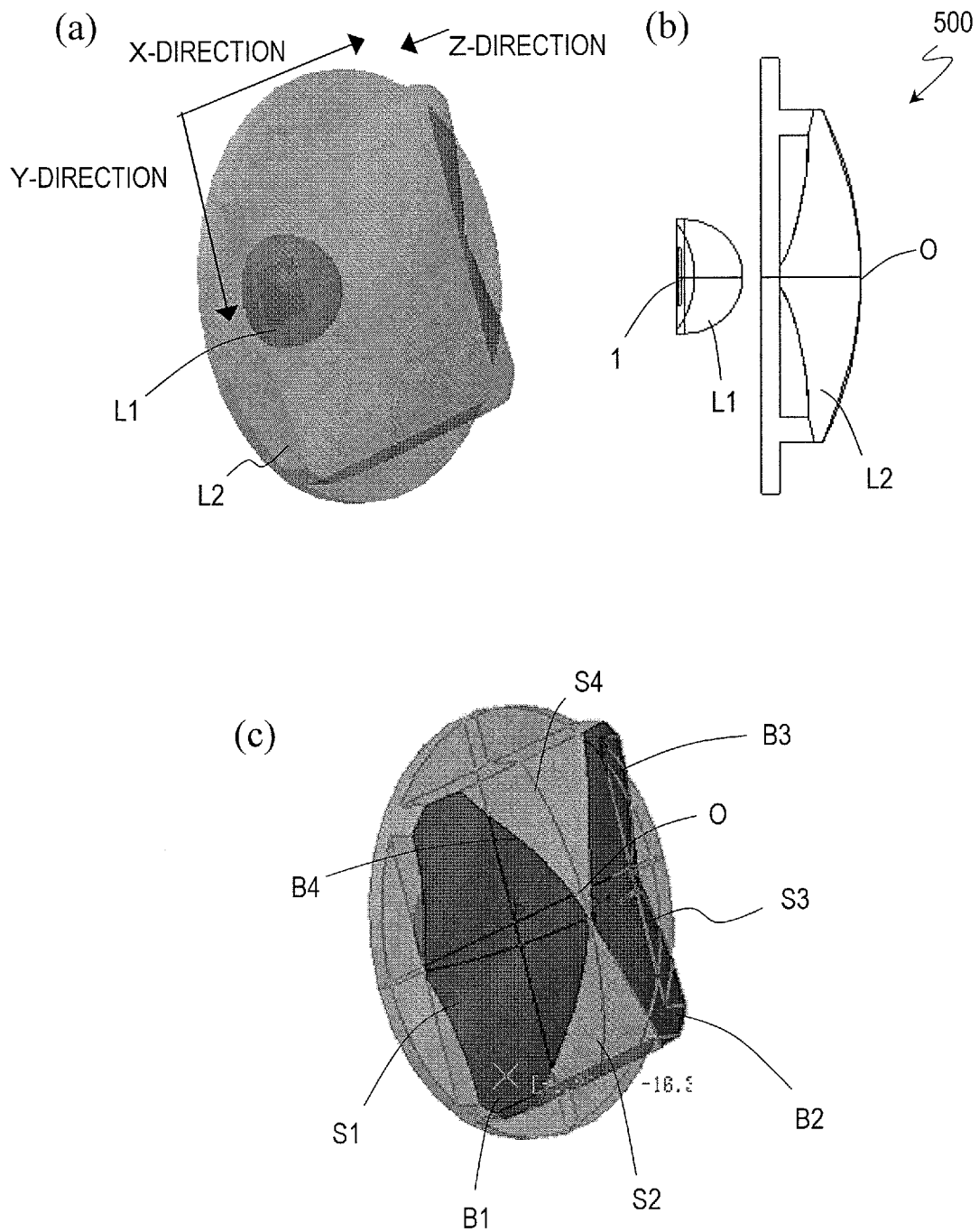
FIG. 41 Diagrams showing a lighting device according to still another embodiment of the present invention. ($a$) is a perspective view showing a portion near a light source section of the lighting device. ($b$) is a cross-sectional view (side view). ($c$) is a perspective view of the second lens.

FIGS. 41(a) and 41(b) are a perspective view and cross-sectional view showing a lighting device 500 of Embodiment 4-5. FIG. 41(c) is a perspective view showing the shape of the light exit side surface of a second lens.

The lighting device 500 includes a surface light source 1, a first lens L1 provided on the light exit side of the surface light source 1, and a second lens L2 provided on the light exit side of the first lens L1, as does the lighting device 100. The center of the surface light source and the lens surface centers of the lenses L1, L2 are aligned along the optical axis.

In the lighting device 500, the shape of a non-revolution surface formed at the light exit surface of the second lens L2 is different from that of the lighting device 100 of Embodiment 4-1. The surface light source 1 and the form of the first lens L1 are the same as those of the lighting device 100, and therefore, in the following section, only the lens surface of the second lens L2 is described.

In this embodiment also, the second lens L2 generally has the shape of a plano-convex lens. The light entry surface of the second lens L2 is a flat surface. The light exit surface of the second lens L2 generally has a convex surface shape.

The second lens L2 is a body of 2-fold rotational symmetry about an axis extending through the center O of the lens surface and perpendicular to the lens surface (typically, conformable to the optical axis).

In this configuration, the light exit surface SO of the second lens L2 has four unit faces S1 to S4 which are separated by four boundary lines B1 to B4 extending outward from the center O of the lens surface which is placed on the optical axis.

Of the unit faces S1 to S4, two unit faces opposing each other relative to the lens center O (the unit face S1 and the unit face S3, or the unit face S2 and the unit face S4) are curved surfaces which have equal curvatures. However, adjacent lens surfaces (e.g., the unit face S1 and the unit face S2) are curved surfaces which have different curvatures. In the present embodiment, a lens whose lens surface is a non-revolution surface including four unit faces of such 2×2 types is used to realize a spotlight which is capable of forming a generally-rectangular illumination region.

Each of the four unit faces S1 to S4 is a free curved surface. Each free curved surface has different curvatures in the x-axis direction and the y-axis direction shown in FIG. 41(a). As described above, since opposing unit faces are equal curved surfaces, they have equal curvatures in the axial direction. Meanwhile, since adjacent unit faces are different curved surfaces, they have different curvatures. Hereinafter, a more specific design of the lens surface is described.

Table 3 and Table 4 presented below respectively show the design of the curvature set for the unit faces S1, S3 (Table 3) and the design of the curvature set for the unit faces S2, S4 (Table 4). As shown in the tables, the parameters of the design are different for the respective unit faces. Note that the meaning of numbers shown in the tables (height z in x-y coordinates) is the same as the examples shown in Table 1 and Table 2, and therefore, the description thereof is herein omitted.

TABLE 3

| Radius of Curvature | | | | | | | | | | | | |
|---|---|---|---|---|---|---|---|---|---|---|---|---|
| Radius of Curvature | Conic | | 54 | 53.4 | 52.8 | 52.2 | 51.6 | 51 | 50.4 | 49.8 | 49.2 | 48.6 | 48 |
| | | y | −17.5 | −15.75 | −14 | −12.25 | −10.5 | x −8.75 | −7 | −5.25 | −3.5 | −1.75 | 0 |
| 53.002 | 1.5 | −17.6 | −5.06506 | −6.38336 | −4.83207 | −4.26835 | −4.10440 | | | | | | |
| 40.52 | 1.5 | 15.75 | 5.01019 | 5.12600 | 4.54129 | 4.04620 | 3.60095 | | | | | | |
| 43.732 | 1.5 | −1.4 | −5.78304 | −4.96107 | −4.23099 | −3.7217 | −3.24500 | −2.85763 | | | | | |
| 36.628 | 1.5 | −2.25 | −5.91175 | −4.945 | −4.14426 | −3.28014 | −2.93331 | −2.49045 | −2.14218 | | | | |
| 36.208 | 1.5 | −10.5 | −6.1124 | −5.01197 | −4.07639 | −3.31299 | −2.69179 | −2.19154 | −1.79912 | | | | |
| 33.472 | 1.5 | −8.75 | −6.56851 | −5.16433 | −4.07596 | −3.20791 | −2.51026 | −1.95343 | −1.5185 | −1.19298 | | | |
| 31.42 | 1.5 | −7 | −7.06925 | −5.36526 | −4.11473 | −3.14554 | −2.37474 | −1.76663 | −1.29405 | −0.94097 | −0.69699 | | |
| 30.052 | 1.5 | −5.25 | −7.58624 | −5.55086 | −4.15229 | −3.09447 | −2.26861 | −1.62063 | −1.11913 | −0.74518 | −0.48648 | | |
| 29.026 | 1.5 | −3.5 | −8.21661 | −5.76063 | −4.21645 | −3.08054 | −2.20551 | −1.52396 | −0.99888 | −0.60806 | −0.33762 | −0.17907 | |
| 28.342 | 1.5 | −1.75 | −8.91098 | −5.95272 | −4.23605 | −3.08979 | −2.17828 | −1.47249 | −3.93057 | −0.52791 | −0.24934 | −0.03567 | |
| 28 | 1.5 | 0 | −9.48536 | −6.07994 | −4.34143 | −3.11205 | −2.18118 | −1.4627 | −3.81214 | −0.50351 | −0.22093 | −0.05482 | 0 |
| 28.942 | 1.5 | 1.75 | −8.91098 | −5.95272 | −4.23605 | −3.08979 | −2.17828 | −1.47249 | −0.93057 | −0.52791 | −0.24934 | −0.03567 | |
| 29.026 | 1.5 | 3.5 | −8.21661 | −5.76063 | −4.21615 | −3.08054 | −2.20551 | −1.52396 | −0.99888 | −0.60806 | −0.33762 | −0.17907 | |
| 30.052 | 1.5 | 5.25 | −7.58624 | −5.55086 | −4.15220 | −3.00447 | −2.26861 | −1.62053 | −1.11013 | −0.74618 | −0.48648 | | |
| 31.42 | 1.5 | 7 | −7.00925 | −5.30520 | −4.11473 | −3.14504 | −2.37474 | −1.70003 | −1.29400 | −0.94097 | −0.09099 | | |
| 33.472 | 1.5 | 8.75 | −6.56851 | −5.16433 | −4.07590 | −3.20791 | −2.51026 | −1.95343 | −1.5185 | −1.19298 | | | |
| 36.208 | 1.5 | 10.5 | −0.1124 | −5.01197 | −4.07639 | −3.31239 | −2.69179 | −2.19154 | −1.29912 | | | | |
| 39.628 | 1.5 | 12.25 | −5.91175 | −4.945 | −4.14426 | −3.28014 | −2.93331 | −2.49045 | −2.14218 | | | | |
| 43.732 | 1.5 | 1.4 | −5.79304 | −4.98107 | −4.29633 | −3.7217 | −3.24506 | −2.85763 | | | | | |
| 46.52 | 1.5 | 15.75 | −5.81319 | −5.12683 | −4.54129 | −4.04623 | −3.63395 | | | | | | |
| 53.992 | 1.5 | 17.5 | −5.96596 | −5.38336 | −4.83297 | −4.45835 | −4.10448 | | | | | | |

TABLE 4

| Radius of Curvature | | | | | | | | | | | | |
|---|---|---|---|---|---|---|---|---|---|---|---|---|
| Radius of Curvature | Conic | | 54 | 53.4 | 52.8 | 52.2 | 51.0 | 51 | 50.4 | 49.8 | 49.2 | 48.0 | 48 |
| | | x | −17.5 | −15.75 | −14 | −12.25 | −10.5 | y −8.75 | −7 | −5.25 | −3.5 | −1.75 | 0 |
| 80.983 | 1.5 | −1.75 | | | | | | | | | | | |
| 72.78 | 1.5 | −15.75 | | | | | | | | | | | |
| 65.593 | 1.5 | −14 | | | | | | | | | | | |
| 59.442 | 1.5 | −12.25 | | | | | | | | | | | |
| 54.312 | 1.5 | −10.5 | | | | | | | | | | | |
| 50.203 | 1.5 | −8.75 | −4.0387 | −3.36621 | | | | | | | | | |
| 47.13 | 1.5 | −7 | −4.04669 | −3.30799 | −2.67482 | | | | | | | | |
| 45.073 | 1.5 | −5.25 | −4.0524 | −3.25996 | −2.5854 | −2.01401 | −1.5352 | | | | | | |
| 43.539 | 1.5 | −3.5 | −4.08284 | −3.24463 | −2.53496 | −1.93569 | −1.43465 | −1.02287 | | | | | |
| 42.513 | 1.5 | −1.75 | −4.12923 | −3.25168 | −2.51605 | −1.80678 | −1.37005 | −0.05560 | −0.6168 | −0.36307 | | | |
| 42 | 1.5 | 0 | −4.10117 | −3.2717 | −2.52279 | −1.89312 | −1.30821 | −0.93702 | −0.59583 | −0.33139 | −0.14047 | −0.0305 | 0 |
| 42.513 | 1.5 | 1.75 | −4.12823 | −3.25158 | −2.51605 | −1.69078 | −1.37995 | −0.85509 | −0.6168 | −0.35307 | | | |
| 43.639 | 1.5 | 3.5 | −4.38284 | −3.24483 | −2.53496 | −1.93569 | −1.43465 | −1.02287 | | | | | |
| 45.073 | 1.5 | 5.25 | −4.0524 | −3.25986 | −2.5854 | −2.01401 | −1.5352 | | | | | | |

TABLE 4-continued

| Radius of Curvature | Conic | x | Radius of Curvature | | | | | | | | | | |
|---|---|---|---|---|---|---|---|---|---|---|---|---|---|
| | | | 54 | 53.4 | 52.8 | 52.2 | 51.0 | 51 y | 50.4 | 49.8 | 49.2 | 48.0 | 48 |
| | | | −17.5 | −15.75 | −14 | −12.25 | −10.5 | −8.75 | −7 | −5.25 | −3.5 | −1.75 | 0 |
| 47.13 | 1.5 | 7 | −4.04663 | −3.30739 | −2.67482 | | | | | | | | |
| 50.203 | 1.5 | 8.75 | −4.0387 | −3.36621 | | | | | | | | | |
| 54.312 | 1.5 | 10.5 | | | | | | | | | | | |
| 59.442 | 1.5 | 12.25 | | | | | | | | | | | |
| 65.593 | 1.5 | 14 | | | | | | | | | | | |
| 72.78 | 1.5 | 15.75 | | | | | | | | | | | |
| 80.983 | 1.5 | 17.6 | | | | | | | | | | | |

Figure 42:
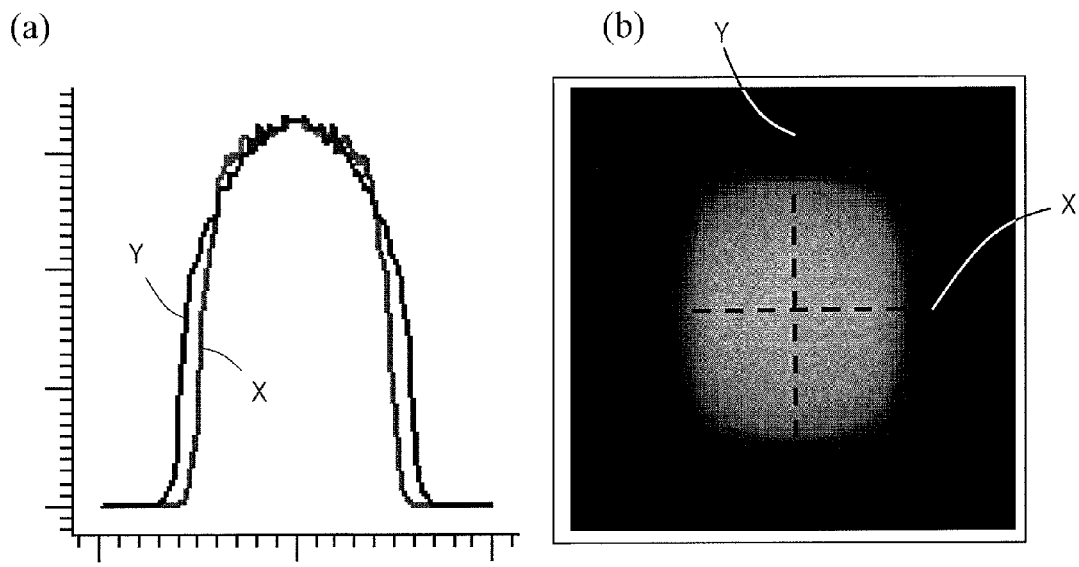
FIG. 42 ($a$) shows an illuminance distribution achieved by the lighting device shown in FIG. 41. ($b$) shows the shape of an illumination region.

FIG. 42(a) shows an illuminance distribution across an illumination region produced by the lighting device 500. FIG. 42(b) shows a planar shape of projected light. Note that FIG. 42(a) separately shows the graphs of the illuminance distributions along the horizontal direction X and the vertical direction Y shown in FIG. 42(b).

As shown in FIG. 42(b), a lens surface of a non-revolution surface consisting of the above-described four free curved surfaces of 2×2 types is provided at the light exit surface of the second lens L2, whereby a generally rectangular spot shape can be realized. Note that, as a result of a calculation by simulation, it was confirmed that according to the lighting device 500 of the present embodiment the light utilization efficiency of the light reaching an illumination region which is 1 m ahead is about 80%.

Note that, in the present embodiment also, the above-described first lens L1 or second lens L2 may be made of the same material as that of Embodiment 1. In the embodiment which has been described above, a non-revolution surface as the lens surface is provided on the light exit surface side SO of the second lens L2, although the present invention is not limited to this example. It is only necessary that a non-revolution surface is formed at at least either of the lens surfaces, the light entry surface or the light exit surface, of the first lens L1 or the second lens L2.

Embodiment 4-6

Figure 43:
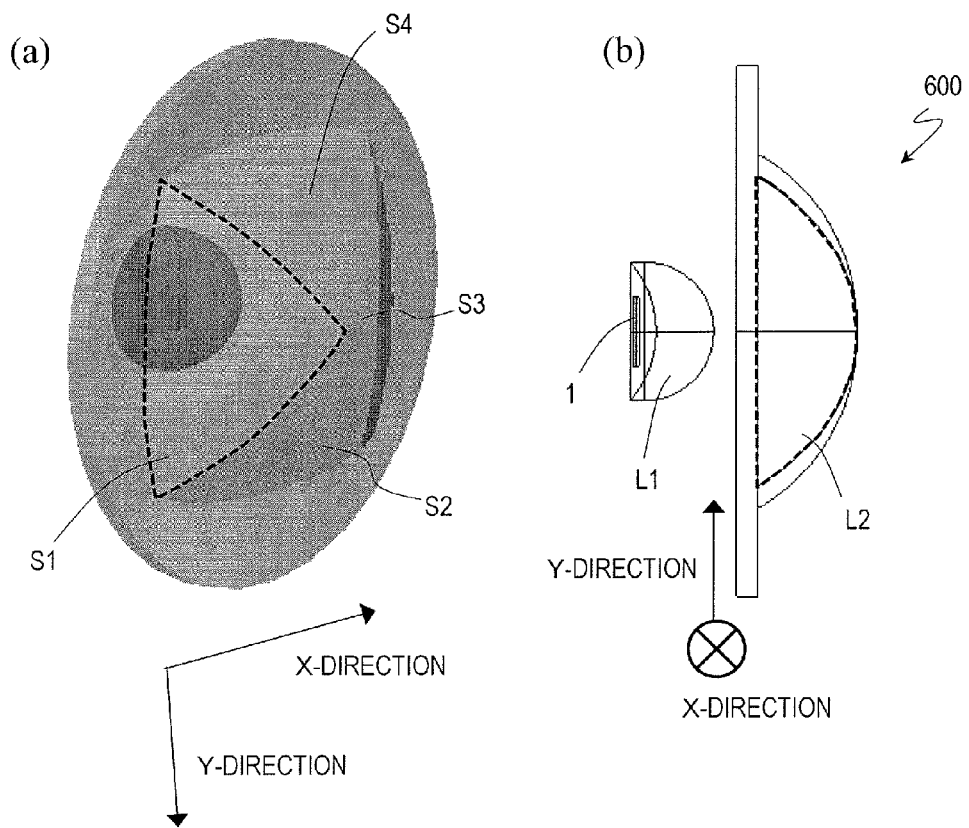
FIG. 43 Diagrams showing a lighting device according to still another embodiment of the present invention. ($a$) is a perspective view showing a portion near a light source section of the lighting device. ($b$) is a cross-sectional view (side view).
Figure 44:
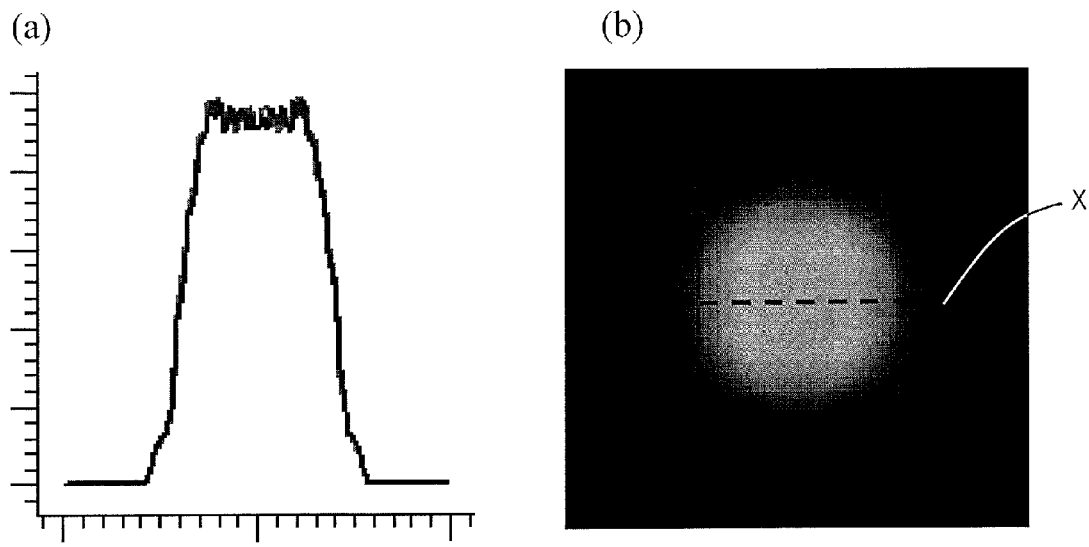
FIG. 44 ($a$) shows an illuminance distribution achieved by the lighting device shown in FIG. 43. ($b$) shows the shape of an illumination region.

FIGS. 43(a) and 43(b) are a perspective view and cross-sectional view showing a lighting device 600 of Embodiment 4-6. FIG. 44(a) shows an illuminance distribution across an illumination region produced by the lighting device 600. FIG. 44(b) shows a planar shape of projected light. Note that FIG. 44(a) shows the graph of the illuminance distribution along the horizontal direction X shown in FIG. 44(b).

The lighting device 600 of the present embodiment includes a surface light source 1, a first lens L1 provided on the light exit side of the surface light source 1, and a second lens L2 provided on the light exit side of the first lens L1, as does the lighting device 100. The center of the surface light source 1 and the lens surface centers of the lenses L1, L2 are aligned along the optical axis.

In the lighting device 600, the shape of a non-revolution surface formed at the light exit surface of the second lens L2 is different from that of the lighting device 100 of Embodiment 4-1. The surface light source 1 and the form of the first lens L1 are the same as those of the lighting device 100, and therefore, in the following section, only the lens surface of the second lens L2 is described.

In this embodiment also, the second lens L2 generally has the shape of a plano-convex lens. The light entry surface of the second lens L2 is a flat surface. The light exit surface of the second lens L2 generally has a convex surface shape. The second lens L2 is a body of 4-fold rotational symmetry about an axis extending through the center O of the lens surface and perpendicular to the lens surface (typically, conformable to the optical axis). In this configuration, the light exit surface SO of the second lens L2 has four unit faces S1 to S4 which are separated by four boundary lines B1 to B4 extending outward from the center O of the lens surface which is placed on the optical axis. In the present embodiment, a non-revolution surface including such four unit faces is used to realize a spotlight which is capable of forming a generally square illumination region.

Each of the four unit faces S1 to S4 is formed by a toroidal surface, which is different from that of the lighting device 100 of Embodiment 4-1. This toroidal surface has different curvatures in the x-axis direction and the y-axis direction shown in FIGS. 43(a) and 43(b). The four unit faces S1 to S4 have substantially equal curvature distributions and are symmetrically arranged about an axis extending through the center O of the lens surface and parallel to the z-axis direction.

Now, the toroidal surface is described. When described as to the unit face S1 shown in the drawing, the toroidal surface refers to a surface which has different curvatures in the x-direction and the y-direction.

Note that, although the free curved surface (unit face) of the lens of Embodiment 1 also has different curvatures in the x-direction and the y-direction, the toroidal surface used in this embodiment is different from the free curved surface of Embodiment 1 in that an arc is formed in either of the cross section along the x-direction or the y-direction. In the case of the toroidal surface, the curved surface can be defined only by the radius of curvature in the x-direction, Rx, and the radius of curvature in the y-direction, Ry.

In the present embodiment, the radius of curvature in the x-direction, Rx, is set to, for example, a value which is not less than a half of the effective diameter of the second lens L2 and not more than three times the effective diameter of the second lens L2. The radius of curvature in the y-direction, Ry, is set to, for example, a value which is not less than Rx and not more than five times Rx.

As shown in FIGS. 44(a) and 44(b), a generally square spot shape with rounded vertexes can be realized using the lighting device 600 of the present embodiment. Further, the illuminance distribution across the illumination region can be uniform. Further, as a result of a calculation by simulation, it was confirmed that according to the lighting device 600 of the present embodiment the light utilization efficiency of the light reaching an illumination region which is 1 m ahead is about 81%.

Next, as a variation of the present embodiment, an embodiment of forming a generally equilateral triangular illumination region using a lens which has a non-revolution surface consisting of three toroidal surfaces is described.

Figure 45:
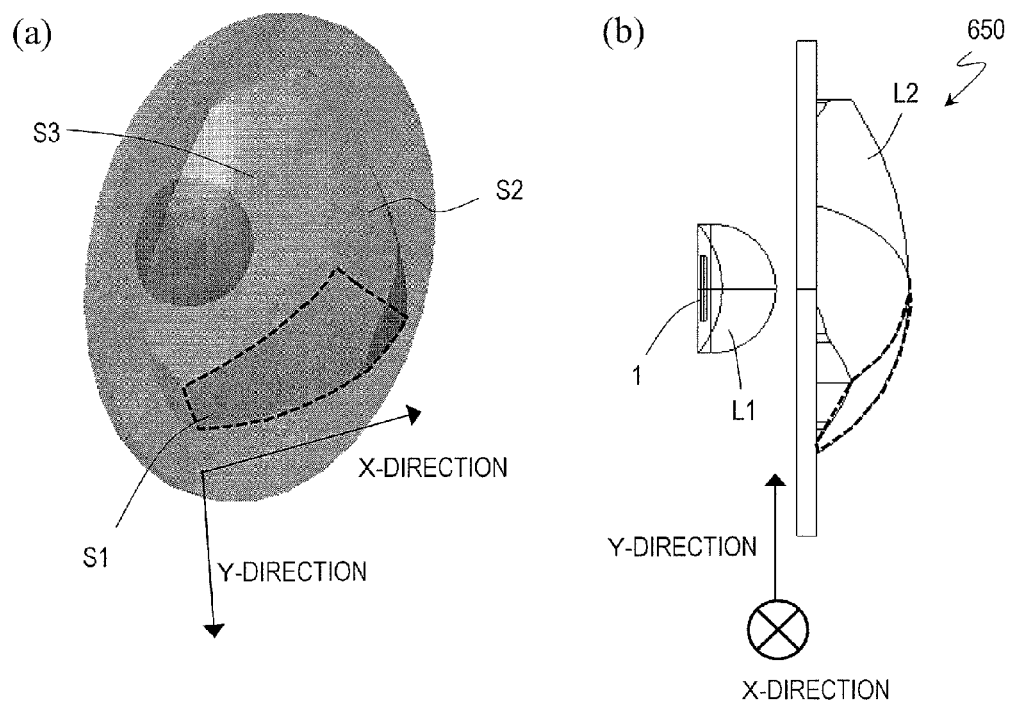
FIG. 45 Diagrams showing a lighting device according to a variation of the embodiment shown in FIG. 43. ($a$) is a perspective view showing a portion near a light source section of the lighting device. ($b$) is a cross-sectional view (side view).
Figure 46:
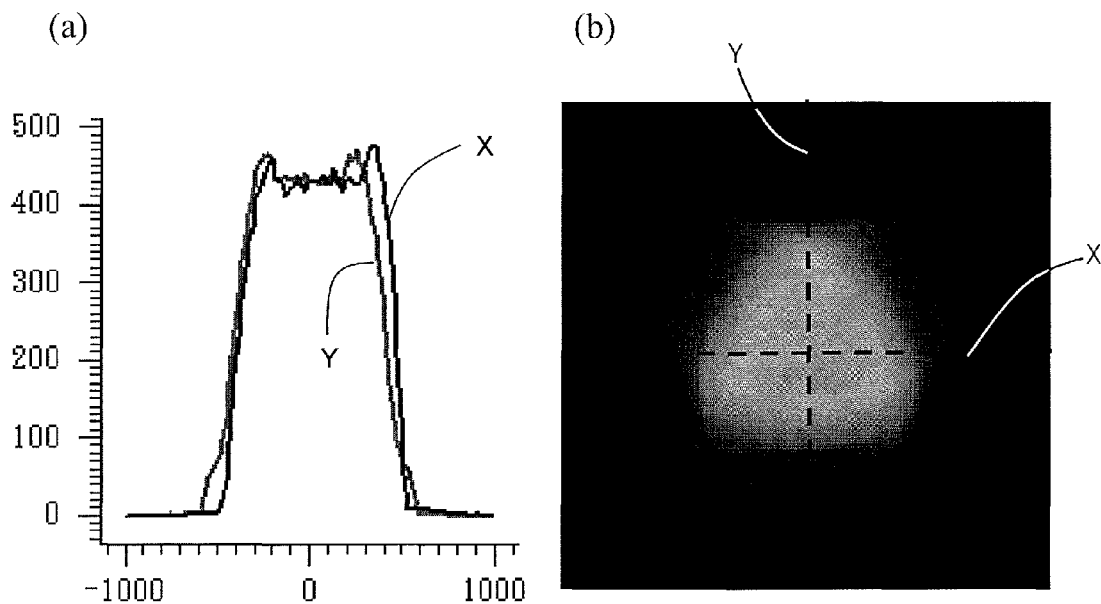
FIG. 46 ($a$) shows an illuminance distribution achieved by the lighting device shown in FIG. 45. ($b$) shows the shape of an illumination region.

FIGS. 45(a) and 45(b) are a perspective view and cross-sectional view showing a lighting device 650 of the present embodiment. FIG. 46(a) shows an illuminance distribution across an illumination region produced by the lighting device 650. FIG. 46(b) shows a planar shape of projected light. Note that FIG. 46(a) separately shows the graphs of the illuminance distributions along the horizontal direction X and the vertical direction Y shown in FIG. 46(b).

In the lighting device 650, the second lens L2 is a body of 3-fold rotational symmetry about an axis extending through the center O of the lens surface and perpendicular to the lens surface (typically, conformable to the optical axis). In this configuration, the light exit surface S0 of the second lens L2 has three unit faces S1 to S3 which are separated by three boundary lines B1 to B3 extending outward from the center O of the lens surface which is placed on the optical axis.

Each of the three unit faces S1 to S3 is formed by a toroidal surface. The three unit faces S1 to S3 are symmetrically arranged about an axis extending through the center O of substantially the same lens surface and parallel to the z-axis direction shown in the drawing. Note that the radii of curvature Rx, Ry which define the toroidal surface may be in the same ranges as those described above.

As shown in FIG. 46(b), in the present embodiment, a generally equilateral triangular spot shape with rounded vertexes can be realized. Note that, as a result of a calculation by simulation, it was confirmed that according to the lighting device of the present embodiment the light utilization efficiency of the light reaching an illumination region which is 1 m ahead is about 81%.

Note that, in the present embodiment also, the above-described first lens L1 or second lens L2 may be made of the same material as that of Embodiment 1. In the embodiment which has been described above, a non-revolution surface as the lens surface is provided on the light exit surface side SO of the second lens L2, although the present invention is not limited to this example. It is only necessary that a non-revolution surface is formed at at least either of the lens surfaces, the light entry surface or the light exit surface, of the first lens L1 or the second lens L2.

Embodiment 4-7

Figure 47:
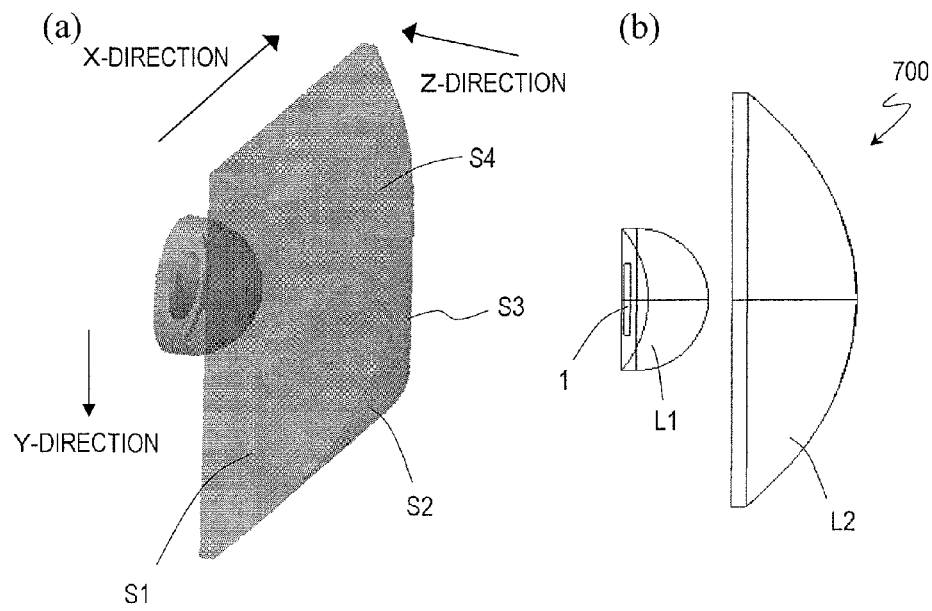
FIG. 47 Diagrams showing a lighting device according to still another embodiment of the present invention. ($a$) is a perspective view showing a portion near a light source section of the lighting device. ($b$) is a cross-sectional view (side view).
Figure 48:
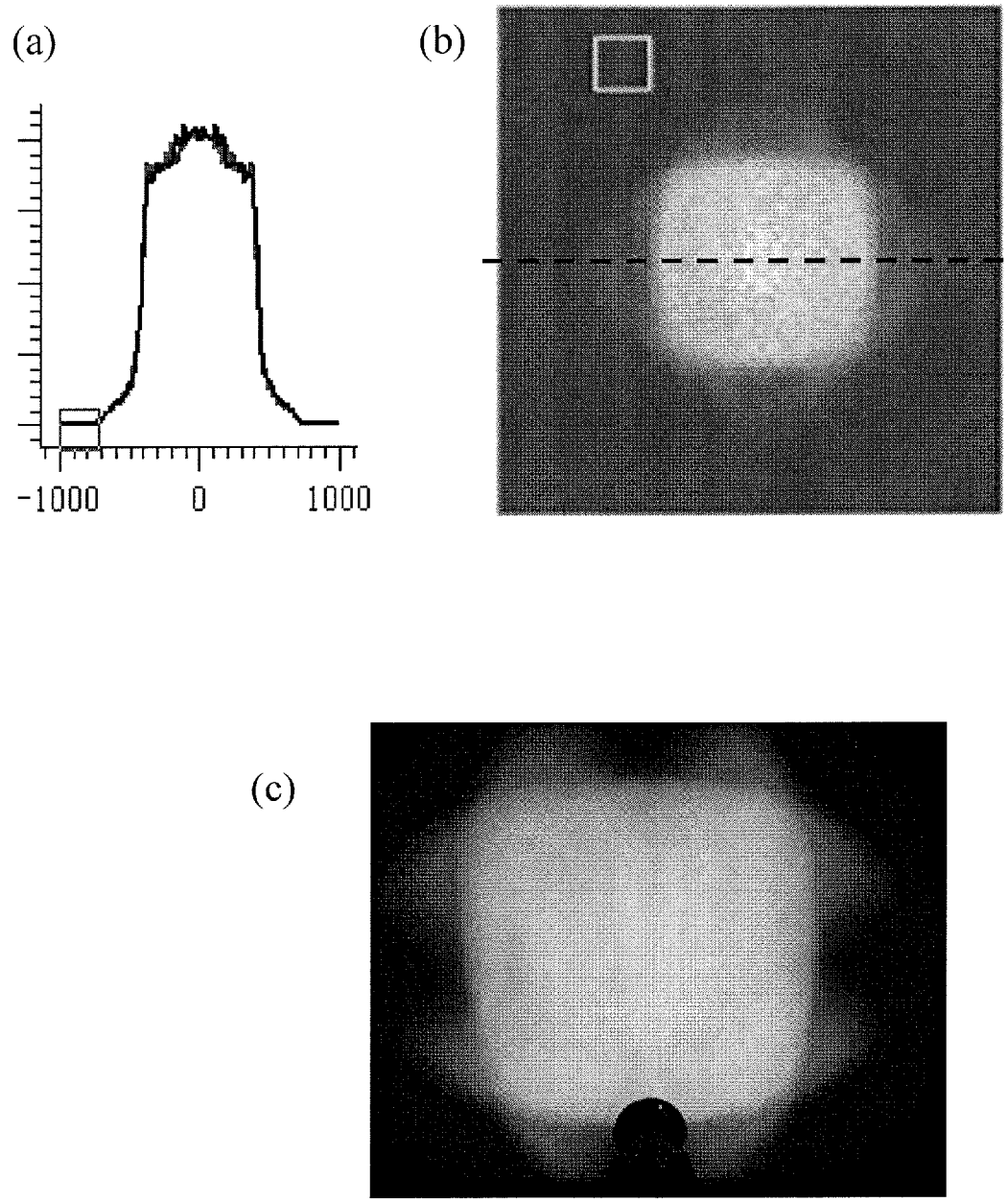
FIG. 48 ($a$) shows an illuminance distribution achieved by the lighting device shown in FIG. 47. ($b$) and ($c$) show the shape of the illumination region.

FIGS. 47(a) and 47(b) are a perspective view and cross-sectional view showing a lighting device 700 of Embodiment 4-7. FIG. 48(a) shows an illuminance distribution across an illumination region produced by the lighting device 700. FIG. 48(b) shows a planar shape of projected light. Note that FIG. 48(a) shows the graph of the illuminance distribution along the horizontal direction X shown in FIG. 48(b).

The lighting device 700 of the present embodiment includes a surface light source 1, a first lens L1 provided on the light exit side of the surface light source 1, and a second lens L2 provided on the light exit side of the first lens L1, as does the lighting device 100. The center of the surface light source 1 and the lens surface centers of the lenses L1, L2 are aligned along the optical axis.

In the lighting device 700, a non-revolution surface including four cylindrical surfaces as the unit faces is provided over the lens surface formed at the light exit surface of the second lens L2. The other components are the same as those of the lighting device 600 of Embodiment 4-6, and therefore, detailed description thereof is herein omitted.

Now, the cylindrical surface is described. When described as to the unit face S1 shown in the drawing, the cylindrical surface refers to a surface corresponding to a lateral surface of a cylinder which has a curvature only in the x-direction but does not have a curvature in the y-direction. Note that when described as to the unit face S2 which is adjacent to the unit face S1, it has a curvature only in the y-direction but does not have a curvature in the x-direction. The shape of the cylindrical surface can be defined by the radius of curvature R. The radius of curvature R is set to, for example, a value which is not less than a half of the effective diameter of the second lens L2 and not more than three times the effective diameter of the second lens L2.

As shown in FIGS. 48(b) and 48(c), in the present embodiment, a generally square spot shape with rounded vertexes can be realized. Note that, as a result of a calculation by simulation, it was confirmed that according to the lighting device of the present embodiment the light utilization efficiency of the light reaching an illumination region which is 1 m ahead is about 81%.

Also, it was confirmed that, particularly in the case where the lens surface is configured using cylindrical surfaces, incidental illumination regions are formed near each vertex of the square as shown in FIGS. 48(b) and 48(c). When a non-revolution surface including a plurality of unit faces is thus formed at the lens surface, specific illumination portions which emerge in a non-concentric shape in the illumination region are sometimes observed, although such would not occur in the case where an optical axis rotational surface is formed in a common optical system.

Next, as a variation of the present embodiment, an embodiment of forming a generally equilateral triangular illumination region using a lens which has a non-revolution surface consisting of three cylindrical surfaces is described.

Figure 49:
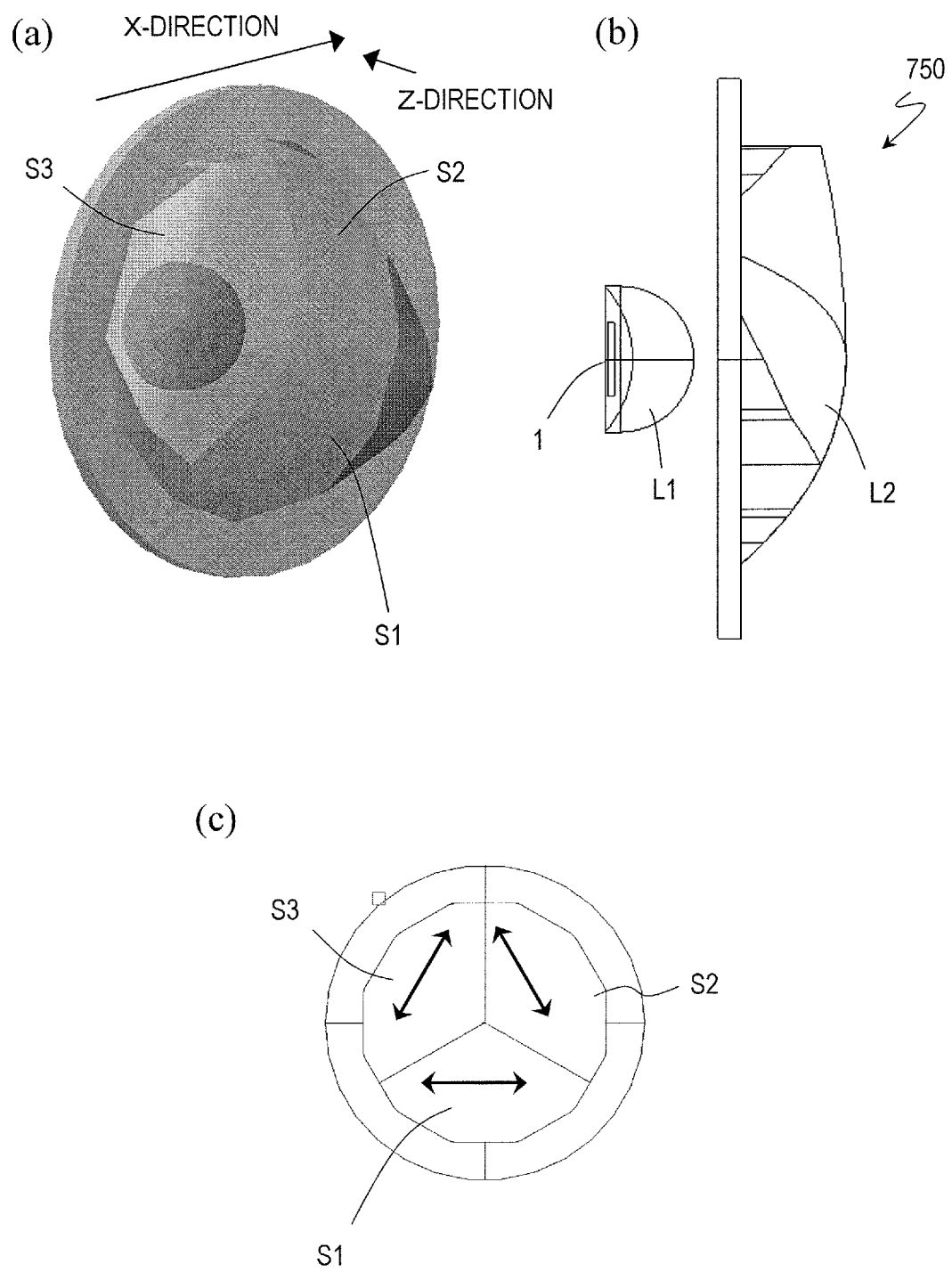
FIG. 49 Diagrams showing a lighting device according to a variation of the embodiment shown in FIG. 47. ($a$) is a perspective view showing a portion near a light source section of the lighting device. ($b$) is a cross-sectional view (side view). ($c$) is a plan view showing the second lens.
Figure 50:
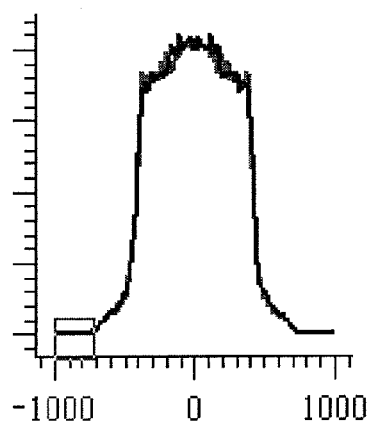
FIG. 50 ($a$) shows an illuminance distribution achieved by the lighting device shown in FIGS. 49. ($b$) and ($c$) show the shape of the illumination region.
Figure 50:
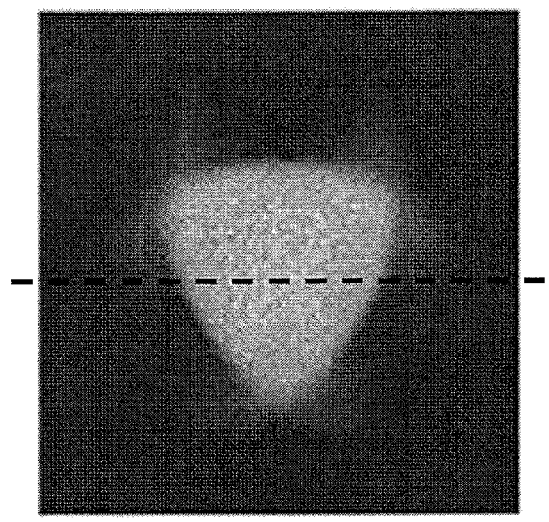
Figure 50:
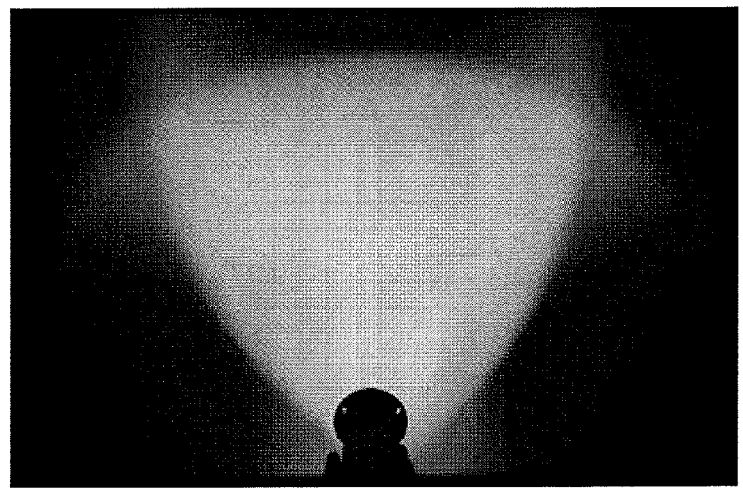

FIGS. 49(a) and 49(b) are a perspective view and cross-sectional view showing a lighting device 750 of the present embodiment. FIG. 49(c) is a plan view showing the second lens L2. FIG. 50(a) shows an illuminance distribution across an illumination region produced by the lighting device 750. FIG. 50(b) shows a planar shape of projected light. Note that FIG. 50(a) separately shows the graphs of the illuminance distributions along the horizontal direction X and the vertical direction Y shown in FIG. 50(b).

In the lighting device 750, the second lens L2 is a body of 3-fold rotational symmetry about an axis extending through the center O of the lens surface and perpendicular to the lens surface (typically, conformable to the optical axis). In this configuration, the light exit surface SO of the second lens L2 has three unit faces S1 to S3 which are separated by three boundary lines B1 to B3 extending outward from the center O of the lens surface which is placed on the optical axis. In the present embodiment, a non-revolution surface including such three unit faces is used to realize a spot shape in which the illumination region has a generally equilateral triangular shape.

Each of the three unit faces S1 to S3 is formed by a cylindrical surface. The three unit faces S1 to S3 are symmetrically arranged about an axis extending through the center O of substantially the same lens surface and parallel to the z-axis direction shown in the drawing. FIG. 49(c) shows the axial direction of the cylinder which defines the cylindrical surface. The radius of curvature R which defines the cylindrical surface may be in the same range as that described above.

As shown in FIGS. 50(b) and 50(c), in the present embodiment, a generally equilateral triangular spot shape with rounded vertexes can be realized. Note that, as a result of a calculation by simulation, it was confirmed that according to the lighting device of the present embodiment the light utilization efficiency of the light reaching an illumination region which is 1 m ahead is about 81%. In this variation also, it was confirmed that incidental illumination regions are formed near each vertex of the equilateral triangle as shown in FIGS. 50(b) and 50(c).

In the present embodiment also, the above-described first lens L1 or second lens L2 may be made of the same material as that of Embodiment 1. In the embodiment which has been described above, a non-revolution surface as the lens surface is provided on the light exit surface side SO of the second lens L2, although the present invention is not limited to this example. It is only necessary that a non-revolution surface is formed at at least either of the lens surfaces, the light entry surface or the light exit surface, of the first lens L1 or the second lens L2.

Embodiment 4-8

Figure 51:
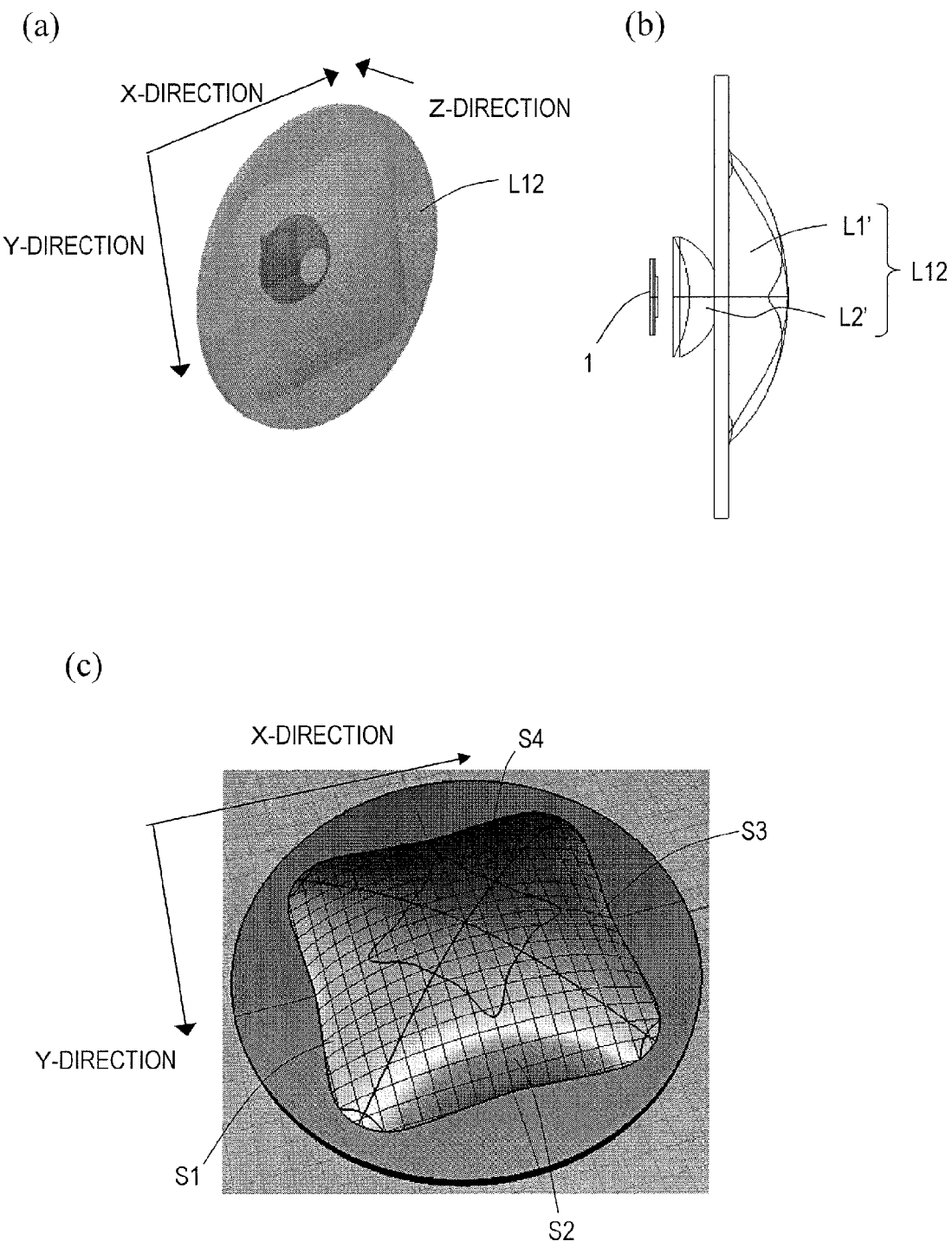
FIG. 51 Diagrams showing a lighting device according to still another embodiment of the present invention. ($a$) is a perspective view showing a portion near a light source section of the lighting device. ($b$) is a cross-sectional view (side view). ($c$) is a perspective view of the second lens.

FIGS. 51(a) and 51(b) are a perspective view and cross-sectional view showing a lighting device 800 of Embodiment 4-8. The lighting device 800 of the present embodiment uses a composite lens L12 in place of the first lens L1 and the second lens L2 that have been described in Embodiment 4-1. The composite lens L12 includes a first lens portion L1' which has substantially the same function as the first lens L1 and a second lens portion L2' which has substantially the same function as the second lens L2.

The composite lens L12 has such a structure that the light exit surface of the first lens L1 and the light entry surface of the second lens L2 are joined together at about the centers of the lenses.

The shape of the light exit surface of the composite lens L12 may be the same as that of the light exit surface of the second lens L2. That is, the light exit surface of the composite lens L12 includes four free curved surfaces (unit faces) separated by boundary lines. These free curved surfaces are rotationally symmetrically arranged about the optical axis. Each free curved surface has different curvatures in the x-direction and the y-direction that are orthogonal to each other.

The composite lens L12 having such a structure may be formed of a material such as a resin by integral molding according to a known method. Alternatively, the composite lens L12 may be manufactured by separately producing the first lens L1 and the second lens L2 using the same material and then joining the produced lenses together. In this case, when the first lens L1 and the second lens L2 are joined together using the same material as the first lens L1 and the second lens L2, a difference in refractive index would not occur, and therefore, reflection at the interface can be prevented.

Note that, however, the composite lens L12 may be manufactured by separately producing the first lens L1 and the second lens L2 using different materials and then appropriately joining the produced lenses together. In this case, the first lens and the second lens can be made of materials which have different refractive indices, and therefore, the design flexibility can be improved.

Figure 52:
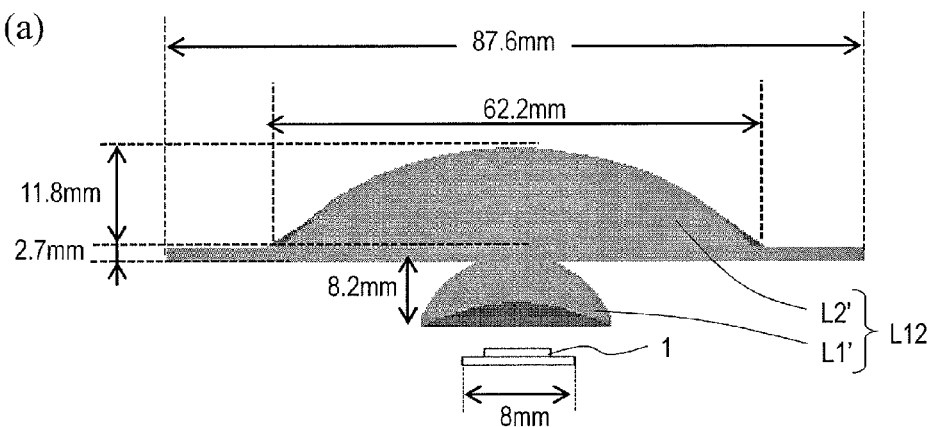
FIG. 52 Side views showing design size examples of the optical lens shown in FIG. 51. ($a$) shows the entire lens. ($b$) is an enlarged view of the first lens portion that is provided on the light source side.
Figure 52:
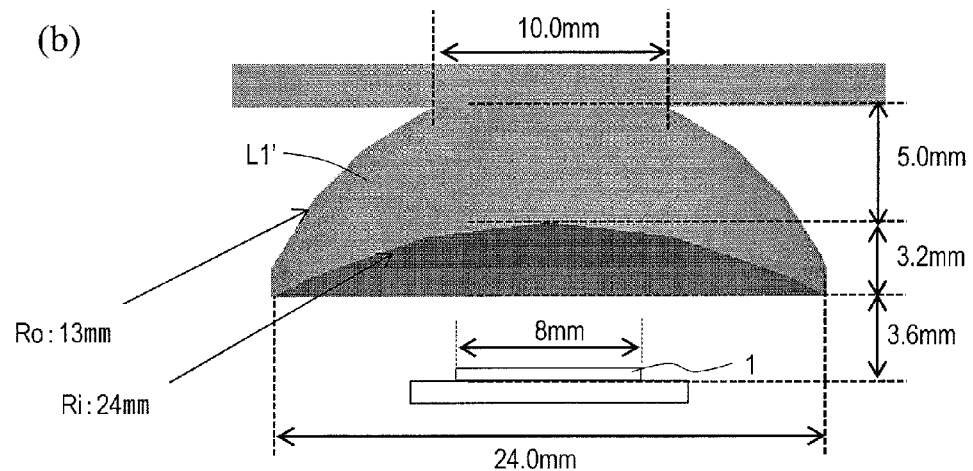

FIG. 52(a) shows a cross sectional of an example of the composite lens L12. FIG. 52(b) enlargedly shows a portion around the first lens portion L1'. As shown in FIGS. 52(a) and 52(b), the respective sizes are set such that light from the light source 1 can be efficiently converged by the first lens portion L1' and projected onto a generally square region by the second lens portion L2'. Therefore, an illumination region of a different shape can be formed with high light utilization efficiency.

In the embodiment shown in FIG. 52(b), the joint width of the light exit surface of the first lens portion L1' and the light entry surface of the second lens portion L2' is set to 10.0 mm. If this joint width is excessively large relative to the diameter of the first lens portion (24.0 mm), there is a probability that the light converging characteristic of the first lens portion deteriorates. If the aforementioned joint width is excessively small, the composite lens L12 can be readily broken. Thus, it is preferred that the joint width is not less than 2 mm, for example, and the ratio of the joint width to the diameter of the first lens portion is not more than 30%, for example. If the joint width is narrower than 2 mm, the probability of breakage increases when excessively large stress is applied on the first lens portion L1'.

Table 5 presented below shows the design of the curvature set for the unit faces S1 to S4. Note that the meaning of numbers shown in Table 5 (height z in x-y coordinates) is the same as the examples shown in Table 1 to Table 4, and therefore, the description thereof is herein omitted.

TABLE 5

| Radius of Curvature | Conic | y | Radius of Curvature | | | | | | | | | | |
|---|---|---|---|---|---|---|---|---|---|---|---|---|---|
| | | | 38.8 | 57.4 | 56 | 54.6 | 53.2 | 51.8 | 50.4 | 49 | 47.6 | 46.2 | 44.8 |
| | | | −32.7 | −29.4 | −26.1 | −22.9 | −19.6 | −16.3 | −13.1 | −9.8 | −6.53 | −3.27 | −0 |
| 95.1851 | 1 | −32.6667 | −15.9 | | | | | | | | | | |
| 84.9707 | 1 | −29.4 | −14.7 | −13.5 | | | | | | | | | |
| 76.0331 | 1 | −26.1333 | −13.9 | −12.5 | −11.3 | | | | | | | | |
| 68.3723 | 1 | −22.8667 | −13.6 | −11.8 | −10.3 | −9.08 | | | | | | | |
| 61.9883 | 1 | −19.6 | −13.7 | −11.5 | −9.65 | −8.19 | −7.01 | | | | | | |
| 56.8811 | 1 | −16.3333 | −14.2 | −11.4 | −9.26 | −7.54 | −6.17 | −5.09 | | | | | |
| 53.0507 | 1 | −13.0667 | −15 | −11.6 | −9.04 | −7.08 | −5.54 | −4.32 | −3.38 | | | | |
| 50.4971 | 1 | −9.8 | −15.9 | −11.8 | −8.91 | −6.74 | −5.05 | −3.73 | −2.71 | −1.96 | | | |
| 48.5819 | 1 | −6.53333 | −17.1 | −12.1 | −8.91 | −6.56 | −4.74 | −3.33 | −2.25 | −1.45 | −0.39 | | |
| 47.3051 | 1 | 3.26667 | 18.7 | 12.5 | 8.98 | 6.49 | 4.59 | 3.11 | 1.99 | 1.15 | 0.57 | 0.23 | |
| 46.6667 | 1 | −4.4E−15 | −20 | −12.7 | −9.09 | −6.51 | −4.56 | −3.06 | −1.91 | −1.05 | −0.46 | −0.11 | −0 |
| 47.3051 | 1 | 3.266667 | −18.7 | −12.5 | −8.98 | −6.49 | −4.59 | −3.11 | −1.99 | −1.15 | −0.57 | −0.23 | |
| 48.5819 | 1 | 6.533333 | −1.71 | −12.1 | −8.91 | −6.56 | −4.74 | −3.33 | −2.25 | −1.45 | −0.89 | | |
| 50.4971 | 1 | 9.8 | −15.9 | −11.8 | −8.91 | −6.74 | −5.05 | −3.73 | −2.71 | −1.96 | | | |
| 53.0507 | 1 | 3.06667 | −15 | −11.6 | −9.04 | −7.08 | −5.54 | −4.32 | −3.33 | | | | |
| 56.8811 | 1 | 6.33333 | −14.2 | −11.4 | −9.26 | −7.54 | −6.17 | −5.09 | | | | | |
| 61.9883 | 1 | 19.0 | −13.7 | −11.5 | −9.05 | −8.19 | −7.01 | | | | | | |
| 68.3723 | 1 | 22.86667 | −13.6 | −11.8 | −10.3 | −9.08 | | | | | | | |
| 76.0331 | 1 | 26.13333 | 13.9 | 12.5 | 11.3 | | | | | | | | |
| 84.9707 | 1 | 29.4 | −14.7 | −13.5 | | | | | | | | | |
| 95.1851 | 1 | 32.66667 | −15.9 | | | | | | | | | | |

Figure 53:
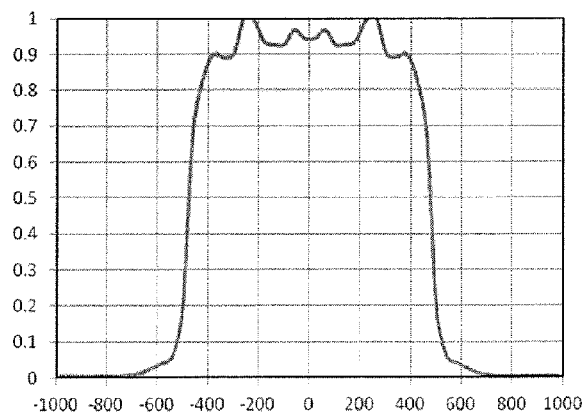
FIG. 53 ($a$) shows an illuminance distribution achieved by the lighting device shown in FIG. 51. ($b$) shows the shape of the illumination region.
Figure 53:
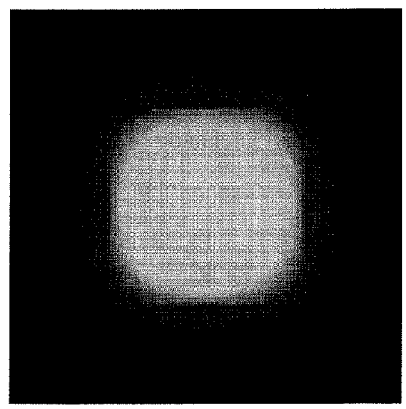
Figure 54:
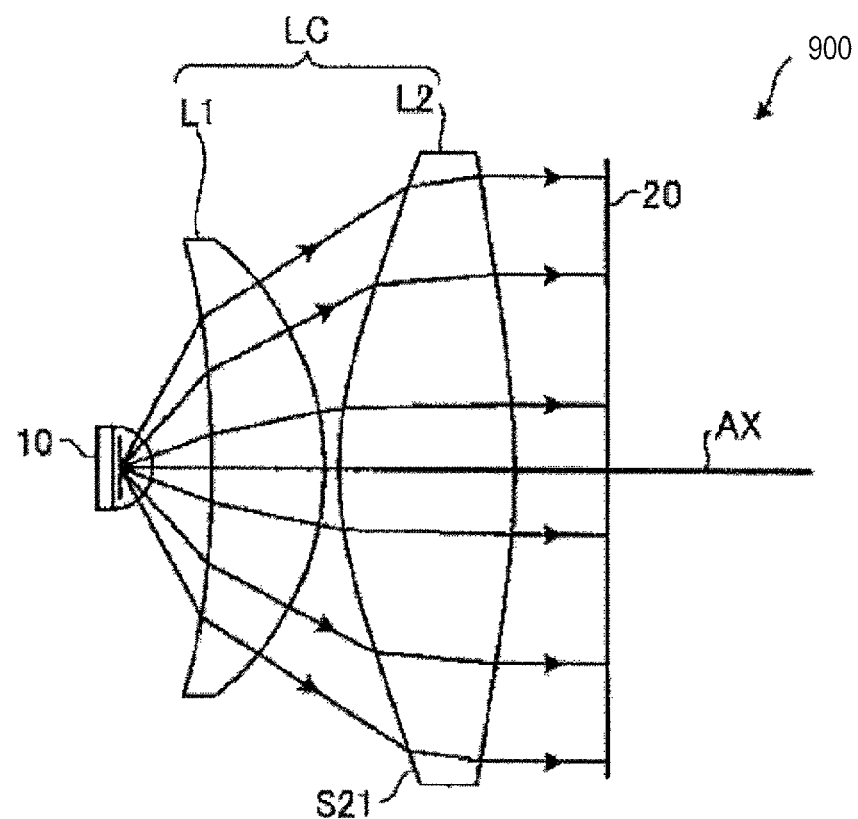
FIG. 54 A general configuration diagram of a conventional lighting device.

As shown in FIGS. 53(a) and 53(b), a generally square spot shape can be realized using the lighting device 800 of the present embodiment. Further, the illuminance distribution across the illumination region can be uniform. Further, as a result of a calculation by simulation, it was confirmed that according to the lighting device 800 of the present embodiment the light utilization efficiency of the light reaching an illumination region which is 1 m ahead is about 80%.

Thus, since the lighting device 800 uses the lens 12 in which the first lens portion L1' and the second lens portion L2' are integrated together, alignment and fixing of the lens 12 relative to the light source can be more readily achieved.

Although the embodiments of the present invention have been described above, as a matter of course, various modifications are possible. For example, by providing a non-revolution surface at the lens surface of the first lens or the second lens so as to include the above-described lens shape which is capable of forming a quadrangular spot shape and the above-described lens shape which is capable of forming a triangular spot shape, light can be projected onto a home plate shape (or arrow shape) region with high illuminance uniformity. Alternatively, it is also possible to form an illumination region of a different shape, such as a heart shape or the like. Thus, in a device according to an embodiment of the present invention, a non-revolution surface including a plurality of unit faces separated by boundary lines which have varying curvatures is formed at the lens surface, whereby a non-circular spot shape can be realized while high illuminance uniformity is achieved.

The present invention is not limited to the above-described embodiments but can be variously modified within the scope of the claims. An embodiment which is realized by an appropriate combination of technical features disclosed in different embodiments falls within the technical scope of the present invention.

INDUSTRIAL APPLICABILITY

A lighting device according to an embodiment of the present invention is applicable to a wide variety of lighting products, including lighting devices which are configured to illuminate only a narrow area, such as spotlights, light projectors, or the like, lighting devices which are configured to uniformly illuminate a somewhat large area, such as streetlights, reading lights, indoor indirect lighting devices, vehicle interior roof lights, or the like, vehicle headlights which are configured to emit a larger amount of light, etc. Also, the lighting device can be suitably used as a spotlight which is capable of forming a non-circular illumination region for use in stage lighting devices.

The emission wavelength of the light source is not limited to visible light. The light source can be used for light sources for use in infrared sensors which use infrared light, spot exposure lamps and sterilization lamps which use ultraviolet light, etc.

REFERENCE SIGNS LIST

1 light source (light emission section)
2 optical lens section
3 optical lens
4 optical lens
5 opening section
11 lighting device
12 lighting device
13a lighting device
13b lighting device
22 optical lens section
23 optical lens section
AX optical axis
L1 optical lens (first lens)
L2 optical lens (second lens)
f1 first focal position
f2 second focal position
F1 focal point of first lens
F2 focal point of second lens
100-800 lighting device

The invention claimed is:

1. A lighting device, comprising:
a surface light source having a light exit surface;
a first lens having a first focal point, the first lens being provided on the light exit surface side of the surface light source; and
a second lens having a second focal point, the second lens being provided on a light exit surface side of the first lens,
the surface light source, the first lens, and the second lens being configured such that a first virtual image is formed by the first lens and a second virtual image is formed by the second lens,
wherein the first virtual image is formed between the second focal point and the first lens,
the second focal point is on a side opposite to the surface light source relative to a position which is distant from a principal point of the second lens by a predetermined focal length f',
the predetermined focal length f' satisfies $$I'=(D/(\epsilon+D)) \cdot f'$$

where I' is the distance between the principal point of the second lens and a position of the first virtual image, D is an effective diameter of the second lens, and $\epsilon$ is a light source size factor which is either one of a size of the light exit surface of the surface light source or an arrangement pitch of a plurality of light-emitting elements included in the surface light source, and
at least either of a light entry surface or a light exit surface of the first lens or the second lens includes a non-revolution surface as a lens surface, and a plurality of non-concentric boundary lines whose curvatures vary discontinuously are provided in the non-revolution surface.

2. The lighting device of claim 1, wherein at least one of the plurality of boundary lines extends outward from a center of the non-revolution surface.

3. The lighting device of claim 2, wherein the non-revolution surface has three or more unit faces separated by the plurality of boundary lines, the three or more unit faces being rotationally symmetrically arranged about an axis extending through the center of the non-revolution surface.

4. The lighting device of claim 3, wherein x-direction and y-direction which are orthogonal to each other in a plane which is perpendicular to an optical axis direction are defined, and in at least one of the three or more unit faces, a curvature in the x-direction and a curvature in the y-direction are different from each other.

5. The lighting device of claim 4, wherein at least one of the three or more unit faces is a free curved surface.

6. The lighting device of claim 1, wherein
when the non-revolution surface forms a light exit surface of the first lens or the second lens, the non-revolution surface includes two convex curved surfaces which are adjacent to each other with one of the plurality of boundary lines formed between the two convex curved surfaces, and the boundary line formed between the two convex curved surfaces is a trough line, and when the non-revolution surface forms a light entry surface of the first lens or the second lens, the non-revolution surface includes two concave curved surfaces which are adjacent to each other with one of the plurality of boundary lines formed between the two concave curved surfaces, and the boundary line formed between the two concave curved surfaces is a ridge line.

7. The lighting device of claim 1, wherein the light source size factor c is not less than a minimum pitch of in-plane intensity unevenness of the light exit surface.

8. The lighting device of claim 1, wherein the first virtual image is formed between the first focal point and the first lens, and the second virtual image is formed between the second focal point and the second lens.

9. The lighting device of claim 8, wherein the first virtual image and the second virtual image are formed between an effective focal point of the first lens and the second lens and the first lens.

10. The lighting device of claim 8, further comprising a second optical system provided on a light exit side of a first optical system that includes the first lens and the second lens.

11. The lighting device of claim 10, wherein the second optical system includes a concave lens which is the closest to the first optical system and a convex lens which is next to the concave lens and is the second closest to the first optical system.

12. The lighting device of claim 1, wherein
the non-revolution surface is provided at the light exit surface of the second lens, and
the light exit surface of the first lens and a light entry surface of the second lens are joined together.

13. The lighting device of claim 12, wherein the first lens and the second lens are formed of a resin by integral molding.

14. The lighting device of claim 9, wherein
a lens surface of the first lens facing on the surface light source is a concave curved surface, and
a width h of a range of a position at which the light exit surface can be placed is represented by the following formula:

$$h \leq 2\sqrt{(d(2R-d))}$$

where d is a distance along an optical axis from the light exit surface of the surface light source to the concave curved surface of the first lens, and R is a radius of curvature of the concave curved surface of the first lens.

15. The lighting device of claim 9, wherein a<f/2 is satisfied where a is a distance from a principal point of an optical lens section including the first lens and the second lens to the light exit surface, and f is a distance from the principal point to a focal position of the optical lens section.

* * * * *